(12) United States Patent  
Wegner et al.

(10) Patent No.: US 8,019,634 B2  
(45) Date of Patent: Sep. 13, 2011

(54) METHOD FOR TRANSPORTING PHYSICAL OBJECTS, TRANSPORTATION SYSTEM AND TRANSPORTATION MEANS

(75) Inventors: Martin Wegner, Meckenheim (DE); Keith Ulrich, Bonn (DE); Michael Lohmeier, Rheinbach (DE)

(73) Assignee: Deutsche Post AG, Bonn (DE)

( * ) Notice: Subject to any disclaimer, the term of this patent is extended or adjusted under 35 U.S.C. 154(b) by 1006 days.

(21) Appl. No.: 11/714,506

(22) Filed: Mar. 6, 2007

(65) Prior Publication Data

US 2008/0040182 A1  Feb. 14, 2008

(30) Foreign Application Priority Data

Aug. 7, 2006 (EP) ..................... 06016417

(51) Int. Cl.  
*G06Q 10/00* (2006.01)
(52) U.S. Cl. ..................................... 705/7.22
(58) Field of Classification Search .............. 705/7, 7.22  
See application file for complete search history.

(56) References Cited

U.S. PATENT DOCUMENTS 7,455,225 B1 * 11/2008 Hadfield et al. .............. 235/384

OTHER PUBLICATIONS

Zwick, Steve. "Not Your Granddad's Grain Silo" Futures megazine, v34n14, pp. 76-80; Nov. 2005.*

* cited by examiner

*Primary Examiner* — John Hayes  
*Assistant Examiner* — Allen Jung  
(74) *Attorney, Agent, or Firm* — International IP Law Group, P.C.

(57) ABSTRACT

The invention relates to a method for transporting physical objects, wherein at least one physical object is transported from a sending station to a receiving station, wherein the transport occurs through at least one physical router, wherein the physical router executes a decision about further parameters of transport to another physical router or to the receiving station. The method is carried out in that a central control computer receives information for handling and moving the physical objects and that the central control computer influences supplies for transport means and/or the transport means according to environmental data.

25 Claims, 15 Drawing Sheets

300

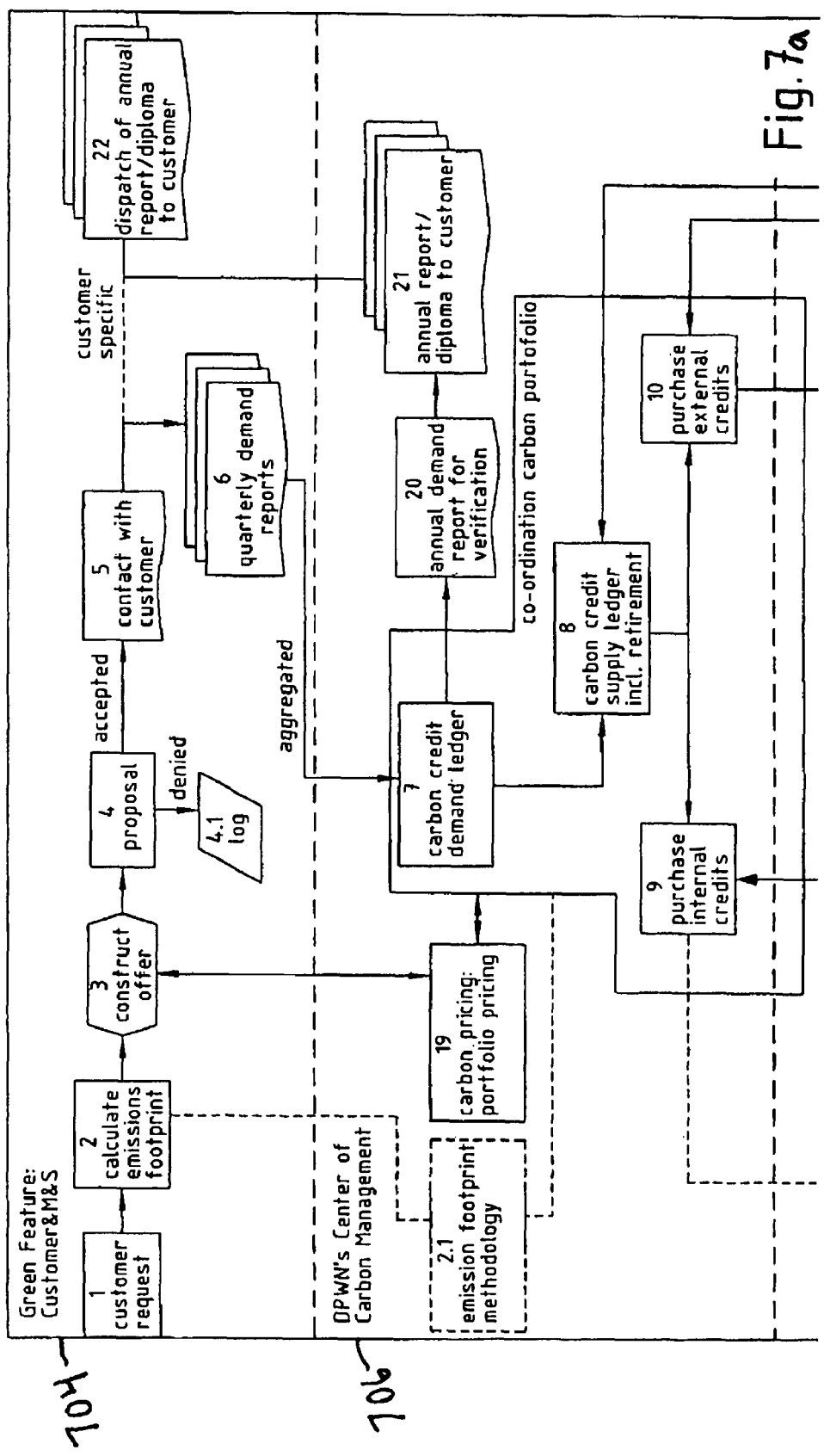

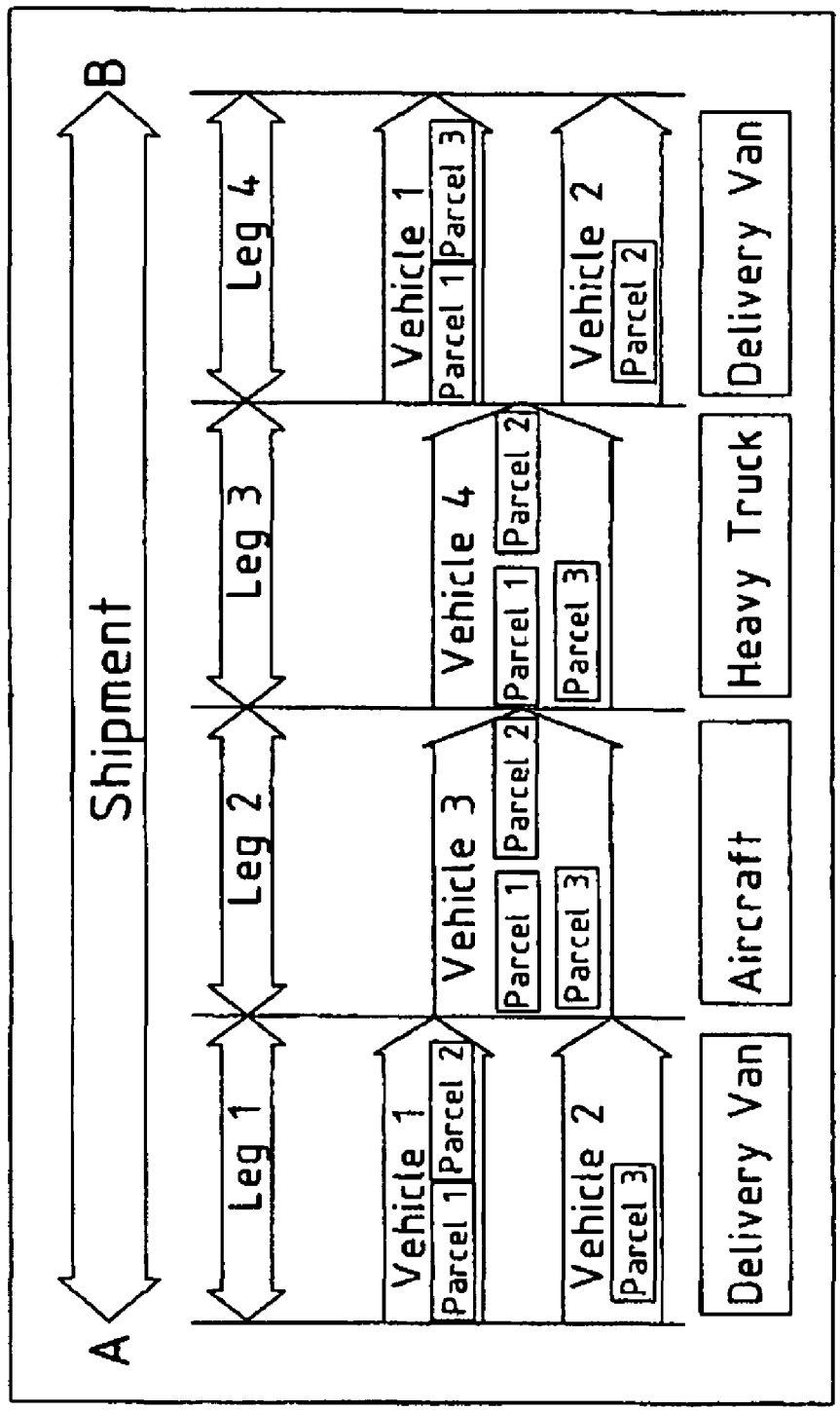
Fig.8 Example for the use of legs in the emission calculation 800

Carbon Emissions of shipment =

(Distance * Fuel Consumption * Variable Emission Factor + Fixed Emission Value) * $\dfrac{\text{Volume Weight}}{(\text{Loading Capacity} * \text{Loading Factor})}$ + Fixed Emission Value for Facilities □ = Emission Calculation      ⌐ ¬ = Emission Allocation
                              ⌊ ⌋

Formula for the calculation of carbon emmission from each leg

Process chart for accounting carbon credits in the carbon supply ledger 1400

METHOD FOR TRANSPORTING PHYSICAL OBJECTS, TRANSPORTATION SYSTEM AND TRANSPORTATION MEANS

CROSS REFERENCE TO RELATED APPLICATION

This application claims priority to European Patent Office (EPO) Patent Application No. 06 016 417.5, which was filed on Aug. 7, 2006.

BACKGROUND

The invention relates to the problem of optimizing the transport of physical objects.

The International patent application with the International publication number WO 03/035282 A2 and the corresponding European patent EP 1 455 959, entitled to the Deutsche Post AG, describe a method for processing objects wherein information located on at least one surface of the object is detected. The processing of the objects is characterized in that address information determined by means of the information located on the surface of the object is compared with available address information in a databank or in a database drawn up there from.

The United States patent application US 2005/0021389 A1 also describes a method and a system for calculating an environmental score for a business unit. It also includes a computer system for calculating a score for separately accountable business units, the score being indicative of a level of unaccounted aspects of external environmental cost of economic activities.

The United States patent publication US 2005/0052810 A1 describes a method and an apparatus for calculating an environmental indicator and recording medium with calculation program recorded there on. According to this document database and data table are stored in a memory. The database has data associated with the part lists and product specifications of products in conjunction with products identification codes, whereas the data table has processing yields and environmental indicator factors in conjunction with material codes which respectively indicate the material of each part constituting a product. Afterwards processing yield and environmental indicator factor for every material code are calculated by referring the data table, the material codes relating to the parts corresponding to the part numbers which have been extracted.

SUMMARY OF THE INVENTION

It is an object of the current invention to integrate a calculation of environmental data in a transportation system.

This problem is solved advantageously by the method of claim 1, the transportation system of claim 8, the computer program of claim 11 and the computer program product of claim 12.

Claims 2 to 7, 9 and 10 contain advantageous improvements of the invention.

The invention relates to a method for transporting physical objects, wherein at least one physical object is transported from a sending station to a receiving station, wherein the transport occurs through at least one physical router, wherein the physical router executes a decision about further parameters of transport to another physical router or to the receiving station.

According to the invention a central control computer receives information for handling and moving the physical object (generated and/or implemented in the decision about the further parameters of transport with reference to environmental data) and whereby the central control computer influences supplies for transport means and/or the usage of transport means.

An example of an influence of supplies is for example the usage of alternative fuel, for example biofuel.

An example of the usage of a transport means is the choice of a freight vehicle which fulfills the emission criteria according to Euro IV category instead of a freight vehicle which only fulfills the emission criteria according to Euro III category.

The invention furthermore relates to a transportation system for transporting physical objects, wherein at least one physical object is transported from a sending station to a receiving station, wherein the transport occurs through at least one physical router, wherein the physical router executes a decision about further parameters of transport to another physical router or to the receiving station, wherein environmental data is used for handling and/or moving at least one physical object, characterized in that a central control computer contains required environmental data, wherein the central control computer is capable of influencing at least one environmental impact factor by a decision about at least one transport parameter and/or at least one sustainability parameter.

Preferably the central control computer contains at least one comparator for comparing measured environmental data with the required environmental data.

Advantageously, the transportation system contains a plurality of sensors, capable of measuring environmental data and means for transmitting the environmental data to the central control computer.

An advantageous implementation of the invention provides a system dedicated to steering transport processes. It comprises the following elements: a main network of sensors for environmental impact data caused by the transport, each sensor emitting a signal towards at least one computer, each of these sensors for environmental impact factor transmitting a message containing information for environmental impact factor.

It is advantageous that the environmental data are measured by sensors and whereby the measured environmental data are transmitted to the central control computer.

This implementation can further be improved by calculating and planning a transport of a physical object, whereby an environmental effect of the transport is calculated with regard to environmental performance data of at least one transport means and that at least one parameter of the transport is changed, if the planed transport does not fulfill environmental requirement data.

It is advantageous to apply an identification code for each transport.

It is furthermore advantageous to integrate a control computer that creates work plans for some user computers and transmits the environmental impact factors obtained by the sensors.

The invention further relates to a transportation system for transporting physical objects, wherein at least one physical object is transported from a sending station to a receiving station, wherein the transport occurs through at least one physical router, wherein the physical router executes a decision about further parameters of transport to another physical router or to the receiving station, wherein environmental data is used for handling and/or moving at least one physical object.

Preferably the transportation system contains a plurality of sensors, capable of measuring environmental data, means for transmitting the environmental data to a central control computer, wherein the central control computer contains required environmental data and at least one comparator for comparing measured environmental data with required and/or desired environmental data, and wherein the central control computer is capable of influencing at least one environmental impact factor by a decision about at least one transport parameter and/or at least one sustainability parameter.

Examples of required and/or desired environmental data are emissions.

Required environmental data are for example environmental data based by laws.

Desired environmental data are environmental data which should be achieved due to requested products or services.

These required and/or desired environmental data are achieved by a transport system and/or a method of transporting with at one or more of the following steering processes: steering (choice) of a means of transport, steering (choice) of a transport velocity, steering (choice) about a transport time, steering of transport capacity, steering of at least one supply parameter.

A supply parameter is for example the kind of fuel used for at least one leg of the transport, for example the usage of biofuel.

The current invention preferably integrates a calculation of environmental costs relating to transports in a transportation system.

According to advantageous implementations of the invention the environmental costs are charged to users of the transportation system.

A preferred embodiment contains a processing computer that receives remote measures sorted by the control computer.

The system preferably also comprises autonomous local receiver and sensor for environmental impact factors connected to the computers in the said system.

The environmental impact factors causing cancer are for example carbon, dioxide emission, or emissions of particulates (also called fine particles).

Particulates, alternatively referred to as particulate matter (PM), aerosols or fine particles, are tiny particles of solid (a smoke) or liquid (an aerosol) suspended in a gas. They range in size from less than 10 nanometres to more than 100 micrometers in diameter. This range of sizes represents scales from a gathering of a few molecules to the size where the particles no longer can be carried by the gas.

There are both natural and human sources of atmospheric particulates. The biggest human sources of particles are combustion sources, mainly the burning of fossil fuel in combustion engines in automobiles.

The composition of fine particles depends on the source. Primary emissions from combustion sources are made primarily of unburned fuel (hydrocarbons), elemental carbon, soot, elemental sulfur, mineral salts, and often contain traces of toxic metals. Secondary emissions are a combination of ammonia with either sulfuric acid or nitric acid and water, together with a complex mixture of the organic oxidation products.

In general, the smaller and lighter a particle is, the longer it will stay in the air. Larger particles (greater than 10 micrometers in diameter) tend to settle to the ground by gravity in a matter of hours whereas the smallest particles (less than 1 micrometer) can stay in the atmosphere for weeks.

In European Union directives 1999/30/EC and 96/62/EC, the European Commission has set limits for particulate matter (PM) in the air.

Comparable, standards exist in the United States, see for example: http://en.wikipedia.org/wiki/National_Ambient_Air_Quality_Standards The processing computer advantageously produces the following output: environmental impact data for a certain transport an environmental impact data in a certain region.

Master computers are capable of processing the message transmitted by the master sensors for environmental impact factor.

Client computers do not necessarily address their remote measurement to the processing computer.

Local computers are not necessarily capable of processing the message transmitted by the master sensors for environmental impact factor.

The local computer is connected to local measurement sensors for environmental impact.

Sensors for environmental impact transmit a preferably coded signal. It is furthermore advantageous to integrate navigation receivers.

An advantageous implementation of the invention provides a system of a control computer connected to the data sensors.

Potential users of the system according to the invention may be classified according to different types of need: Some users need very detailed environmental impact data for each transport. Other users are satisfied with monthly, quarterly or yearly reports.

One segment comprises the following elements: A main sensor for measuring environmental impact data and a transmitter for transmitting the measured environmental impact data.

Preferably each sensor for environmental impact data may transmit a message containing an identification code.

A preferred system according to the invention determines the environmental data periodically.

The system according to the invention can collect and/or store environmental impact data obtained from these sensors.

A preferred control computer creates work plans for transport processes and transmits them to logical nodes and/or transport means.

A message to be sent to a specific computer is preceded by the said computer's identification code. The control computer generates configuration messages for some sensors for environmental impact factors which are connected to it. It also outputs and classifies remote measurements made.

These remote measurements also contain some parameters recorded by the sensors for environmental impact factors themselves. These remote measurements originate from remote measurements/remote control stations tracking the sensor data. They reach the control computer either directly or through logical nodes.

A processing computer which may be distributed between several entities receives remote measurements sorted by the control computer. This computer evaluates remote measurements.

The sensors for environmental impact data transmit any change of data or the exact data value, depending on the case.

It is assumed that a computer is vertically in line with the sensors for environmental impact data.

This should provide sufficient coverage of environmental impact data from the sensors for environmental impact data.

It is advantageous to place a number of sensors for environmental impact factors close to sources of emissions as motorways, harbours or onboard of transport means.

The installation of sensors for environmental impact factor should furthermore implement a good geographic distribution, or possibly even each single transport means.

The network of sensors for environmental impact factor may be set up gradually.

Master work plans are received in form of remote controls addressed to the transport means and/or the transport nodes, preferably through a computer data bus.

It is furthermore advantageous to connect the sensors to transponders attached to the objects to be transported.

Preferably the control computer is configured to prepare transport plans for physical objects.

The control computer may contain a processing computer configured to receive remote measurements.

It is furthermore advantageous to integrate a set of sensors for environmental impact data being connected to a microcomputer and to verify that the sensors for environmental impact data are working correctly.

The invention relates furthermore to a Transportation system for transporting physical objects, wherein at least one physical object is transported from a sending station to a receiving station, wherein the transport occurs through at least one physical router, wherein the physical router executes a decision about further parameters of transport to another physical router or to the receiving station, wherein environmental data of the transport is calculated and displayed.

An advantageous implementation of the method, the transportation system, the transportation means, the physical router, the computer program and the computer program product according to the invention is characterized in that information for handling and moving the physical object is generated and/or implemented in the decision about the further parameters of transport with reference to environmental data.

Environmental according to the invention means especially any biological, chemical or physical interaction between a system studied and the environment, defined in terms of the extraction of natural resources, substances emissions to the environment media (air, soil, superficial and ground water), space occupied by waste and plant, as well as any disturbance.

The physical router may be a means with a routing and/or a switching function.

The properties of the physical router depend on the objects which are handled.

The invention further relates to a transportation system for the transport of physical objects, wherein the transportation system contains means for transport of at least one physical object from a sending station to a receiving station, wherein the transportation system contains at least one physical router, wherein the physical router is capable of executing a decision about further parameters of transport to another physical router or to the receiving station.

Physical objects are any objects, which can have an effect in the physical world. They are most preferably massive bodies of any size, ranging from less than one gram up to several tons.

Examples of the objects are postal deliveries as letters, parcels and packets, any object that can be transported on transport pallets or transport container as well as the transport pallets and the transport containers themselves.

The invention especially relates to the transport of objects of any size, weight or dimension. The objects can be units, but they are not limited to units.

The invention also relates to transportation means and physical routers.

Transport of various goods in complex systems requires special control mechanisms.

Advantageous control mechanisms for the delivery of package, for example within companies or to customers are very much based on logistics and workflow management systems, e.g. the Workflow Management Coalition, WFMC.

Several companies are working on dedicated software for package delivery systems.

Further examples of package delivery systems where sophisticated logistics and workflow management systems are being used are luggage transport at airports, mail sorting and distribution and computer aided manufacturing in big production companies (e.g. car manufacturing).

It is advantageous to combine the present invention with known package delivery systems in order to add advantageous known services (such as system malfunction handling, status handling, priority based routing, etc.).

Preferable embodiments of the invention contain different environmental data.

One example of environmental data according to the invention are environmental impact data.

This is structured information about at least one parameter which has influence on the environment; for example: Weight of the physical object.

Another example of environmental data according to the invention are environmental requirement data. It is furthermore possible to add other information related to the specific shipment or vehicle.

This means structured information about environmental requirements of the transport.

Furthermore, the invention contains the concept that the routing is performed with reference to environmental performance data of transport means.

The invention implements an analysis of the environmental performance data.

It is possible to determine over all environmental performance data, for example by regarding the typical emissions of a transportation vehicle for each transported weight unit.

It is even more advantageous to implement specific environmental performance data.

An example of more specific environmental performance data are emission and energy consumption values of each single transportation device used.

For example it is possible to implement a check if freight vehicle fulfill the emission criteria according to Euro III or Euro IV category.

However, it is even possible to determine the specific environmental performance data for each type of vehicle used. It is furthermore possible to install fuel-measuring devices and/or continuously register the loading factor. It is also possible keeping track of positioning using GPS. The information is advantageously continuously communicated to a central database through GSM or GPRS. In this way, each vehicle and the onboard transport could be monitored using real time values. In addition, the emissions could be presented in means of geographical impact.

In an advantageous implementation of the method, the transportation system, the transportation means, the physical router, the computer program and the computer program product, routing information contains information about environment standards; the routing information is integrated in the routing of the objects; the routing information may accompany the physical object in different ways: Imprints on a surface of the objects or a label attached thereon, transponder with routing information.

As the environmental performance data of the transportation means influences the resulting environmental impact data, it is advantageous to implement the environmental performance data in the routing information.

The routing information may contain further elements for carrying out the routing and the subsequent transport, for example a delivery address or an alternative delivery address, or information about a transportation time or a time for delivery.

The Invention allows determining the effect of transport processes on the environment.

In further advantageous embodiments, the invention includes generating and/or presenting reports on generated and/or expected emissions but not their effect on the environment.

Furthermore, the invention allows carrying out transport processes according to environmental requirements.

Implementations of the invention could enable the following advantages:
- Detailed Emission Reporting for a transport carrier or each single transport process
- Reporting done on Customer basis, independent of where the transaction has taken place
- Emission Reporting delivered as soon as a reporting period has ended (e.g. yearly, quarterly or monthly) with high quality/accuracy. Advantageously this takes place in the middle of the following month to allow systems to be corrected
- Emission Reporting delivered in alternate ways and formats
- Proactive calculation tool for Emission.

Advantageous implementations of the invention could include the following advantages:
- To deliver Environmental Performance Report
  - with less manual management
  - with higher quality
  - at lower costs than existing manual routines
- A solution that can live for a number of years and that can work as a global environmental tool
- One-stop-shopping i.e. reporting on environmental issues is done, independent of way of transportation.

From this database reports will be generated and also analysis of a more dynamic nature.

This output is to be of higher quality and easier, faster access thus meeting customer demands, with reliable conditions and with an efficient infrastructure.

The environmental impact data and the environmental requirement information can be implemented in various ways.

In one implementation of the invention at least a part of the environmental impact data is included in a computer that steers functions of at least one of the physical routers.

In an advantageous implementation of the method, the transportation system, the transportation means, the physical router, the computer program and the computer program product, a computer connected to the physical router is capable of combining physical impact data of transportation means with transportation relevant parameters of the physical objects.

Examples for the transportation relevant parameters are the weight and/or the size of the respective physical object.

This advantageous implementation of the invention could include the additional advantageous further parameters of the transport, for example requirement for keeping the physical objects within a certain temperature range.

The invention allows calculations based on multi-parameters for carrying out the routing of the physical objects and their subsequent transport.

Without limiting the scope of the invention this example can be explained with respect to the following example:

After vintage and subsequent vinification wine is transported to costumers.

For example the Beaujolais and Beaujolais Villages have undergone short maceration and have attained the required characteristics for Beaujolais Nouveau, are analysed, filtered and bottled. Everyone can enjoy them from the 3rd Thursday in November.

Known concepts allow to fulfill already implemented requirements for the transport process as the time of delivery and the demands of keeping the wine in a certain predefined temperature range and to protect it from transportation hazards.

To operate such complex logistic processes it is helpful to implement effective communication means.

An example for a highly effective communication means is a communication network based on the Internet Protocol.

The Internet Protocol is based on data packets, with a maximal length, which is according to the IPv4 standard 64 Kbyte and variable according to the IPv6 standard. Larger data packets are transferred by a plurality of data packets. Each data packet is a fragment of the whole information and travels its own way through the network. As the Internet Protocol does not constitute a connection along which the data packets are transported, it is necessary that every data packet contains the source and target address. The correct sequence of the IP data packets is achieved at the transport service of a higher layer. According to the IPv6 standard all data packets may be routed the same way by using flow label routing. This is similar to virtual circuits.

The routing algorithm is responsible for deciding which output line and incoming data packet should be transmitted on. If the subnet uses datagrams internally, this decision must be made anew for every arriving data packet since the best route may have changed since last time. If the subnet uses virtual circuits internally, routing decisions are made only when a new virtual circuit is being set up. Thereafter, data packets just follow the previously established route.

Due to the enormous growth of the Internet and the number of subscribers, the Internet Protocol (IP) is widely deployed. IP is the network layer protocol for the Internet and lots of other networks. IP, together with several additional protocols for example such as Open Shortest Path First (OSPF) and Internet Control Message Protocols (ICMP) is one among many examples to provide the afterwards described services.

Examples of these services are end-to end data transport, addressing, fragmentation and reassembly, routing and congestion control.

The IPv6 standard is one among many standards which are capable to provide the afterwards mentioned additional services. These services include an improved security handling which guarantees authentication and privacy, an enhanced type of service based routing, a flow label routing which is similar to virtual circuits and an unlimited amount of IP addresses including an improved hierarchical addressing scheme.

Logistics systems manage the purchase, production and delivery/sales of products. Several logistic systems are available. Examples of these logistics systems are Enterprise Resource Planning (ERP) and Material Requirements Planning (MRP I and II).

Advantageous logistics options are just-in-time delivery, job-shops, flow-shops, Group-Technology cells, push/pull control, material-, capacity- and time-based control. Furthermore, a feed forward and/or a feedback control is possible. Further advantageous logistics options include engineering to Order, Make to Order, Assemble to Order, Make to Stock.

A further object of the invention is a transportation system for transporting physical objects, wherein at least one physical object is transported from a sending station to a receiving station, wherein the transport occurs through at least one physical router, wherein the physical router executes a decision about further parameters of transport to another physical router or to the receiving station, wherein environmental data is used for handling and/or moving at least one physical object.

Although many implementations of the invention do not need any protocol functionality, other advantageous implementations of the invention include protocol functionality.

The protocol functionality is added to at least one machine that takes care of a physical routing of the physical objects.

In a preferred embodiment of the method, the transportation system, the transportation means, the physical router, the computer program and the computer program product, at least one routing mechanism is used.

In an advantageous implementation of the method, the transportation system, the transportation means, the physical router, the computer program and the computer program product, Internet Protocol Addresses are transferred to data link addresses.

In an advantageous implementation of the method, the transportation system, the transportation means, the physical router, the computer program and the computer program product, at least one gateway routing protocol is used.

In an advantageous implementation of the method, the transportation system, the transportation means, the physical router, the computer program and the computer program product, a packet-scheduling algorithm is used.

In a preferred embodiment of the method, the transportation system, the transportation means, the physical router, the computer program and the computer program product, the packet scheduling is performed with Weighted Fair Queuing.

Weighted Fair Queuing is a packet-scheduling algorithm used in routers. The mechanism uses a kind of byte-by byte round robin in order to handle several input queues for a certain output queue. The scheduling considers different priority levels.

In an advantageous implementation of the method, the transportation system, the transportation means, the physical router, the computer program and the computer program product, at least one virtual private network (VPN) is used.

A virtual private network (VPN) is a private network in a public wide area network, meaning that it is solely dedicated to serve a company or companies of its own. A VPN is shielded off from the rest of the traffic on a public wide area network (WAN).

In a preferred embodiment of the method, the transportation system, the transportation means, the physical router, the computer program and the computer program product, differentiated services are used.

It is preferable to implement differentiated services to fulfill different environmental requirements of the transport.

For example: Some customers like to transport the physical objects with low emissions.

For transporting the physical objects of the customers it is useful to use low emission vehicles.

Alternatively it is possible to implement a trade for emission credits, for example carbon credit, for example according to the Climate Corporation's EU Emission Trading Services. Assists companies affected by the EU Emission Trading Scheme (EU ETS) in selling or buying carbon credits. This implementation provides companies with the means to efficiently manage allowance positions.

In an advantageous implementation of the method, the transportation system, the transportation means, the physical router, the computer program and the computer program product, a control protocol is used.

The examples use and adapt the environmental data in order to be able to handle the distribution of physical packages.

However, it is also an object of the invention to implement retrieving and/or reporting functions in order to analyse and/or predetermine environmental impacts of transport processes.

Such a first preferred embodiment is afterwards described with regards to FIG. 1.

BRIEF DESCRIPTION OF THE DRAWINGS

In the following advantageous implementations of the invention will be further described by means of examples and by means of the figures:

FIG. 7a and FIG. 7b depict an Operation Process Map

FIG. 8 shows an example for the use of legs in the emission calculation.

FIG. 9 shows a formula for the calculation of carbon emissions for each leg.

DETAILED DESCRIPTION OF SPECIFIC EMBODIMENTS

Figure 1:
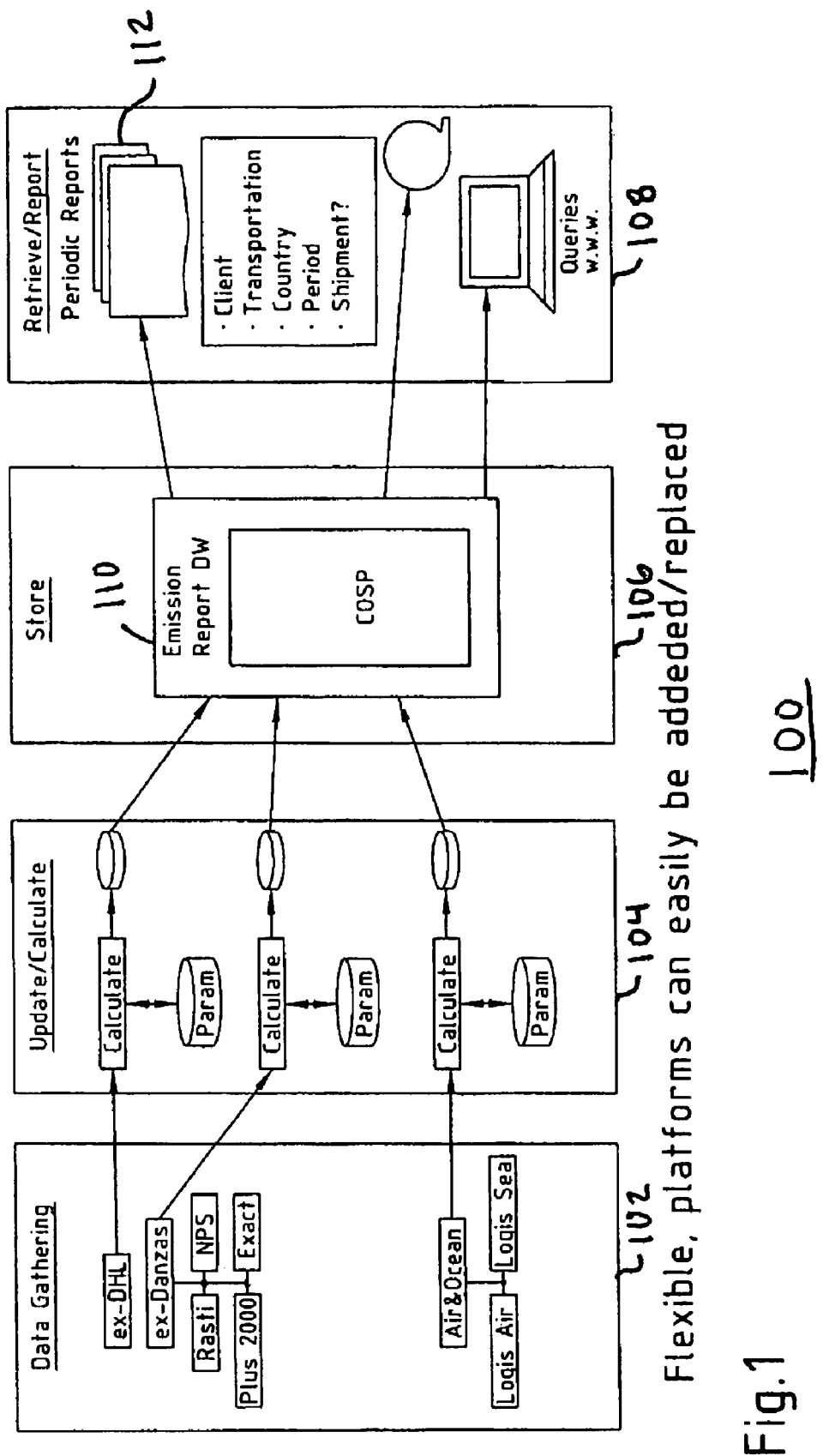
FIG. 1 shows a system overview of a platform based implementation of the invention.

FIG. 1 shows a preferred system overview 100.

The embodiment according to FIG. 1 contains four basic modules: a data-gathering module 102, an updating/calculating module 104, a storing module 106 and a retrieving/reporting module 108.

It is advantageous to perform a gathering of environmental data, especially of environmental performance data and—resulting—environmental impact data for different carriers.

The described example contains the names of several existing and operating transportation and logistic companies like DHL Express and DHL Danzas Air and Ocean. Examples of information technology production systems are: Rasti, NPS, +2000, Exact, LOGIS R and LOGIS C.

These names are only used to show, that the invention can be carried out with different carriers. The names of the carriers do not limit the scope of the invention. It is possible to carry out the invention in any transportation system, respectively any information technology production system.

The gathered data are transferred to module 104 for updating and/or calculating the environmental data.

A calculation is performed with regard to respective parameters.

The updated and/or calculated data are transferred to a storing module 106.

The storing module can be implemented in different configurations.

The depicted Implementation shows a preparation of an emission report 110 according to the stored data.

This implementation is especially advantageous to inform users of the transport system about the environmental impact of transport.

However it is also possible to use the stored data for one or more of the described routing and/or transportation processes.

Therefore, it is especially advantageous to implement at least a part of the stored environmental data in a logical node or a computer connected to a physical router.

It is even more preferred to use the stored data for the routing and/or transport as well as for the retrieving and/or report as it is described in the right part of FIG. 1.

The data retrieving and/or report allow reports for each transport process as well as periodic reports 112. The reports can be analyzed according to one or more of the following categories: Client, customer id, transportation (e.g. km, ton, tonkm), country, period of time, different emissions, energy use or shipment.

Especially advantageous is a flexible report out take with parameters chosen individually. Examples could be for specific relations, listing of euro classes of transportation means.

Within preferred embodiments the environmental data are incorporated into the routing mechanisms in order to make the corresponding routing decisions. Furthermore, a mechanism is advantageous to be able to track the packages.

A transport system like a mail delivery system can use the environmental data to internally sort and distribute letters and packages to the correct truck for delivery. The size, due date etc. of each letter and package are determined.

Furthermore, an appropriate truck is identified by comparison between ecological requirements of the transport and environmental performance data of the truck.

Alternatively another preferred embodiment of the invention includes flexible mechanisms meaning that we promise to some where in the transport system to transport the agreed transport volume. This might change if alternative fuels and trucks are capable of using them are easily available.

Information about the environmental requirement data is used to accompany the letter and package and to deliver the package to the correct destination. It is also possible to add environmental requirement data to each letter and package. However, in this case scanners are needed.

Externally the same mechanisms may apply. Whereas the letters and the packages are distributed via other networks, the environmental requirement data may accompany the letters and packages via any appropriate communication network as for example the Internet. This environmental requirement data is then used to make routing decisions.

A further implementation of the invention relates to a computer integrated manufacturing company. In a computer integrated manufacturing company the routing of construction parts and tools may be done with regard to environmental requirement data and/or environmental performance data.

Once the size, the due date/time, the environmental impact data and the destination are determined, a communication packet that takes care of the routing accompanies the construction parts and tools.

Weighted fair queuing may be used to speed up and delay at least one leg of transport process.

Through flow control mechanisms it is possible to adapt parameters, especially transport capacities of the transportation system to the need of the users.

If the goods can be separated, segmentation and from time to time a reassembly may be executed. The segmentation is for example performed at the sending station or at one or more of the mechanical routers.

The different packages which are transported have different sizes, masses and should meet different needs. The different needs are most preferably reflected in special Quality Of Services (QOS) mechanisms. QOS specifications are for example environmental performance data of the transport means, and/or a fast or a secure delivery. Most preferably the QOS specifications are categorised, for example according to special categories, which represent for example goods which have to be handled according to specific environmental requirement data.

The environmental requirement data are an example of especially advantageous quality of service specifications.

However it is possible that further aspects are used for the quality of service, for example a desired speed of transport.

Though the invention can be carried out without usage of protocols some implementations of the invention can be further improved by implementing protocol mechanisms.

The protocol mechanisms can be used to do traffic management. For example in case of congestion, a routing protocol could determine, especially in real-time, a different route and router the car by sending signals to the receiver in the car. An interface from the router to a traffic control system is used.

In the following the invention will be described by different concepts with different connections between actual machines and routing network.

The environmental data according to the invention especially the environmental impact data, the environmental requirement data and the environmental performance data can be implemented in various ways into the transportation procedure.

As described it is especially advantageous to implement environmental data into the routing of the objects. However it is as well possible to use the environmental data for planning the transport process and/or for calculating the environmental impact of a certain transport.

It is especially advantageous to include environmental data into the route planning tools is especially advantageous for a comparison between different modes of transports or linked to geographical restrictions/concerns e.g. in especially polluted areas.

For example it is possible to perform routing processes to guaranty that a certain environmental quality is maintained.

For example it is possible to perform the routing in a way that the transport processes fulfill certain criteria.

Such criteria can be derived from customer based directives and/or directives implemented by law and/or official actions.

For example the routing processes are fulfilled in a way that the following directives of the European Union are fulfilled:
1. Framework Directive 96/62/EC on ambient air quality assessment and management.
2. first Daughter Directive (1999/30/EC) relating to limit values for NOx, SO2, Pb and PM10 in ambient air.

3. second Daughter Directive (2000/69/EC) relating to limit values for benzene and carbon monoxide in ambient air.
4. third Daughter Directive relating to ozone.

If the route planning concerns one mode only e.g. truck transports, its' objective goes hand in hand with environmental concern. Higher efficiency means lower environmental impact per shipment.

It is possible to use more centralized implementations of the inventions.

More centralized versions of the invention include central planning and/or stearing of transport and/or calculation procedures.

However it is also advantageous to use decentralized implementations of the invention.

Such decentralized implementations of the invention can for example be carried out in the following way:

The invention especially covers the following embodiments:

separating the goods flow of ordinary shipments and environmentally friendly shipments. This requires an at least partly parallel system.

Implementing "green shipments" which build on flexibility that is the shipment itself may be transported using ordinary routines but somewhere in the transport system a corresponding volume is transported in a "green way".

Environmental requirement data accompany the physical objects. This is for example possible by adding digital information to the physical objects, for example by printing codes and/or writing information to transponders.

The physical routers are connected to a database which contains environmental performance data of transport means which are accessible by the routers.

Examples for different transport means for one router are different trucks that operate from a cargo center.

Examples for accompanying the physical packages with logical packets are labels or transponders attached to the physical objects.

The labels and/or the transponders may contain a various data suitable for logistic processes.

Examples for these data are identification information about the physical object, a delivery address, a sender address and charging relevant information as for example digital franking marks.

Especially advantageous implementations of the current invention propose to add to this data environmental data, for example environmental impact data and/or environmental requirement data.

Whenever a physical object is received in a router, the router informs the machine on what to do and waits for a confirmation that the actions have been executed.

The embodiments described above can be combined with each other or with any of the embodiments described before.

The described examples of transportation systems that are designed and/or operated according to the invention show that the invention can easily be adapted to other transportation systems. Therefore the invention is not limited to a special transportation system.

The invention furthermore relates to methods for processing postal deliveries as letters, parcels and packets, transport pallets or transport containers.

A preferred embodiment of the invention involves a detection of information present on at least one surface of the physical object in such a way that, on the basis of the information present on the surface of the physical object, environmental data, for example environmental requirement data is used for the routing and/or for analysis and/or representation and/or for a compensation by transporting a corresponding volume in a "green way" that means with less impact on the environment.

An example of the implementation of the environmental data is a direct printing on the physical object. However, it is also possible to first print a medium, for example, a label, and to subsequently apply it onto the physical object.

This is advantageous to increase customer satisfaction and realization of the green shipment. It is possible but not necessary to use the environmental data for any sort of sorting or routing purposes.

The neutralization of the emission will in one advantageous implementation be done through compensation rather than reduction at the source. This is especially useful for air shipments where at the moment no alternative fuels are available.

The term "environmental data" is by no means to be understood in a limiting fashion and especially comprises all depictions of data in an optically recognizable and/or machine-readable form that can be used for sorting, transporting or delivering the physical object.

An especially advantageous embodiment of the method is characterized in that the physical objects are processed within the scope of a two-stage process, whereby the physical objects are already completely coded in the source region and undergo preliminary sorting according to target regions in a first sorting step.

In an advantageous embodiment the physical objects undergo fine sorting into smaller units in another sorting procedure.

Moreover, it is advantageous for the environmental data, for example the environmental requirement data, to be applied onto the physical object as a barcode.

In any case it is simultaneously appropriate to include the environmental data, for example the environmental requirement data in a transponder which is attached to the physical objects or a transport unit containing the physical objects.

The coding, or the labelling, is preceded by determination of the environmental requirements in which the environmental impact data are found on the basis of the recognizable environmental performance data by means of linked files from the data, including a conversion file.

The invention also comprises a device for processing physical objects.

Additional advantages, special features and practical refinements of the invention ensue from the sub claims and from the following presentation of preferred embodiments of the invention making reference to the drawings.

Afterwards an especially advantageous implementation of the invention is described as an ACCEPT-Implementation.

The preferred ACCEPT-Implementation includes an Automatic Customer Calculation of Environmental Performance Tool.

The idea of ACCEPT is to produce Emission reports for customers and operators. Those reports will describe the amount of Emissions a specific customer's shipment has produced for a specific period.

In order to facilitate the explanation of the ACCEPT-Implementation of the invention the following definitions are used:

Definitions

| Term | Explanation |
| --- | --- |
| ACCEPT | System used to calculate emission values, especially a database which contains |

| Term | Explanation |
|---|---|
| | Shipments, Transports, Emissions, Customer information and Distances for all source systems and all periods. |
| FuelMixID | The definition of a specific usable mix of ingredients used by a vehicle |
| ProductID | The ID for a Shipments Product. Ex Stycke, Parti, Exact. |
| T-Web | Transporters-Web, external system for handling operators and vehicles |
| Volume Weight | The weight for a shipment |
| City-to-city | City-to-city, postal code-to-postal code, Air terminal-to-air terminal or any combination |
| VehicleType | A type of vehicle used when we don't know which in divide that was transporting the shipment. |
| Operator | The organization or company that is transporting the shipment. |
| Node | One point to calculate a distance from. |
| Leg | A distance between two Nodes. |
| CoSP | One of the Shipment data providers used for ACCEPT. |
| EmissionValue | The amount of an emission of a specific type that is produced when a specific amount of a specific FuelMix is consumed. |
| Shipment | the total transportation service bought by the customer, the transportation of goods from location A to location B |
| Transport | the transport work done by a vehicle used for one leg in the shipment. |
| Leg | the smallest part of the shipment in the transport chain, the part where the same vehicle has the transported gods as its load, e.g. between two terminals |
| Vehicle | the means of transportation used, e.g. air plane, lorry, distribution van etc. |
| Parcel | the smallest defined part of the total shipment bought by the customer |
| Super user | An internal user with better access to the functions within the system and who should function as 1:st line support for all users, within a country. |
| Internal User | DHL user who not is a Super user, limiting the access rights in ACCEPT |
| External User | Any user who is not Super user or Internal user, further limiting the access rights in ACCEPT |
| Volume Weight | A calculation of the "cost" in the transport chain for this shipment from the customer. The value is a combination of the weight and the volume and is also used for setting the price to the customer. |
| Max Load Weight | The maximum weight carried by a vehicle, used together with Volume Weight to define the shipments part of the available capacity. |
| Fill Factor | A value defining to what extent the available capacity is used, also called Utilization Factor. Given as a percentage of the total capacity e.g. 74% fill factor declares that the vehicle is 26% empty. |
| Fixed Emission Value | In some calculations e.g. calculation Air emissions, there is a fixed emission value independent of the distance e.g. take off and landing |
| Variable Emission Value | In all calculations, there is an emission value totally depending of the distance. |
| Distance | The amount of kilometers the shipment is transported. |
| Fuel Consumption | The amount of fuel used per distance unit, normally liters per kilometer. Used for calculating the base fuel consumption for a shipment. |
| Utilization Factor | see Fill Factor. |

The ACCEPT system is for example useful to calculate emissions for shipments. The calculation is performed, in brief by multiplying the distance, weight and the emission values for a specific engine model. One instance of ACCEPT is meant to serve one country's all shipments, domestic, international, air and so on.

Distance Calculations

The system calculates the distance for a shipment in different ways:
1. City-to-city distance.
2. Terminal distance plus pickup and distribution distances.

The method to use is chosen by the ProductID term in the Shipment.

The fuel consumption, max load weight and fill factor for a vehicle and operator is imported from an external system, which is for example called T-Web, or set to a default value defined by ACCEPT. The fuel consumption for a specific shipment can be set in one of three values.

| Quality level | Description |
|---|---|
| Vehicle-fuel consumption, max load weight, fill factor and engine model | If we know which vehicle that transported the shipment and the vehicle is registered in T-Web then use data from the vehicle |
| Operator-fuel consumption, max load weight, fill factor and engine model | If we know which operator that transported the shipment and the vehicle is registered in T-Web then use data from the operator |
| Vehicle type-fuel consumption, max load weight, fill factor and engine model | If we do not know, vehicle nor operators then use data from a default vehicle type. This type depends on which type of transport that is performed, e g city-to-city, terminal, distribution or pickup |

Emission Calculations

This section describes the different ways to calculate emissions for shipments.

Exact $$Factor = VolumeWeight/(MaxLoadWeight*FillFactor)$$

$$TransportEmission = FuelConsumption*LegDistance*EmissionValue*Factor$$

$$ShipmentEmission = TransportEmission + n1$$

Stycke, Parti, Air Express and International $$Factor = VolumeWeight/(MaxLoadWeight*FillFactor)$$

$$TransportEmission = FuelConsumption*City-to-city-distance*EmissionValue*Factor$$

$$ShipmentEmission = TransportEmission$$

This embodiment relates in general to the field of transport routing system. More particularly, this aspect of the invention relates to an extensible model system architecture for integrated material and environmental data planning, and integrated transport and distribution planning.

Manufacturers and distributors commit to time critical transport and delivery of goods as a regular part of their operation. Often, the transport and distribution transport is complex, having many different material and environmental data constraints that simultaneously affect the implementation of the transport.

Due to the complexity of the transports, many different software tools have been developed to implement environmental data.

This preferred aspect of the invention provides an extensible model architecture for a transport routing system that allows an implementation of environmental data in the transport process.

More particularly, in one embodiment, the present invention provides a computer central control computer for modeling a transport capability on a computer. The central control computer is programmed with software and comprises an operation model type for defining a plurality of operation models. Each operation model represents activities that relate to the transport of the physical objects.

A resource model type is used for defining a plurality of resource models. Each resource model represents environmental data available for use in performing an activity and rules for allocating environmental data to the activity. An environmental data type is for defining a plurality of environmental data sets. Each environmental data represents rules for controlling a transport route of material between locations.

The operation model type, environmental data type, and resource model type each comprise a plurality of fields defining attributes. The plurality of fields includes a plurality of extension selector fields that each allows a user to specify one of a plurality of extensions that augment a model with additional fields and semantics. The model type specifies a base set of fields and semantics which includes fields that select extensions that specify additional fields and semantics that can be added to a particular model.

These measures allow handling different environmental data.

Examples for the environmental data are environmental requirement data, environmental performance data and environmental impact data.

The term environmental data is used for each of these types of data.

The environmental requirement data are data concerning and/or implementing desired or required economic standards.

The environmental requirement data are for example: Requirements concerning a desired level of emissions and/or another influence on the environment.

These data can be related to different aspects of transport.

For example it is possible to define that a single transport has to be emission neutral or that all transports of a customer together has to be emission neutral, or that a certain level of air or water quality is maintained in a place, a city, a region, a country or in total.

Environmental performance data describe the ability of a means to perform a task in relation to an environmental impact. An example for this is the capability of a truck to transport a certain amount of physical objects with specific parameters—especially weight and size—with a certain emission. For example the relation between ton, kilometers and carbon dioxide emissions. The invention further includes means with a positive effect of the environment, especially devices for reducing the content of hazards components in the air.

The invention proposes a complex database with knowledge information about interdependencies between different parameters and therefore allows to minimize an effect to the environment.

The invention allows to handle this with a multiparameter approach with detailed information about the ecological efficiency of transport means and parameters to influence this ecological influence, for example by using biofuel.

The presence of a field in a model is preferably dependent upon a value of another field in the model. Defined operation models, environmental data, and resource models are stored as nodes in an interrelated transport network model. The transport network model is formed by a plurality of operation models each specifying environmental data from which material is transported and environmental data to which a physical object is transported and specifying resource models having environmental data used in performing the activity specified by the operation model. In this manner, both transport and environmental data usage are simultaneously represented along with timing constraints between activities. According to the present invention, to model a plan for a transport, a plan network model is constructed upon the transport network model. An operation-plan model type is used to define a plurality of operation-plan models. Each operation-plan model represents a plan for performing an activity represented by an operation model. A resource-plan model type is used to define a plurality of resource-plan models. Each resource-plan model represents a planned usage of environmental data represented by a resource model.

In one preferred embodiment an operation-plan model type is used to define a plurality of operation-plan models. Each operation-plan model represents a planned transport route of a physical object represented by an environmental data element. A plan network model is formed by a plurality of operation-plan models each specifying resource-plan models planned to be used in performing the activity specified by the operation-plan. The nodes of the plan network model are built upon and refer to the nodes of the transport network model. According to the present invention, the transport network model represents possibilities of what can be done, and the plan network model represents that which is planned to be done. According to one aspect of the present invention, each model type has one or more extension points that may be used to extend the basic model type in order to support the information needed to create the user defined models. For each extension point, a user may select an appropriate extension to model a particular aspect of the user's system. According to another aspect of the present invention, several elements of a user's transport model may share data in a hierarchical fashion referred to as families.

One model inherits all of the data of the parent model unless it is specifically overridden by a designation in the model. A central control computer implementing the teachings of the present invention may provide for date affectivity of models using the families feature. It is a technical advantage of the present invention to use extensions to define the elements of the transport or system being modeled because it reduces the amount of data that needs to be stored in a memory device without reducing modeling power. According to the teachings of the present invention, data for each element of the modeled transport is stored at a node of a user model or transport network model. The data stored at a node comprises only the data for the fields corresponding to the extensions that are selected by the user. The system does not store a zero quantity for each 60 field not chosen by the user. Therefore, the use of extensions reduces the size requirement for a memory device in a system implementing the present invention. The central control computer of the present invention can be, but not necessarily, implemented using object oriented programming. Use of object oriented programming supports simultaneous use of multiple types of models for the different elements of the planning problem.

In one embodiment, the present invention provides a software based computer system for modeling various transports. For example, the computer system may model a transport means used to transport a particular physical object or product. The central control computer may also be used to model a product distribution channel, a supply chain, or an order fulfillment transport.

In a preferred embodiment a transport is modeled using three primary model types: an operation model type, an environmental data element type, and a resource model type. A plan for that transport is similarly modeled with three associated primary model types: the operation-plan, environmental data-plan, and resource-plan. A user uses a model type as a template to create a model. For example, an environmental data element type is used to create a model of environmental data. Each of these user defined models is stored as a node in a transport network model of a user's transport. The model types used by the system are extensible in that each model type may have one or more extension points that allow a user to customize the model to represent the user's transport. For each extension point, a user may choose from numerous extensions the one that is best suited to define a particular aspect of the user's system or transport. Each model type has a list of predefined extensions from which the user may choose. Each extension defines fields that extend the data and meaning associated with a model type. These extensions and fields define the way in which the model types interact. Each user defined model is defined by a model type, one extension for each extension point of the model type, and data for each field of the model type and extensions. Possible features of each of the model types are discussed in detail below.

The Operation Model Type may be used to create operation models which represent activities that can be performed. As used herein, "operation model type" means a general model for activities that may be modeled by the software. "Operation mode" and "operation model" are used interchangeably to represent a specific operation defined by a user using the operation model type. This convention is also used with respect to resources. An operation model type models a transport, activity, or action that transforms or moves physical objects resulting in a transport route.

Operations may require resources with specific skills. Those resources model may include transportation and/or storage.

An operation can use any number of resources, with different run times, and with staggered start and end dates. Thus, a single activity or a whole series of activities can be modeled with a single operation. This is important for having sufficient flexibility to model diverse activities. A preferred embodiment of the invention allows a routing to be modeled as simply a particular kind of operation that consists of other operations that are run in sequence. The relationships between those sub-operations can be different depending upon the chosen extension.

So, an operation can model a simple routing (a sequence of operations allowed to spread), a transport route routing (a sequence of operations which must transport route into one another), a set of operations that can be run at the same time, alternates (a set of alternate operations), and other combinations. Further, since routings are modeled as operations, they can be put in other operations.

For example, a simple routing operation may consist of different operations, called legs.

An operation can also model simply the environmental impact data for transporting a physical object (operations that just model the transform of physical objects, but do not model the environmental data required to do that).

Similarly, an operation can model simply the environmental impact data for transporting a physical object.

Other operations can then combine the environmental impact data with operations that properly consume environmental data.

For example, some transport software defines operations such that resources can be loaded just during portions of transport time. For ease of interfacing such packages or databases, transport extensions can be provided with the identical specification. That transport generates a routing-like operation containing auto-generated sub-operations that contain the different phased resource loadings.

An advantage of the operations model type design is simplicity and consistency. By providing a simple building block that is extensible and can be flexibly combined with others, a great deal of modeling capability is provided without complicating the common simple cases. In this way, the critical operations and resources can be modeled in adequate detail and time.

A user may select an extension from the operation model type to, for example, define a transportation model.

This model may contain a predetermined, constant time for loading material, followed by a run time which is a factor that is multiplied by the quantity of material that is being transported, followed by an unload run time which is constant. The load, run, and unload phases may each require use of different resources.

Operation models represent activities that consume supplies, transport physical objects, and/or utilize environmental data. Such operation models define the activities and precedence (timing) constraints in a transport. In transport, a sequence of operations is referred to as a routing. A routing is represented as an Operation model with a routing extension which defines the behavior of that operation to be a sequence of other operations. Similarly, the specification of alternate resources, alternate operations, and alternate routings can be done with an operation model and an extension which defines the behavior of that operation.

A resource model type may be used to create resource models which represent aspects of a transport that have predetermined environmental data. For example, a resource model may represent resources in a transport process. A resource model may represent a transport means such as an airplane, a ship or a truck, thus implementing the environmental impact data of a transport that has a predetermined environmental data limitation (such as carbon emission).

The resource model type may provide various extensions from which a user may choose to define an actual environmental data constraint on its transport. For example, a simple extension may only have a single field setting a maximum environmental data constraint. Such a resource model may, for example, represent a truck which has defined environmental impact data.

The environmental data type is used to create environmental data which manage physical objects transported in the modeled system. In other words, an environmental data element represents the management of a particular physical object.

Additionally, the environmental data type may have an extension that defines ordering policies.

A transport network model is a set of user defined models which may be stored in a computer memory. The stored nodes define, for example, the user's transport which is to be used to manage a particular. A user defines a level of desired environmental impact data by selecting model types and the appropriate extensions of these model types, as described above, to form models of the elements of the users' transport.

The nodes in transport network model may be connected together in many different ways to achieve different results. Transport network model represents all of the possible interconnections between starting place and destination of the transport of the physical objects.

A preferred transport network model represents the possible routes that material may be transported according to a route in a transport to be modeled. The central control computer of the present invention uses the information in a transport network model to create plans for implementing a particular material transport route path to model a transport. The interconnected nodes of the transport network model used to represent a particular plan may be referred to a as a plan network model or plan.

The central control computer according to the present invention may create a plan network model as a result of several different events. In general, a plan network model provides definitions as to quantities and timing for elements of the model. For example, the inventory level for a physical object managed by a particular environmental data may drop below an allowable level.

The central control computer may create a plan network model for replenishing the inventory of that environmental data. Alternatively, a plan may be created using the transport network model in response to customer orders. The central control computer of the present invention may create a plan network model as follows. For each activity in a user's transport, the central control computer creates an operation plan model from an operation-plan model type using extensions from the corresponding operation model. The system provides the operation plan model with the start and end dates, alternate selections, and other information needed to form a plan for a particular execution of that operation.

For each resource model that is used by an operation plan, the central control computer creates a resource plan model from a resource-plan model type and the extensions corresponding to the resource model. The system provides the resource plan model with all of the environmental data reservations placed on it by the operation plan models. For each environmental data according to which physical objects are transported or to which physical objects are transported by an operation plan, the central control computer creates an environmental data plan model from an environmental data-plan model type and the extensions of a corresponding environmental data. The system provides a plan model with inventory levels, ordering policies and any other information needed to plan the management of the transport route of physical objects in the transport.

Preferably the central control computer functions as system for modeling a transport capability for use in a transport routing system, the central control computer comprising: a plurality of operation models defined from an operation model type and stored by the computer system, each operation model representing an activity that can be performed by a transport; a plurality of environmental data defined from an environmental data element type and stored by the computer system, each environmental data element representing rules for controlling a transport route of material between activities, the activities represented operation models; the operation model type and environmental data type each having a plurality of fields defining attributes.

In an advantageous implementation the central control computer operates with a transport network model, stored by the computer and interrelating the operation models.

The transport network model can be formed by the plurality of operation models, each specifying environmental data according to which material is transported.

A material usage is preferably represented by the transport network model along with timing constraints between activities.

In a preferred embodiment the transportation system, especially the central control computer steering the system, further comprises: a plurality of resource models defined from a resource model type and stored by the central control computer, each resource model representing environmental data available for use in performing an activity and rules for allocating capacity to the activity, the activity represented by an operation model; the resource model type having a plurality of fields defining attributes; the transport network model further interrelating the resource models as logical nodes.

The transport network model may further be formed by a plurality of operation models each specifying resource models having environmental data used in performing the activity specified by the operation model; such that both material and environmental data usage are simultaneously represented by the transport network model, preferably but not necessary along with timing constraints between activities.

The central control computer is for example a computer with a database for storing environmental data and with interconnections to sensors and/or other computers capable of handling sensor data. Preferably the central control computer is coupled with means for implementing environmental data.

It is for example possible to connect the central control computer to at least one other computer which allows user to define values for environmental data.

It is advantageous to sign different user rights to different users and/or different types of users.

For example a customer is capable of define requested environmental data.

This allows for example a user to choose his own level of desired ecological quality of his transport, for example choosing zero-emission transport.

It is furthermore advantageous to assign other rights to other types of users.

It is for example possible to allow operators of the systems to implement a handling with regard to environmental data. This handling is for example bases upon ecological standards defined by competent authorities.

It is furthermore advantageous to implement an environmental data type wherein the environmental data type has an operation that defines how data managed by an environmental data element is stored. It is furthermore advantageous that the environmental data type has an operation that defines how material is received into an environmental data element.

It is further preferred that the central control computer comprises a plurality of resource models defined from a resource model type and stored by the computer system, wherein each resource model represents environmental data available for use in performing an activity and rules for allocating capacity to the activity, the activity represented by an operation model; wherein the environmental data type includes an operation that defines how material managed by an environmental data element is stored.

The specified operation model contains information about the operation that defines how physical objects are transported or supplies are handled.

Each operation model may specify another operation and each environmental data element may specify an environmental impact factor.

The usage of environmental data that may specify a range of dates during which the model is effective.

A preferred embodiment further comprises a computer for modeling transport capability.

Advantageously the central control computer comprises:
a data storage device operable to store data relating to a model of transport capability;
an execution memory operable to store data and coupled to the data storage device and
a plurality of operation models defined from an operation model type, each operation model representing an activity that can be performed by a transport
a plurality of environmental data defined from an environmental data element type, each environmental data representing rules for controlling a transport route of material between activities, wherein the operation model type and environmental data type each have a plurality of fields defining attributes;
a transport network model interrelating the operation models, the environmental data, and the resource models as nodes, wherein the transport network model is formed by a plurality of operation models each specifying environmental data according to which material is transported, such that material usage is simultaneously represented by the transport network model along with timing constraints between activities.

It is further advantageous to utilize a plurality of resource models defined from a resource model type, each resource model representing environmental data available for use in performing an activity and rules for allocating environmental data to the activity; the resource model type having a plurality of fields defining attributes; the transport network model further formed by the plurality of operation models each specifying resource models having environmental data used in performing the activity specified by the operation model; such that both material and environmental data usage are simultaneously represented by the transport network model along with timing constraints between activities.

A preferred embodiment of a method for modeling a transport further comprises an evaluation of capability for use in transport routing system on the computer system, the method comprising: defining a plurality of operation models from an operation model type, each operation model representing an activity that can be performed by a transport; defining a plurality of environmental data from an environmental data element type, each environmental data representing rules for controlling a transport route of material between activities, the activities represented operation models; and interrelating the operation models and the environmental data as nodes in a transport network model; the transport network model formed by the plurality of operation models each specifying environmental data from which material is transported and environmental data to which material is transported; such that material usage is represented by the transport routing system on the computer system.

The preferred embodiment of the method further comprises a plurality of operation models each specifying environmental data from which material is transported and environmental data to which material is transported; such that material usage is represented by the transport network model along with timing constraints between activities.

This preferred embodiment further comprises: defining a plurality of resource models from a resource model type, each resource model representing environmental data available for use in performing an activity and rules for allocating supplies to carry out transport processes.

Advantageously, the activity is represented by an operation model which interrelates the resource models as logical nodes in the transport network model.

The transport network model may further formed by the plurality of operation models each specifying resource models having environmental data used in performing the activity specified by the operation model; such that both material and environmental data usage are simultaneously represented by the transport network model along.

Figure 2:
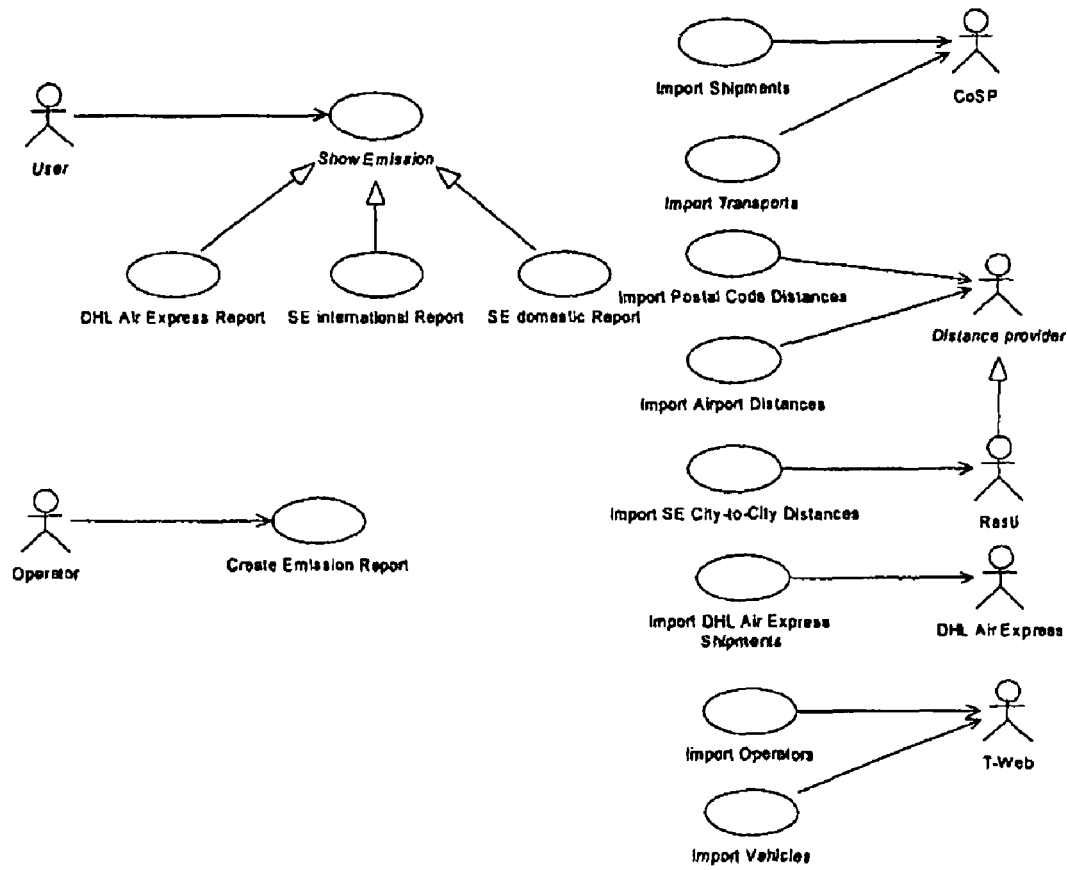
FIG. 2 shows a functional view of implementations according to a preferred embodiment of the invention.

A functional view 200 of implementations according to the ACCEPT system is depicted in FIG. 2.

Functional View

|  | Description |
| --- | --- |
| Role |  |
| User | Abstract user that is interested in an Emission Report |
| Operator | The operator of the ACCEPT system |
| CoSP | Provider of National shipments |
| T-Web | Provider of National road operators and vehicles |
| DHL Air Express | Provider of air shipments |
| Rasti | Provider of city-to-city distances |
| Distance provider | Abstract distance provider |
| Use-Case |  |
| Show Emission | Abstract Emission report |
| DHL Air Express Report | Report for Air Express shipments |
| SE international report | Report for SE international shipments |
| SE domestic report | Report for SE domestic shipments |
| Import shipments | Imports shipments from CoSP |
| Import transports | Imports Transports from CoSP |
| Import postal code distances | Imports International postal code distances (not impl.) |
| Import Airport distances | Imports Airport distances (not impl.) |
| Import SE city-to-city distances | Imports SE city-to-city distance from Rasti |
| Import DHL Air express shipments | Imports DHL Air express shipments |
| Import Operators | Imports SE road Operators from T-Web |
| Import Vehicles | Imports SE road Vehicles from T-Web |

Figure 3:
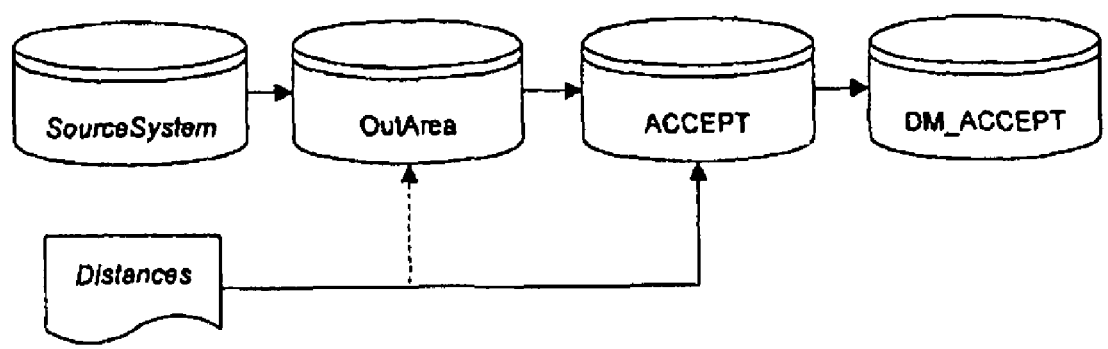
FIG. 3 shows advantageous databases for carrying out the invention.

Advantageous databases for carrying out the invention are depicted in FIG. 3. The system shown in FIG. 3 is generally referred to by the reference number 300. The following table contains examples of these databases.

| Database | Description |
| --- | --- |
| Distances | Different distance providers |
| Source system | The Shipments and Transports provider (CoSP, DHL Air Express) |
| OutArea | An inter-storage area where the Source system places the exported Shipments and Transports for the period to be calculated. From this area ACCEPT reads the generic tables ACCEPT_Shipment and ACCEPT_Transport. |
| DM_ACCEPT | The Data mart for ACCEPT. Contains the aggregated rows on a Customer for a period, emission and product type. |

Execution Order to Create Reports

The table Parameters in ACCEPT contains run parameters for ACCEPT. The parameter Period is used to set the month for which a report will be created by the stored procedures.

Representation of how the data is imported from the production systems, calculated and moved to the reporting database by the use of stored procedures; is described afterwards in more detail.

The following table describes the execution order to create different reports.

| D | I | AE | SP Name | Description | DB | Tables |
|---|---|---|---|---|---|---|
| 1 |   |   | spOut-Shipment Transport | Copies Shipments and Transports from DWH xFile and Transport to OutArea (Source system ID = 1) | DWH OutArea | xFile Transport ACCEPT_Shipmeny ACCEPT_Transport |
|   | 1 |   | spOut_SE_INT_Shipment-Transport | Copies Shipments and Transports from DWH xFile and Transport to OutArea (Source system ID = 3) | DWH OutArea | xFile Transport ACCEPT_Shipmeny ACCEPT_Transport |
|   |   | 1 | spOut_SE_AE_Shipment-Transport | Creates Shipments and Transports from SE_Inbound and SE_Outbound. SE_Inbound and SE_Outbound are currently loaded by a DTS package that is loading an Access database, se Imports section. | OutArea OutArea | SE_Inbound SE_Outbound ACCEPT_Shipment ACCEPT_Transport |
| 2 | 2 |   | spLoad-Shipment | Copies Shipments from Out Area to ACCEPT | OutArea ACCEPT | ACCEPT_Shipment Shipment |
|   | 2 |   | spLoad_SE_INT_Shipment | Copies Shipments from Out Area to ACCEPT | OutArea ACCEPT | ACCEPT_Shipment Shipment |
| 3 | 3 | 3 | spLoad-Transport | Copies Transports from Out Area to ACCEPT | OutArea ACCEPT | ACCEPT_Transport Transport |
| 4 | 4 | 4 | spDMPrepare Load Shipment | 1. Creates tmpTransportDist with distances for all transports 2. Creates tmpVehicleEm with emissions for all Vehicles, VehicleTypes and Operators | ACCEPT ACCEPT | Shipment, Transport, Emission tmpTransport Dist tmpVehicle Em |
| 5 | 5 | 5 | spDMLoad Shipment | Aggregates Shipments from ACCEPT to DM_ACCEPT | ACCEPT DM_ACCEPT | Shipment, Transport, Emission tmpTransport Dist tmpVehicle Em F_Shipment |

D = Domestic,
I = International,
AE = Air Express,
Bold = target table or database

Stored Procedures for Loading of Code Tables

| SP Name | Description | DB | Tables |
|---|---|---|---|
| spRun | Example used to execute Swedish domestic for specific months | All | All |
| spLog | Sp that used to add a row to the xLog | ACCEPT | xLog |
| spLoadOperator Vehicle | Loads operators and vehicles from the T-Web tables | OutArea ACCEPT | ACCEPT_Vehicle ACCEPT_Operator Operator Organisation Vehicle |
| spLoad-NodeLeg | Loads Nodes and Legs from OutArea to ACCEPT | OutArea ACCEPT | ACCEPT_Node ACCEPT_Leg Node Leg |
| spLoadCustomer | Loads customers from OutArea | OutArea ACCEPT | ACCEPT_Customer Customer |
| spLoadCity-City | Load city-to-city distances from ImpCityDistances to Leg and Nodes. ImpCityDistances is a distance tabled loaded from Rasti. | ACCEPT ACCEPT | ImpCityDistances Node Leg |

Imports to ACCEPT

Figure 4:
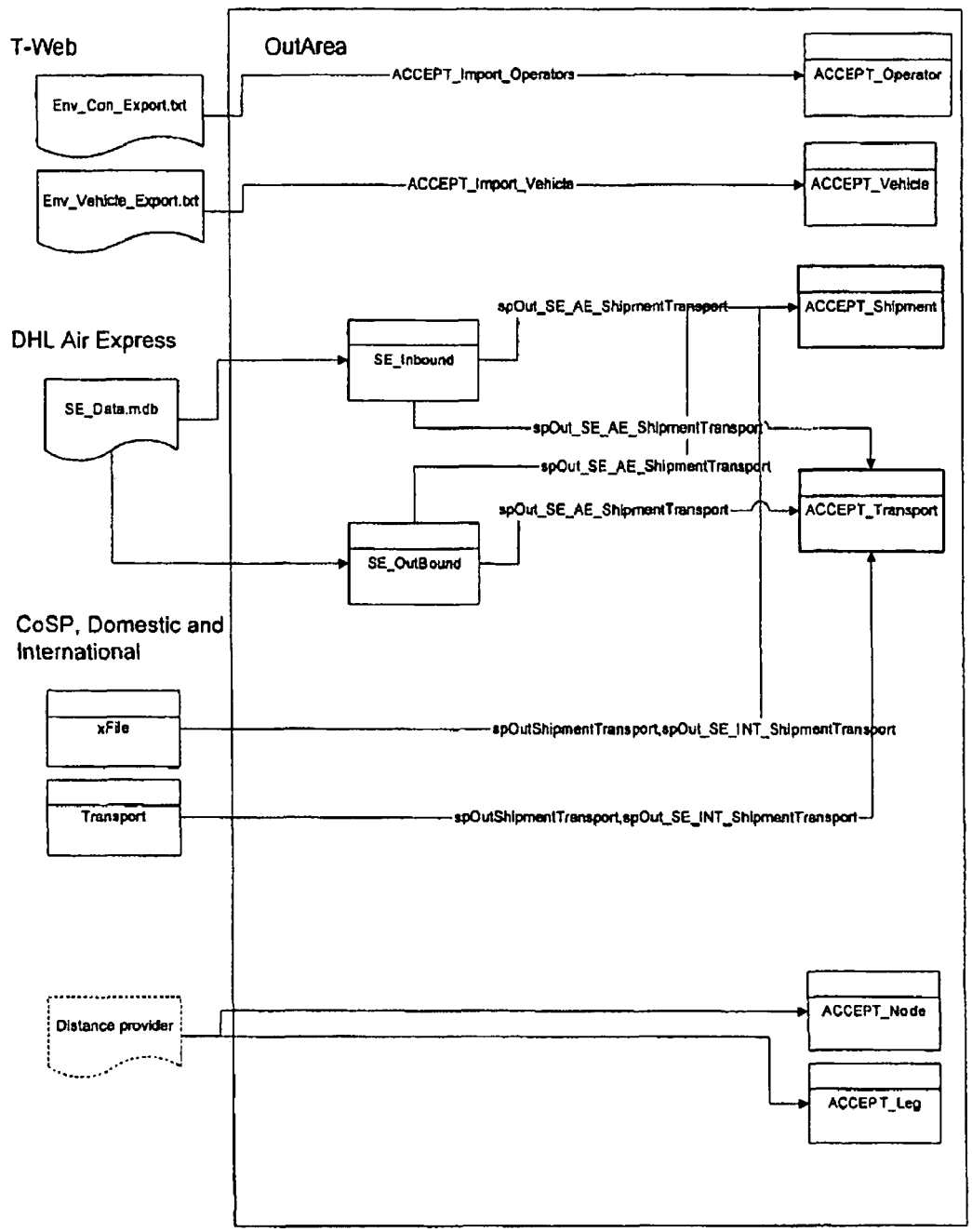
FIG. 4 shows a preferred import of files and tables in a system according to the invention.

FIG. 4 shows a preferred import of files and tables in a system 400 according to the invention. FIG. 4 describes what files and tables are imported to ACCEPT from different source systems.

How to Add New Source Systems

Preferred steps to add a new Source system to ACCEPT are described below:
1. Create a stored procedure that imports Shipments and Transports to the tables ACCEPT . . . Shipment and ACCEPT . . . Transport. Se spOutShipmentTransport as an example.
2. Decide which type of distance calculation you need to perform. City-to-City or Terminal-pickup-distribution calculation.
3. To add a new product type and assign it to a distance calculation type, it is advantageous adding a Transport stored procedure to spLoadTransport.sql that handles the added product type.

How to Add a New Country

A first preferred embodiment of the ACCEPT-system handles data for one country e.g. Sweden. To add a new country it is useful adding a completely new instance of ACCEPT database and DM ACCEPT database it is useful to add. ACCEPT database for Sweden growth approximately 2 gigabyte per month excluding distances, emissions, operators and vehicles.

| Physical object | Description |
|---|---|
| Handling of historical data | Historical data can be handled. It should preferably be used to just remove rows for current period and product id. |
| Automatic production | To maintenance and run the system, many jobs, scripts, and ftp-connections must be created. |
| Operational interfaces | Operational interfaces are created in advantageous implementations of the invention. |

Afterwards calculation methods for a transport emission report according to the invention are described in detail:

Transport Emission Report—Calculation Methods

The described calculation methods and general data allow different ways of calculating environmental performance of cargo forwarded.

General Description of the Calculations

The ACCEPT system calculates the environmental performance of each cargo shipment handled by a transport carrier, which is afterwards without limitation named DHL. A calculation is performed for each relocation carried out during the transport of a shipment through the DHL transport system. The result from each relocation is then summarised in order to answer different questions, e.g.
   total emissions for a specific piece of cargo
   total emissions for all transports for a customer during a selected time period Definition of Cargo Cargo data is obtained from the information systems of DHL. The data for the transported weight is used as the base for the calculations. This means that the environmental performance of each relocation is related to the weight of the investigated shipment/goods.

The weight is given as the volumetric, or dimensional, weight. This means that the physical weight of the shipment is used if the density of the shipment exceeds 250 kg/m3. Otherwise the volumetric weight is calculated as the volume of the shipment multiplied by the factor 250 kg/m3.

Environmental Parameters

The following parameters are evaluated:

TABLE 1

Environmental performance data included in the ACCEPT system.

| Name | Abbreviation | Unit | Description |
|---|---|---|---|
| Carbon Dioxide - Fossil | $CO_2$ fossil | [g] | Includes emissions from all non-renewable sources |
| Carbon Dioxide - total | $CO_2$ tot | [g] | Includes emissions from both renewable and non-renewable sources |
| Nitrogen Oxides | $NO_x$ | [g] | Measured as Nitrogen Dioxide, $NO_2$. |
| Hydro Carbons | HC | [g] | Includes emission data of all types of categorisations of hydrocarbon compounds (i.e. VOC, NMHC, $CH_4$) emitted from engines and power plants. |
| Particular Matter | PM | [g] | Includes emission data of all types of definitions of particles (i.e. $PM_{10}$, $PM_{2.5}$ etc.) |
| Sulphur Oxides | $SO_x$ | [g] | Measured as sulphur dioxide, SO2 |
| Primary energy - Fossil | — | [MJ] | Denotes the energy content of the utilised non-renewable energy carriers (e.g. diesel, petrol, natural gas, coal, peat etc.) |
| Primary energy - Nuclear | — | [MJ] | Denotes the total heat released by fission processes in nuclear reactors |
| Primary energy - Renewable | — | [MJ] | Denotes the energy content of the utilised renewable energy carriers (e.g. RME/bio-diesel, biogas, biomass, etc.) and/or the electricity produced by solar-, wind- and hydro power plants |

System Boundaries

Time

The base for the calculation is continuously updated why the values are only valid for the 'present' system at any given time.

Geography

The emissions reported are emitted within the following geographic boundaries

ROAD—traffic within a certain area, e.g. Europe

RAIL non-electric—traffic within a certain area, e.g. Europe

RAIL electric—traffic using electricity generation within a certain area, e.g. Europe (UCPTE)

SEA—traffic within a certain area, e.g. Europe and surrounding waters

AIR—traffic within a certain area, e.g. Europe

Technical Systems

The calculation only covers emissions directly connected to the operation of the vehicle, train, vessel or aircraft. This includes engine exhaust emissions (road, rail non-electric, sea and air) and emissions from power plants engaged in the generation of consumed electricity (rail electric).

Emissions related to the following activities are implemented in more complex implementations of the invention:
1. Construction, maintenance, service and scrapping/dismantling of:
    vehicles and vessels
    power plants
    Traffic infrastructure (roads, bridges, petrol stations etc.)
    Transport infrastructure (terminals, cargo handling systems, pallets etc.)
2. Operations of
    traffic infrastructure (illumination, cleaning, snow clearing, surveillance etc.)
    transport infrastructure (terminal heating and illumination, personnel, cargo-handling systems etc.)
3. Extraction, production and distribution of energy carriers
4. Emissions from fuel systems and fuelling operations (evaporation)
5. Emissions related to extraordinary events (i.e. due to accidents, conflicts, natural disasters or technical malfunctions)

ROAD Transport Calculation Methods
Truck Emission Calculations
Vehicle Types

The emission report is based on vehicle data supplied either from the vehicle operator or by application of standard default values relevant for the network of the transport carrier. The same calculation method is applied regardless of the data source. The following vehicle data is used in the calculation:

TABLE 2

Shows default vehicle types and parameters, with typical values.

| Vehicle type | Max load capacity [tonne] | Capacity utilisation [%-by weight] | Fuel type | Fuel Consumption [l/vkm] | Engine type Emission Standard |
|---|---|---|---|---|---|
| ry van | 1.5 | 50 | Petrol | 0.15 | |
| Delivery van | 1.5 | 50 | Diesel | 0.15 | |
| Distribution Lorry | 8 | 50 | Diesel | 0.25 | Euro 1-3 |
| Heavy Distribution lorry | 14 | 50 | Diesel | 0.3 | Euro 1-3 |
| Heavy Distribution lorry | 14 | 50 | Methane | 0.3 | Euro 1-3 |
| Tractor + Semi-trailer | 28 | 75 | Diesel | 0.38 | Euro 1-3 |
| Lorry + Semi-trailer | 40 | 75 | Diesel | 0.45 | Euro 1-3 |

Emission Data Source and Quality

The ACCEPT-systems calculates the environmental performance of each relocation. The system uses the most specific information available. The following priority is used:
1. The data for the specific vehicle that is used for the transport of the cargo
2. The average value for all the vehicles (of the applied type) used by the specific operator
3. The average value for all the vehicles (of the applied type) used in the network of the transport carrier in the region
4. The default value from other external sources are applied (e.g. NTM).

Load Capacity and Utilisation

The emissions from the lorry are split between the cargos carried by the vehicle. The actual amount of cargo carried by each specific vehicle is usually not known. Instead, the following optional hierarchy is applied:
1. The stated average value for the specific vehicle is used
2. The average value for the specific operator is used
3. The average value for the transport carrier network in Scandinavia/Europe is used
4. The default values from other external sources are applied (eg. NTM).

The average values calculated in 1-3 are based on data for one calendar year.

Emission levels: Fuel-, Engine- and Exhaust cleaning combinations

The calculation is based on the emission level stated for different combinations of fuel and engine type (i.e. Euro classification).

HDV Emissions

TABLE 3

Shows exhaust gas emission data for Medium size Diesel Vehicles (MDV) in URBAN traffic
MDV - Urban traffic
Vehicle gross weight 7–20 tonne, average speed 27 km/h.

| [g/l] | HDV/ Euro0 | HDV/Euro1 | HDV/ Euro2 | HDV/ Euro3 |
|---|---|---|---|---|
| HC | 5.83 | 3.39 | 2.04 | 1.94 |
| CO | 13.2 | 8.47 | 6.15 | 7.31 |
| $NO_x$ | 35.6 | 26.3 | 33.3 | 25.1 |
| PM | 1.82 | 1.62 | 0.576 | 0.843 |
| $CO_2$ | 2642 | 2642 | 2642 | 2642 |
| $CH_4$ | 0.140 | 0.0813 | 0.0491 | 0.0466 |
| $SO_x$ | 0.0133 | 0.0133 | 0.0133 | 0.0133 |

TABLE 4

Exhaust gas emission data for Medium size Diesel Vehicles (MDV) in RURAL traffic
MDV - Rural traffic
Vehicle gross weight 7–20 tonne, average speed 71 km/h.

| [g/l] | HDV/ Euro0 | HDV/Euro1 | HDV/ Euro2 | HDV/ Euro3 |
|---|---|---|---|---|
| HC | 3.20 | 1.88 | 1.17 | 1.13 |
| CO | 9.52 | 5.46 | 4.74 | 5.53 |
| $NO_x$ | 40.7 | 28.0 | 33.1 | 24.3 |
| PM | 1.35 | 0.932 | 0.536 | 0.599 |
| $CO_2$ | 2642 | 2642 | 2642 | 2642 |
| $CH_4$ | 0.0768 | 0.0450 | 0.0282 | 0.0271 |
| $SO_x$ | 0.0133 | 0.0133 | 0.0133 | 0.0133 |

TABLE 5

Exhaust gas emission data for Heavy Diesel Vehicles (HDV) in highway traffic
HDV - Highway traffic
Vehicle gross weight >20 tonne, average speed 82 km/h.

| [g/l] | HDV/ Euro0 | HDV/Euro1 | HDV/ Euro2 | HDV/ Euro3 |
|---|---|---|---|---|
| HC | 1.42 | 1.72 | 1.07 | 1.01 |
| CO | 4.81 | 4.92 | 3.57 | 4.33 |
| $NO_x$ | 35.5 | 27.2 | 31.5 | 21.8 |
| PM | 1.06 | 0.902 | 0.451 | 0.488 |
| $CO_2$ | 2642 | 2642 | 2642 | 2642 |
| $CH_4$ | 0.0341 | 0.0412 | 0.0258 | 0.0242 |
| $SO_x$ | 0.0133 | 0.0133 | 0.0133 | 0.0133 |

The fuel-specific emission was found to vary somewhat with road type and vehicle type.

LDV Emissions

Emission data for light duty vehicles is only presented for the urban traffic since these vehicles are mostly used for distribution in urban areas.

TABLE 6

Exhaust gas emission data for Diesel Light Duty Vehicles (LDV) in URBAN traffic.
LDV - Urban traffic N1-III
Vehicle gross weight max 3.5 tonne, average speed 35 km/h.

| [g/l] | vor 86 | XXIII/EEA1 | EURO1 | EURO2 | EURO3 | EURO4 |
|---|---|---|---|---|---|---|
| HC | 6.12 | 1.514 | 1.514 | 1.270 | 0.701 | 0.597 |
| CO | 15.5 | 7.00 | 7.00 | 3.50 | 1.93 | 1.66 |
| $NO_x$ | 9.7 | 9.27 | 9.27 | 8.0 | 6.04 | 3.40 |
| PM | 4.08 | 1.003 | 1.003 | 0.866 | 0.387 | 0.196 |
| $CO_2$ | 2642 | 2642 | 2642 | 2642 | 2642 | 2642 |
| $CH_4$ | 0.147 | 0.0363 | 0.0363 | 0.0305 | 0.0168 | 0.0143 |
| $SOx$ | 0.0133 | 0.0133 | 0.0133 | 0.0133 | 0.0133 | 0.0133 |
| FC [l/km] | 0.115 | 0.101 | 0.101 | 0.101 | 0.101 | 0.101 |

Emission Data Sources

The applied diesel engine emission levels are adopted from the material presented by a competent source.

Emission Control Devices

The following emission control devices are applied with stated reduction of emissions.

TABLE 7

Shows diesel engine emission reductions with abatement techniques.

| Engine generation | Substance | Ox.kat. | PM-filter (CRT) | EGR (retrofit) | EGR + PM filter (retrofit) | SCR | SCR + PM filter |
|---|---|---|---|---|---|---|---|
| Euro I | CO2 | | | 2% | +2% | | |
| | HC | −90% | −90% | | −90% | | −90% |
| | NOx | | | −40% | −40% | −81% | −81% |
| | PM | −20% | −90% | | −90% | | −90% |
| Euro II | CO2 | | | 2% | +2% | | |
| | HC | | −90% | | −90% | | −90% |
| | NOx | | | −40% | −40% | | −81% |
| | PM | −15% | −90% | | −90% | | −90% |
| Euro III | CO2 | | | +2%** | 2% | | |
| | HC | −90% | −90% | | −90%** | | −90% |
| | NOx | | | −40% | −40% | −81% | −81% |
| | PM | −10% | −90% | | −90% | | −90% |
| Euro IV | CO2 | | | | | | |
| | HC | | −90% | | | | −90% |
| | NOx | | | | | −81% | −81% |
| | PM | | −90% | | | | −90% |
| Euro V* | CO2 | | | | | | |
| | HC | | −90% | | | | −90% |
| | NOx | | | | | −81% | −81% |
| | PM | | −90% | | | | −90% |

Definition of Vehicle Capacity and Capacity Utilisation

Cargo capacity is defined as the physical weight carrying capacity of respective vehicle. The calculation of the cargo capacity utilisation uses data for the volumetric weight of the investigated cargo shipment. The capacity utilisation is defined as the loaded volumetric weight divided by the maximum allowed carrying capacity.

$$CCU = \frac{\sum_i w_{i-vol}}{W_{max}}$$

Where:
CCU=cargo capacity utilisation
$w_{i-vol}$=volumetric weight of shipment i
$W_{max}$=Max allowed cargo weight
i=index number for all shipments loaded on the vehicle.

Allocation of Emissions to Transported Cargo

Full Truck Load

The environmental performance data for the vehicle is divided among the cargo shipments in proportion to their volumetric weight, using the following formula:

$$\text{Share to shipment}(i) = \frac{w_{i-vol}}{\sum_i w_{i-vol}} = \frac{w_{i-vol}}{CCU \times W_{max}}$$

Integrated Cargo Transports via Terminals

Inter Terminal Transports

The transports between the terminals are handled in the same way as the full truckload.

Distribution and Pick Up

The environmental performance of the transport between the terminal and the customer (both pick up and delivery) is calculated as follows:

Some integration terminals are selected in order to represent different daily flow volumes, geographic coverage of operations, types of distribution vehicles etc. The total environmental performance for all delivery and pick-up traffic to and from each terminal is calculated. This amount is divided by the total amount of cargo handled in the terminal over the same period. The result is an average environmental performance per tonne cargo passing through the terminal. The rest of the terminals are categorised according to one of the investigated terminal types.

When information about the distance between the terminal and the origin/delivery address of a specific shipment is available the system will recognize it and use the specific characteristics of each truck. The environmental performance for the pick-up/distribution of a shipment is only depending upon the (volumetric) weight of the shipment.

Green Tonne

'Green tonne'-trucks are only considered for the calculation of the environmental performance for the goods sent by customers buying this service. The environmental performance of these trucks, and the load carried by them, is therefore excluded in the calculation of the terminal average value.

RAIL Transport Calculation Methods

The ACCEPT system handles transports with cargo train in one ore more countries, as for example Sweden. In one advantageous implementation, only trains pulled by electrical engines are considered.

Cargo Units

Data for rail transport is given for the transport of the following cargo units:
20 feet container
40 feet container
semi-trailer (for road transport)

The emission calculations for trains are based on the weight of the cargo. The following default values are used for these units:

TABLE 8

Investigated cargo units for train transport.

| Cargo unit | | 20 feet container | 40 feet container | Semi-trailer |
|---|---|---|---|---|
| Max cargo carrying capacity of unit | [tonne] | 28.25 | 28.8 | 26 |
| Cargo capacity utilisation of unit | [%-weight] | 50% | 50% | 75% |
| Cargo weight in unit | [tonne] | 14 | 14 | 20 |
| Cargo unit tara | [tonne] | 2.23 | 3.7 | 7 |

Train- and Wagon Types

The cargo types are transported on different wagon types, for example the following Swedish wagon types:

| Cargo unit | 20 feet container | 40 feet container | Semi-trailer |
|---|---|---|---|
| Wagon type | Container wagon (Lgjs 741) | Container wagon (Lgjs 741) | Semi-trailer wagon (Ldgs) |

Emission Calculation

The emissions reported for the electrical train are those emitted from the power plants balancing the electricity use. The electricity need for pulling a typical cargo train is combined with the emission profile for the selected mix of power plants, this in order to find the emissions related to the transport. These emissions are then divided between the transported cargos in proportion to the net physical weight.

Electricity Demand

The electricity demand for pulling a typical cargo train is calculated by using the method suggested by the EcoTransIT project (also adopted by NTM), see EcoTransIT 2003. The calculation is made for a block train of 1000 tonnes gross. This weight is entered into the formula presented in Table 9 below.

TABLE 9

Electricity consumption for cargo trains.

| Traction | Topography | Gross weight range ($W_{gr}$) [tonne] | Electricity consumption (EC) [Wh/gross tkm] |
|---|---|---|---|
| Electrical | Hilly terrain | 500–1500 | EC = 675 * $W_{gr}^{-0.5}$ |

The electricity demand is thus found to be 0.021 [kWh$_{el}$/ton-br×km], as measured at the engine.

Transmission Losses

There are losses in the transmission of the electricity from the power plant to the engine. The losses are moderate for the high voltage transmission to the connection to the rail network. The losses between the outtake from the grid to the engine are higher, due to frequency modulation and lower transmission voltage in the catenaries. The following values used by NTM are applied in the calculation:

| | | |
|---|---|---|
| Electricity demand at engine | [kWh$_{el}$/ton-br × km] | 0.021 |
| Transmission losses between engine - power grid | [%] | 20% |
| Transmission losses between power grid - power plant | [%] | 4% |
| Electricity demand at power plant | [kWh$_{el}$/ton-br * km] | 0.028 |

Electricity Needed per Unit

Next step in the calculation is to find the gross weight of the wagons carrying the 3 different loaded cargo units. The following Tara weights and cargo capacity data are used in the calculations:

TABLE 10

Cargo and wagon data used in train calculations

| | | Cargo unit | 20 feet container | 40 feet container | Semi-trailer |
|---|---|---|---|---|---|
| Wagon type | | | Container wagon (Lgjs 741) | Container wagon (Lgjs 741) | Semi-trailer wagon (Ldgs) |
| Waggon tara | [tonne] | | 11.8 | 11.8 | 13.35 |
| Cargo units per wagon | | | 2 | 1 | 1 |
| Train weight per cargo unit | [ton-gross] | | 22.3 | 29.9 | 39.9 |

Tonne is a mass unit. It equals 1000 kg.

The wagon gross weight is connected to the carried unit(s). These data are then connected to the calculated emission per gross ton in order to find the environmental data connected to the transport of one unit 1 kilometre.

Electricity Production

A mix of the electricity production in the Nordic countries (Norway, Denmark, Sweden and Finland) was used in the calculation. The production volumes from each country were combined with the emission data for Swedish electricity generation. The following mix was applied:

TABLE 11

Applied mix of power plants.

| Power plant | Nordic mix 1998 |
|---|---|
| Hydro power | 54.2% |
| Nuclear power | 24.2% |
| Wind power | 0.8% |
| Coal condensing power | 7.1% |
| Oil condensing power | 1.3% |
| CHP - Coal | 2.8% |
| CHP - oil | 1.2% |
| CHP - Natural gas | 3.7% |
| CHP - Biomass (steam cycle) | 4.7% |
| CHP - peat | 0.0% |
| Gas turbine | 0.0% |

TABLE 11-continued

Applied mix of power plants.

| Power plant | Nordic mix 1998 |
|---|---|
| Natural Gas - Combined cycle | 0.0% |

CHP = Combined Heat Power generation

This kind of values (also e.g. table 14) is an example and will vary with time and between countries and need to be updated The emission profile for this production mix as presented below was applied in the calculations.

TABLE 12

Environmental profile of selected mix of power plants.

| Substance | unit | Emissions/Primary energy Only from power plant |
|---|---|---|
| $CO_2$ fossil | [g/kWh$_{el}$] | 130 |
| $CO_2$ total | [g/kWh$_{el}$] | 115 |
| $NO_x$ | [g/kWh$_{el}$] | 0.26 |
| HC | [g/kWh$_{el}$] | 0.002 |
| PM | [g/kWh$_{el}$] | 0.014 |
| $SO_2$ | [g/kWh$_{el}$] | 0.28 |
| Primary energy - Fossil | [MJ/kWh$_{el}$] | 2.2 |
| Primary energy - Nuclear | [MJ/kWh$_{el}$] | 1.4 |
| Primary energy - Renewable | [MJ/kWh$_{el}$] | 2.91 |

Calculation Results

The following calculation result is used in the ACCEPT application.

TABLE 13

Environmental performance data for the transport of 1 unit 1 kilometre.

| 20 feet container | | Container block train LCI data for electricity generation | Container block train Only emissions from power plant |
|---|---|---|---|
| $CO_2$ fossil | [g/km] | 82 | 81 |
| $CO_2$ tot | [g/km] | 73 | 71 |
| $NO_x$ | [g/km] | 0.2 | 0.2 |
| HC | [g/km] | 0.006 | 0.001 |
| PM | [g/km] | 0.011 | 0.009 |
| $SO_2$ | [g/km] | 0.2 | 0.17 |
| Primary energy Fossil | [MJ/km] | 1.37 | 1.37 |
| Primary energy - Nuclear | [MJ/km] | 1 | 0.9 |
| Primary energy - Renewable | [MJ/km] | 2 | 1.80 |

| 40 feet container | | Container block train LCI data for electricity generation | Container block train Only emissions from power plant |
|---|---|---|---|
| $CO_2$ fossil | [g/km] | 111 | 108 |
| $CO_2$ tot | [g/km] | 98 | 95 |
| $NO_x$ | [g/km] | 0.2 | 0.22 |
| HC | [g/km] | 0.008 | 0.001 |
| PM | [g/km] | 0.01 | 0.01 |
| $SO_2$ | [g/km] | 0.2 | 0.2 |

TABLE 13-continued

Environmental performance data for the transport of 1 unit 1 kilometre.

| | | | |
|---|---|---|---|
| Primary energy - Fossil | [MJ/km] | 1.8 | 1.8 |
| Primary energy - Nuclear | [MJ/km] | 1 | 1 |
| Primary energy - Renewable | [MJ/km] | 2 | 2 |

| Semi-trailer Data per trailer | | Semi-trailer wagons LCI data for electricity generation | Semi-trailer wagons Only emissions from power plant |
|---|---|---|---|
| $CO_2$ fossil | [g/km] | 148 | 144 |
| $CO_2$ tot | [g/km] | 130 | 127 |
| $NO_x$ | [g/km] | 0.3 | 0.3 |
| HC | [g/km] | 0.011 | 0.002 |
| PM | [g/km] | 0.02 | 0.02 |
| $SO_2$ | [g/km] | 0.32 | 0.31 |
| Primary energy | [MJ/km] | 2.5 | 2.5 |

TABLE 13-continued

Environmental performance data for the transport of 1 unit 1 kilometre.

| | | | |
|---|---|---|---|
| Fossil Primary energy - Nuclear | [MJ/km] | 1.6 | 1.6 |
| Primary energy - Renewable | [MJ/km] | 3 | 3 |

SEA Transport calculation methods

Ship and Cargo Types

The following cargo types are applied in the calculation for sea transport: 20 feet container, 40 feet container, semi-trailer, articulated truck, rigid truck and trailer.

The ACCEPT systems calculates the environmental performance of cargo transported by ships by applying data for a number of representative vessels. The selected vessel types are presented in Table 13 below. Environmental data for two container sizes and 3 different road vehicles are calculated, see Table 13 for the selected combinations of cargo and vessel type.

TABLE 13

Cargo units and ship types included in the ACCEPT model.

| Vessel type | RoPax | RoPax | RoRo | RoRo | RoRo | Container feeder | Large container vessel (ocean going) |
|---|---|---|---|---|---|---|---|
| Vessel name/ description | Mecklenburg Vorpommern | MS Deutschland | Older, slow (<18 kn.) - no abatement | newer, faster (>20 kn.) - no abatement | newer, faster (>20 kn.) - SCR de-NOx | Older, slow (<18 kn.) - no abatement | 6 600 TE - no abatement |
| Route | Trelleborg (SE) - Rostock (DE) | Rödby (DK) - Puttgarden (DE) | Short Sea | Short Sea | Short Sea | Short Sea | Short Sea |
| 20 feet container | | | | | | ☐ | ☐ |
| 40 feet container | | | | | | ☐ | ☐ |
| Semi-trailer | ☐ | ☐ | ☐ | ☐ | ☐ | | |
| Articulated truck | ☐ | ☐ | ☐ | ☐ | ☐ | | |
| Rigid truck and trailer | ☐ | ☐ | ☐ | ☐ | ☐ | | |

Emission Calculations—General Methodology

The emissions for the selected ships are calculated in the following steps:

1. The fuel consumption per km for the vessel is adopted from published vessel information or calculated based on the engine type and size.
2. An average emission profile for the most common engine types (for each vessel type) is selected
3. The emission per km is found by combining the two above-mentioned steps.
4. The total emission is allocated to one cargo unit by dividing the emission by the average number of cargo units carried.

The allocation procedure in step 4 differs between the vessel types, see below.

A Calculation Example

The calculation is illustrated by the example of an older and slow RoRo vessel (Older Danish vessel, DANA CIM-BRIA).

Step 1. Fuel Consumption (FC).

The fuel consumption is not stated in the vessel information. The consumption is calculated by assuming a specific fuel consumption of 200 g/kWh and a 85% power outtake at cruise speed, i.e. 17.5 knots. With an installed engine power of 6600 kW is the fuel consumption given as:

$$FC = 0.85 \times 6600 \times 0.200 = 1122 \text{ [kg/h]}$$

with a speed of 17.5 knots=32.4 km/h, $$FC = \frac{1122}{32,4} = 34,6 \text{ [kg/km]}$$

Step 2 & 3. Vessel Emissions

The emission profiles are selected based on the combination of fuel type and engine speed. From known data-bases the following emission data are extracted for the use in the calculations for the ACCEPT system:

TABLE 13

Emissions from Main Engines at cruise speed.

| Engine type Fuel type | | Slow Speed Diesel engine (SSD) Residual Oil | Medium Speed Diesel engine (MSD) Marine Gas Oil | Medium Speed Diesel engine (MSD) Residual Oil |
|---|---|---|---|---|
| CO₂ fossil | [kg/tonne] | 3179 | 3177 | 3178 |
| CO₂ total | [kg/tonne] | 3179 | 3177 | 3178 |
| NOₓ | [kg/tonne] | 93 | 65 | 66 |
| HC | [kg/tonne] | 3 | 2 | 2 |
| PM | [kg/tonne] | 4 | 1 | 3.8 |
| SOₓ | [kg/tonne] | 54 | 10 | 54 |
| Primary energy - Fossil | [MJ/tonne] | 41000 | 42600 | 41000 |
| Primary energy - Nuclear | [MJ/tonne] | 0 | 0 | 0 |
| Primary energy - Renewable | [MJ/tonne] | 0 | 0 | 0 |
| Reference | | Whall et al. (2002) | Whall et al. (2002) | Whall et al. (2002) |

The RoRo vessel is typically powered by a medium speed diesel engine (MSD) burning residual oil. The emission per km is calculated by multiplying the fuel consumption by the emissions stated in Table 14, yielding the results presented below:

TABLE 15

Calculated emission for the selected RoRo ship.

| Fuel consumption | [ton/km] | 0.0346 |
| CO₂ fossil | [g/km] | 110 033 |
| CO₂ total | [g/km] | 110 033 |
| NOₓ | [g/km] | 2275 |
| HC | [g/km] | 81 |
| PM | [g/km] | 130 |
| SO₂ | [g/km] | 1869 |
| Primary energy - Fossil | [MJ/km] | 1419 |
| Primary energy - Nuclear | [MJ/km] | 0 |
| Primary energy - Renewable | [MJ/km] | 0 |

Step 4. Allocation to Transported Cargo

The total cargo capacity of the selected RoRo vessel was stated as 2 000 lane meters. The utilisation of the vessel is difficult to assess since this type of information (often) is considered as business sensitive information. A frequently stated CCU (lm) of 90% is used in these calculations. This value could be a bit on a high end and should probably be changed to 75-80% in a future up-date. The share of the ship emission to allocate to one lane metre is then calculated as 0.056%, see below.

| Lane meter capacity | [lm] | 2000 |
| Cargo Capacity Utilisation | | 90% |
| Utilised lane meter | [lm] | 1800 |
| Share to one lane meter | | 0.056% |

The following proportions then calculate the emission to each cargo unit:

TABLE 14

Share of ships emission to each cargo unit, calculation example for RoRo vessel.

| Cargo unit | Vehicle length [lm] | Share of ships emission |
|---|---|---|
| Semi-trailer | 13.6 | 0.76% |
| Articulated truck | 18 | 1.00% |
| Rigid truck and trailer | 25.25 | 1.40% |

The emission per cargo unit is then found by the combination of the ship emission and the share stated above. The result is presented in Table 17.

TABLE 17

Calculated emissions per cargo unit, calculation example for RoRo vessel.

| Substance | unit | Semi-trailer | Articulated truck | Rigid truck and trailer |
|---|---|---|---|---|
| CO₂ fossil | [g/km] | 831 | 1 100 | 1 544 |
| CO₂ tot | [g/km] | 831 | 1 100 | 1 544 |
| NOₓ | [g/km] | 17 | 23 | 32 |
| HC | [g/km] | 0.6 | 0.8 | 1.1 |
| PM | [g/km] | 1.0 | 1.3 | 1.8 |
| SO₂ | [g/km] | 14 | 19 | 26 |

TABLE 17-continued

Calculated emissions per cargo unit, calculation example for RoRo vessel.

| Substance | unit | Semi-trailer | Articulated truck | Rigid truck and trailer |
|---|---|---|---|---|
| Primary energy - Fossil | [MJ/km] | 11 | 14 | 20 |
| Primary energy - Nuclear | [MJ/km] | 0 | 0 | 0 |
| Primary energy - Renewable | [MJ/km] | 0 | 0 | 0 |

Vessel Type Specific Comments
RoRo Vessels

The following vessels are used in the calculations for transports with RoRo ships:

TABLE 15

Selected RoRo vessels.

| Vessel | | DANA CIMBRIA | DFDS Tor Selandia | DFDS Tor Selandia |
|---|---|---|---|---|
| Description | | Older, slow | newer, faster | newer, faster |
| Speed | [knop] | 17.5 | 21 | 21 |
| Engine type | | MSD | MSD | MSD |
| Fuel type | | RO | RO | MGO |
| Sulphur content | [%-weight] | 2.7 | 2.7 | 0.5 |
| Abatement | | — | — | SCR |
| Lane meter capacity | [lm] | 2000 | 3000 | 3000 |
| Capacity utilisation | | 90% | 90% | 90% |
| Utilised lane meter | [lm] | 1800 | 2700 | 2700 |

RoPax Vessels

A RoPax vessel is carrying both passengers and vehicles. The RoPax ships usually offer substantial volumes for passenger purposes. The fact that they are carrying such different types of cargo makes the calculation modules for an allocation of environmental data different. One of the less complex ones, allocation by deck type, is selected for the calculations of data applied in the ACCEPT system. This method divides the ships emission in the following way:
1. (the number of decks carrying vehicles)/(total number of 'cargo' decks)
2. the share allocated to the vehicle decks are then divided by the number of utilised lane metres. (same as for the RoRo ships).

Like for the RoRo ships, high quality utilisation data is difficult to obtain from the ship operators.

The following vessels are used in the calculations for the ACCEPT system:

TABLE 16

Selected RoPax vessels.
Vessel description

| Vessel | | Mecklenburg Vorpommern | MS Deutchland |
|---|---|---|---|
| Route | | Trelleborg (SE) — Rostock (DE) | Rodby (DK) — Puttgarden (DE) |
| Engine type | | MSD | MSD |
| FC/crossing | [ton] | 15.7 | 1.82 |
| Distance | [km] | 202 | 26 |
| Fuel type | [%-weight] | RO | RO |
| Sulphur content | [%-weight] | 2.7 | 2.7 |

The emissions used in the ACCEPT model are rather high since the selected ships are rather small and old. Newer ships are usually less polluting due to larger lane metre capacity as well as cleaner engines. Vessels exist with half the $CO_2$ emission and only a fraction of the $NO_x$ emission (e.g. due to SCR de-$NO_x$ systems).

The ACCEPT system should be up-dated with more situation specific data supplied from the ship operators carrying out the transports of the investigated vehicles. Capacity utilisation and fuel consumption data should be averaged over a longer period of operations (e.g. one year).

Container Vessels
Cargo Units

Data for transport with container vessel is given for the transport of the following cargo units:
  20 feet container
  40 feet container The following two vessel types are included in the ACCEPT system, see

TABLE 17

Container ship types

| Vessel type | | Small feeder vessel | Ocean going |
|---|---|---|---|
| Category | | Container | Container |
| Description | | Older, more slow | Mid sized |
| Speed | [knots] | 13.7 | 20.2 |
| Engine type | | MSD | SSD |
| Fuel type | | RO | RO |
| Sulphur content | [%-weight] | 2.7 | 2.7 |
| Abatement | | — | — |

The vessel emission values were calculated in the same way as for RoRo vessels. Fuel consumption was given for a specified/normal route.

The calculated emissions were allocated to the number of utilised TEU positions. The following values were obtained:

TABLE 18

Allocation data for container ships.

| | | Small feeder vessel | Ocean going |
|---|---|---|---|
| TEU capacity | [TEU] | 800 | 6600 |
| CCU - Cargo Capacity Utilisation | | 80% | 100% |
| TEU positions | [TEU] | 640 | 6600 |
| Share to one TEU position | | 0.156% | 0.015% |

The environmental data per cargo unit can now be calculated. The following results were obtained:

| | | Small feeder vessel Older, more slow | Ocean going Mid sized |
|---|---|---|---|
| Vessel Description | | | |
| Speed | [knots] | 14 | 20 |
| Capacity | [TEU] | 800 | 6600 |
| Abatement | | — | — |

| Substance | unit | 20 feet container | 40 feet container | 20 feet container | 40 feet container |
|---|---|---|---|---|---|
| $CO_2$ fossil | [g/km] | 122 | 244 | 64 | 129 |
| $CO_2$ tot | [g/km] | 122 | 244 | 64 | 129 |
| $NO_x$ | [g/km] | 2.5 | 5.1 | 1.9 | 3.8 |
| HC | [g/km] | 0.090 | 0.180 | 0.062 | 0.125 |
| PM | [g/km] | 0.14 | 0.29 | 0.08 | 0.17 |
| $SO_2$ | [g/km] | 2.1 | 4.2 | 1.1 | 2.2 |
| Primary energy - Fossil | [MJ/km] | 1.6 | 3.2 | 0.8 | 1.7 |
| Primary energy - Nuclear | [MJ/km] | 0 | 0 | 0 | 0 |
| Primary energy - Renewable | [MJ/km] | 0 | 0 | 0 | 0 |

Summary of the Results

| | | 20 feet container RoPax Mecklenburg Vorpommern | 20 feet container RoPax MS Deutschland | RoRo Older, slow (<18 kn.) - no abatement | RoRo newer, faster (>20 kn.) - no abatement | RoRo newer, faster (>20 kn.) - SCR de-NOx | Small feeder vessel Older, slow (<18 kn.) - no abatement | Ocean going 6 600 TEU - no abatement | Inter modal train- LCI 1 000 tonnes | Inter modal train with out LCI 1 000 tonnes |
|---|---|---|---|---|---|---|---|---|---|---|
| CO2 fossil | [g/km] | — | — | — | — | — | 122 | 64 | 82 | 81 |
| CO2 tot | [g/km] | — | — | — | — | — | 122 | 64 | 73 | 71 |
| NOx | [g/km] | — | — | — | — | — | 2.5 | 1.9 | 0.2 | 0.2 |
| HC | [g/km] | — | — | — | — | — | 0.090 | 0.062 | 0.006 | 0.001 |
| PM | [g/km] | — | — | — | — | — | 0.144 | 0.083 | 0.011 | 0.009 |
| SO2 | [g/km] | — | — | — | — | — | 2.1 | 1.1 | 0.2 | 0.17 |
| Primary energy - Fossil | [MJ/km] | — | — | — | — | — | 1.6 | 0.83 | 1.37 | 1.37 |
| Primary energy - Nuclear | [MJ/km] | — | — | — | — | — | 0 | 0 | 1 | 0.9 |
| Primary energy - Renewable | [MJ/km] | — | — | — | — | — | 0 | 0 | 2 | 1.80 |

Afterwards standard operating procedures (SOP) for carrying out advantageous implementation of the invention are described in further detail.

The calculation processes are carried out with different data modules.

Figure 5:
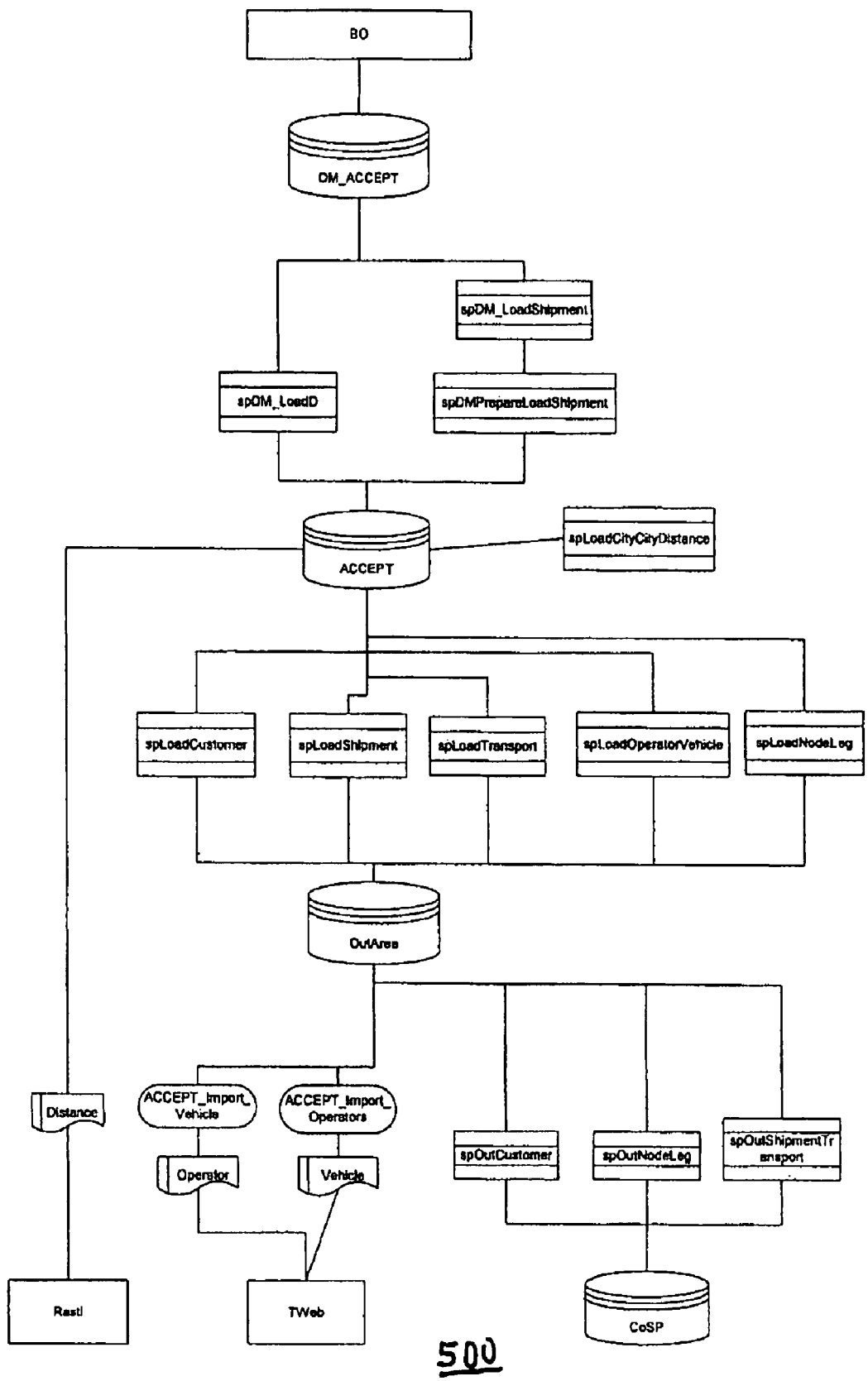
FIG. 5 shows a schematic representation of a preferred embodiment of modules for performing calculation processes.

A preferred embodiment 500 depicted in FIG. 5.

The following sequences of activities are to be preferred; dependencies are shown for each step.
  BACKUP OF WORLDMAIL.
  WEEKLY BILLING.
  BEFORE REPORTS. (SLIB REPORTS—BEFORE)
  GBB EXT/LISTNING. (MENU IMB315)
  CHANGE PARAMETERFILE. (MENU IBM520)
  SAVE ALL IBS files. (MANUAL TAR BACKUP)
  DAILY SAVE & REGULAR SHIPMENTS. (MENU IBM305)
  ALLOCATE HANDLING FEE'S AND DISCOUNT'S. (MENU IBM330)
  REGULAR INVOICE PROCESSING. (MENU IBM330)
  If A.IB.CPH exists it should be renamed.
  CREATE STATISTIC SUMMARY FILE. (MENU IBM335)
  VARIOUS REPORTS. (MENU IBM335)
  COPY OF A.IB.T99.
  SET PERIOD END DATE. (MENU IBM340)
  CHANGE PARAMETERFILE. (MENU IBM520)
  VARIOUS REPORTS. (SLIB REPORTS—AFTER)
  E-MAIL TO ANNIE.
  Capella tapes.
  Slet filer.
  MONTH END FILE HOUSEKEEPING. (MENU IBM340)
  MONTHEND FOR INBOUND.
  COPY OF A.IB.T98
  ISS MONTH-END.
  RMS FILE TRANSFER.
  T99 EXTRACT.

The scope is to give easy and potentially secure access to external users (Customer and Suppliers) and internal users (Sales representatives, Quality assurance, Analysts and maintaining of the system).

The access could be preferably done from a company web site, external and internal.

Operation Process Map

This chapter gives a high level overview on the operation processes of the GO GREEN implementation.

Figure 6:
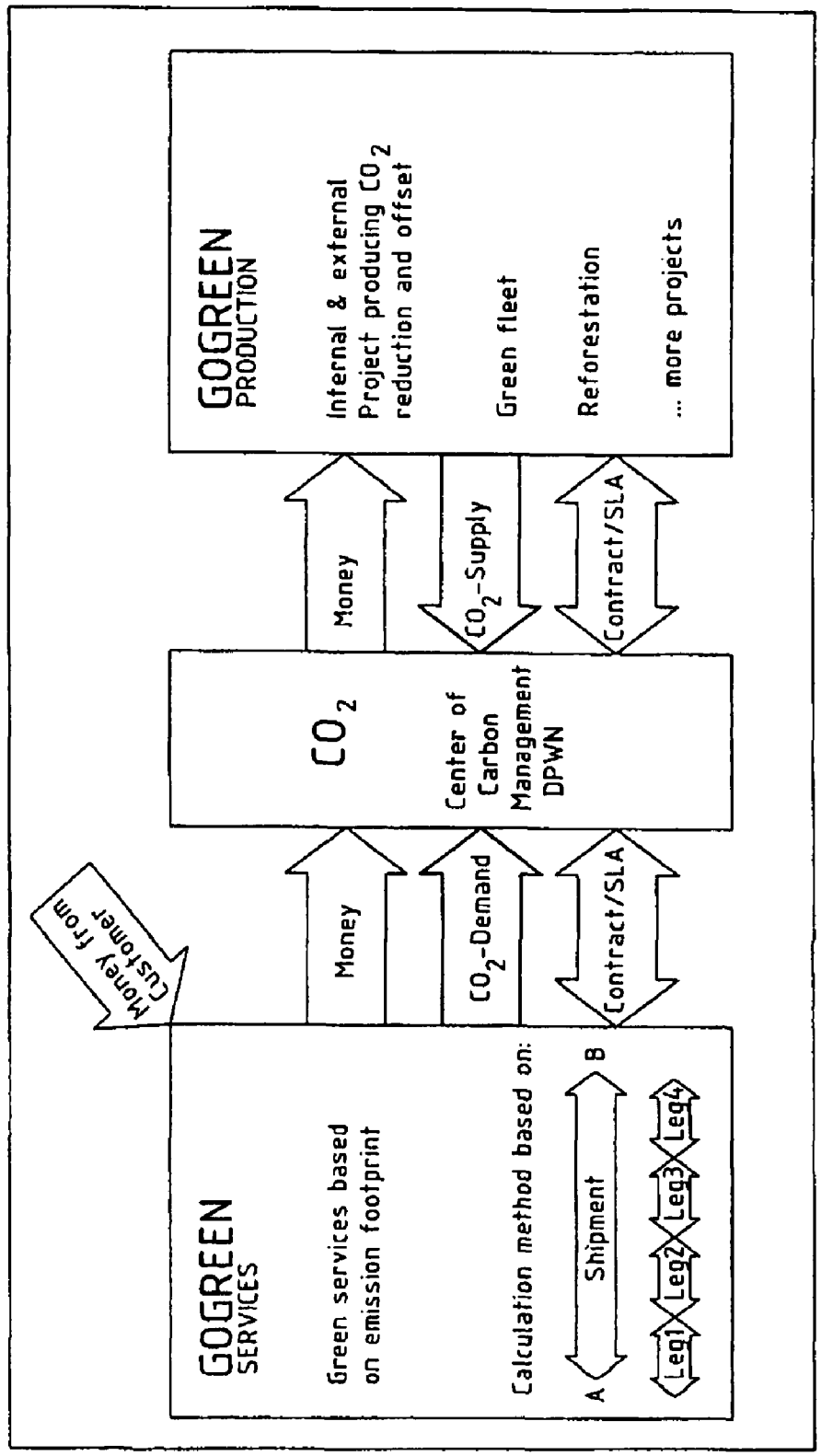
FIG. 6 shows a schematic overview of an operation process map with fore process groups for an advantageous implementation of the invention.

There are core process groups that are visualized in a block diagram 600 shown in FIG. 6.

A computer which is equipped with software capable of handling Carbon Management represents a preferred hub of the system. Here the accounting of the credits takes place, the demand and supply of credits are matched and carbon credits are retired. This Carbon Management computer is afterwards called CM. The CM is preferably also responsible for the financial and contractual arrangements with the BU on both the demand and supply side.

On the demand side the participating BU sell GO GREEN products to their customers and, in most cases, collect additional revenue for this value added service. They are also responsible for the calculation of the emissions related to the shipments. They are to be compensated by CM according to a method agreed between the BU and CM and verified by an independent third party. The BU report their carbon emissions (and at the same time their carbon demand) to CM on a quarterly basis and pay a previously agreed price for each ton of carbon to CM.

Carbon credits are handled by internal and external abatement projects. Internal projects are represented by alternative vehicles using alternative or (partly biogenic) renewable—fuels. Energy efficiency projects or green energy transport such as solar panels on some of the hubs is also included in the internal carbon portfolio.

It is advantageous to purchase verified emission reductions from voluntary or Kyoto abatement projects.

The focus of this manual lies on those processes, that are relevant for carbon accounting. These processes and the data produced in these processes need to be verified by an independent third party.

Figure 7B:
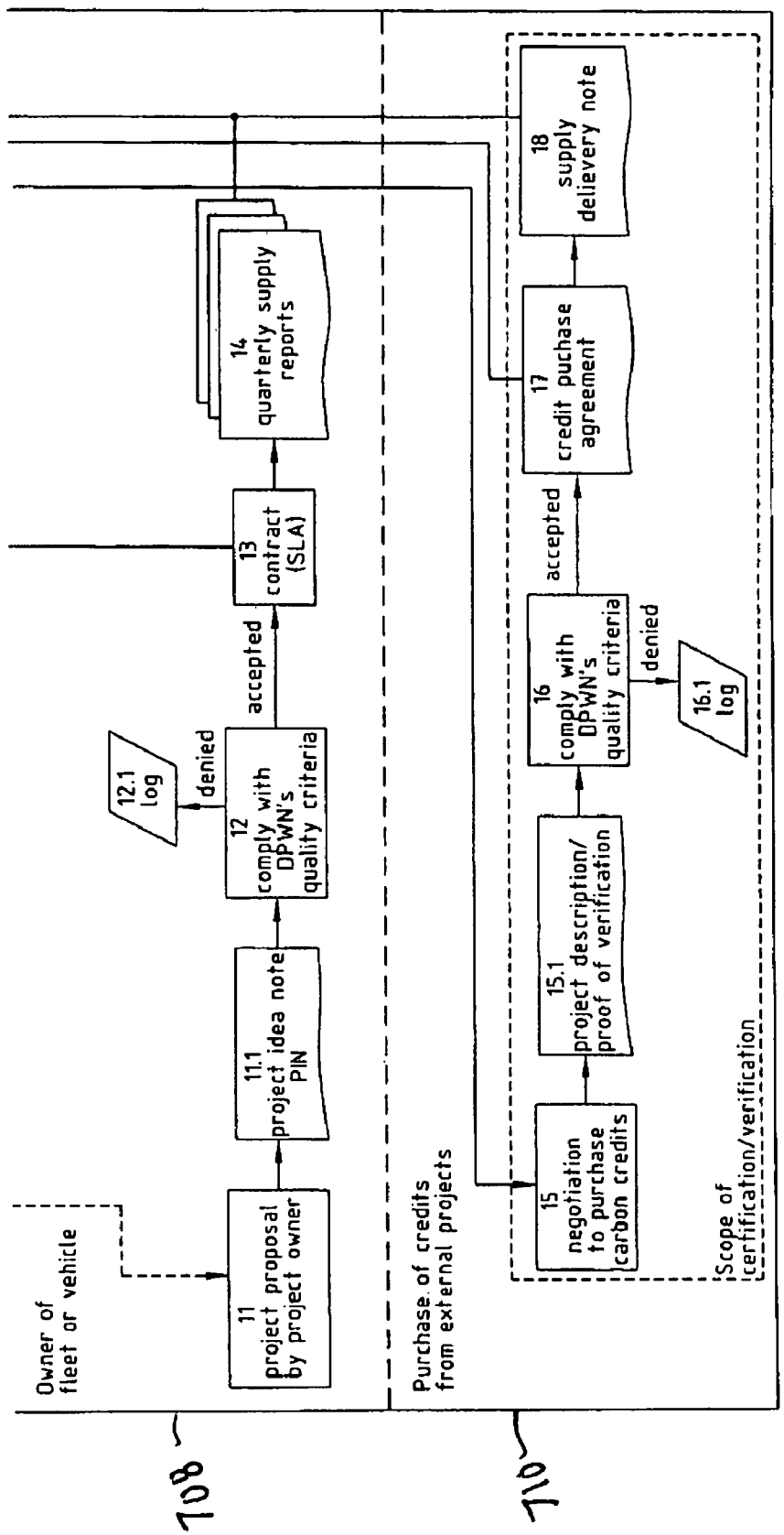

The core operation processes related to carbon management are detailed further in the operation process map in FIG. 7. FIG. 7 comprises a first portion 700 (FIG. 7a) and a second portion 702 (FIG. 7b). The operation process map is further divided in four parts to represent the processes within the participating BU on the demand side (top part 704), the processes within CM (second part 706) and the processes for purchasing carbon credit from internal (third part 708) and external (bottom part 710) projects.

Certain processes and their data need to be verified. Examples of such processes and data include a calculate emissions footprint process 2 (FIG. 7a), an emission footprint methodology 2.1 (FIG. 7a), quarterly demand reports 6 (FIG. 7a), a carbon credit demand ledger 7 (FIG. 7a), a carbon credit supply ledger including retirement 8 (FIG. 7a), a purchase internal credits process 9, a purchase external credits process 10, an annual demand report for verification 20 (FIG. 7a), an annual report/diploma to customer 21, a comply with DPWN's quality criteria process 12 (FIG. 7b), quarterly supply reports 14 (FIG. 7b), a comply with DPWN's quality criteria process 16 (FIG. 7b) and a supply delivery note 18 (FIG. 7b) to name a few examples. Each of the highlighted processes is further detailed afterwards.

Operation Process Details

This chapter describes the individual operation processes that have been outlined in the previous chapter in greater detail.

The description distinguishes between those core processes that are relevant for the carbon accounting and those supplementary processes not relevant for the carbon accounting but necessary for the functioning of the system like the financial accounting processes.

Emissions Footprint Methodology (Process-2.1)

The BU that plans to offer GO GREEN products or services is responsible for specifying emission values for their products or services which should be done according to the steps and the two different methodologies specified in this chapter.

The following steps should be adhered to when introducing new GO GREEN products or services:
- The BU describes the planned GO GREEN products or services at least including the following information:
  - name and type of product or services
  - expected emissions per product and service (emissions footprint)
  - choice of calculation method (bottom-up, top-down)
  - expected volume of services sold to customers
  - expected number of carbon credits needed for compensation
- The BU reports to CM on a chosen methodology and encloses proper documentation according to this manual.
- CM performs a plausibility check on the calculation and the documents and informs the BU of the results.
- CM and the BU agree on the methodology to calculate the emissions footprint.
- CM includes a description of the agreed methodology in this manual.
- The relevant section of the manual as well as the calculation files and the documentation are referenced in the service level agreement (SLA) between the BU and the CM.

CM uses two different methodologies for the calculation of direct carbon emissions from the product and services. Neither emissions of other greenhouse gases nor the life cycle assessment data is taken into consideration for the emission footprint of products and services. For both methodologies carbon is added to cover the carbon emissions from the facilities (hubs etc.).

1. In the bottom-up approach specific carbon emissions per shipment are calculated ex-post based on the emissions of the vehicles used for transportation, the loading factors and allocated to the shipments transported using the NTM formula (see sub-section 0).
2. In the top-down approach average carbon emissions per shipment are calculated ex-ante in case-studies based on more aggregated variables like for example the overall national fuel consumption (accountable for the shipments) of the BU divided by the total number of shipments (see sub-section 0).

The implementation (calculation, sources and values) of these methodologies is described in section 0.

Emissions Footprint Methodology (Process-2.1)—Bottom-Up Approach

A) Purpose and Scope

This section describes the general methodology in the bottom-up approach. This methodology is used when systems within the operation (i.e. operational- and billing systems) and provides specific data required for emission calculations. Calculations are made on shipment level and take each movement into consideration.

If this Bottom-up approach is used, it is advantageous to perform a validation test report with the results from the calculation.

B) Description

The used methodology takes into account all direct emissions related to the transport of the shipments from the fuel combustion in the vehicles including those of the vehicles used by subcontractors. In a first step this relates to carbon emissions. For the carbon emissions from the facilities (hubs etc.) a fixed average value is added. The methodology does neither consider additional emissions in the life cycle of the fuels nor emissions of other greenhouse gases.

For the calculation of the transport emissions per shipment the method distinguishes between emission calculation and emission allocation. Emission calculation is defined as the calculation of the total vehicle emissions related to the use of the different modes of transport, whereas emission allocation relates to the allocation of these emissions to individual shipments. The distinction is necessary because typically a vehicle transports more than one shipment for the different distances and its emissions therefore need to be shared by the individual shipments.

FIG. 8 gives generic example 800 of typical legs of different shipments. The transport is divided into a (different) number of legs according to the different transport modes used on the way from its origin to its destination.

Taking into account the above outlined factors and the division of the shipments into different legs the carbon emissions related to each shipment can be calculated according to the following general principle:
1. Calculate the distance for each leg
2. Calculate the fuel consumption of the vehicle used for each leg
3. Calculate the total emissions of the vehicle depending on vehicle type, engine type and fuel consumption for each leg
4. Allocate the emissions to each shipment, based on volume weight of the shipment and the load capacity and fill factor of the vehicle used for each leg
5. Add the emissions from the different legs of the shipment
6. Add the emissions from all shipments per product and customer ID FIG. 9 shows a formula 900 for the calculation of carbon emissions for each leg. Based on these general principles set forth above, the applied formula to calculate the carbon emissions for each leg from each shipment is shown in FIG. 9:

The factors used in this formula for the emission calculation are explained in Table 19.

TABLE 19

Factors for the calculation of carbon emissions for an individual leg of a shipment

| Factor | Explanation | Unit |
|---|---|---|
| Distance | Distance for each leg of the shipment. | km |
| Fuel consumption | (Average) fuel consumption of specific vehicle type. | l/km |
| Variable emission factor | Specific emission factor for the vehicle and fuel used in the specific leg. | g/l |
| Fixed emissions value | (Average) value for specific air plane types: only used for air transports to account for the higher emissions during take-off and landing. | g |
| Loading Capacity | Maximum payload of the vehicle used. | t |
| Loading Factor | (Average) share of loading capacity that is actually used. | % |
| Volume Weight | Measure to account for bulky (low density) shipments. | t |
| Fixed emissions value for facilities | Used to account for the average direct carbon emissions of facilities like hubs etc. | g |

For further explanation of some of these terms see the glossary.

Depending on information availability different it is possible, to either use generic values or specific values for some of the factors in the calculation formula (mentioned within brackets in the table above).

Emissions Footprint Methodology (Process—2.1)—Top-Down Approach
A) Purpose and Scope This section describes the general methodology of the top-down approach. Using this methodology the total carbon emissions of a specific network and all its transports is calculated, based on available overall data. Carbon emissions per product (shipment) are calculated by allocating the relevant share of emissions to each product.
B) Description This methodology is based on case-studies, which use different data depending on the data and the specific IT-systems available in the relevant BU and countries. The output of the calculation is an average value for the direct carbon emission per product or service. The emission value shall be calculated ex-ante and reviewed on an annual basis.

The performance of the case study follows the steps below. The most important is to document each step and sources to ensure transparency:

1. Identify and specify network for relevant product and services (with GO GREEN offer).
2. Gather needed data from network such as actual fuel consumption. If fuel consumption is not available a model of the network should be constructed by describing i.e. transport kilometres, vehicle types, loading factors,
3. Gather data from product and services (with GO GREEN offer) such as volume and weight if relevant for allocation purposes.
4. Add an estimated value to cover emission from facilities etc.

The minimum requirements for the documentation are as follows:
  transparent and clearly structured Excel spreadsheet including a reference to the relevant data sources
  a brief verbal description of the calculation and the data sources (could be included in the Excel spreadsheet)
  a description on whether and how the calculated average emission values were checked for plausibility by alternative calculations or comparison to other available data
  a printout of the data sources used or information on how it can be obtained by the CM and the verifier (e.g. hard copies or hyperlinks in case of published studies, name and contact data of the staff responsible in case of internal software systems)
  a description on whether and how the internal data sources have been or can be checked for plausibility Calculate Emissions Footprint (Process—2)
A) Purpose and Scope This section and its sub-sections describe the implementation of the general emission calculation methodologies described in section 0 to be used by individual BU for their different products and services.
B) Implementation An overview on the applied methodology per BU and respective GO GREEN products and services is shown in Table 23:

TABLE 20

Overview on the applied methodologies in the BU

| Operation unit | Described in sub-section | Methodology Bottom-up | Top-down |
|---|---|---|---|
| DHL Express Europe | 0 | TD International | — |
| DHL Express UK | 0 | TD International (described in 0) | TD Domestic and DD International and Domestic |
| Deutsche Post Germany | 0 | — | Small Parcel (Green PlusPackchen) |

Further products and further BU can be easily included as additional sub-sections.

Figure 10:
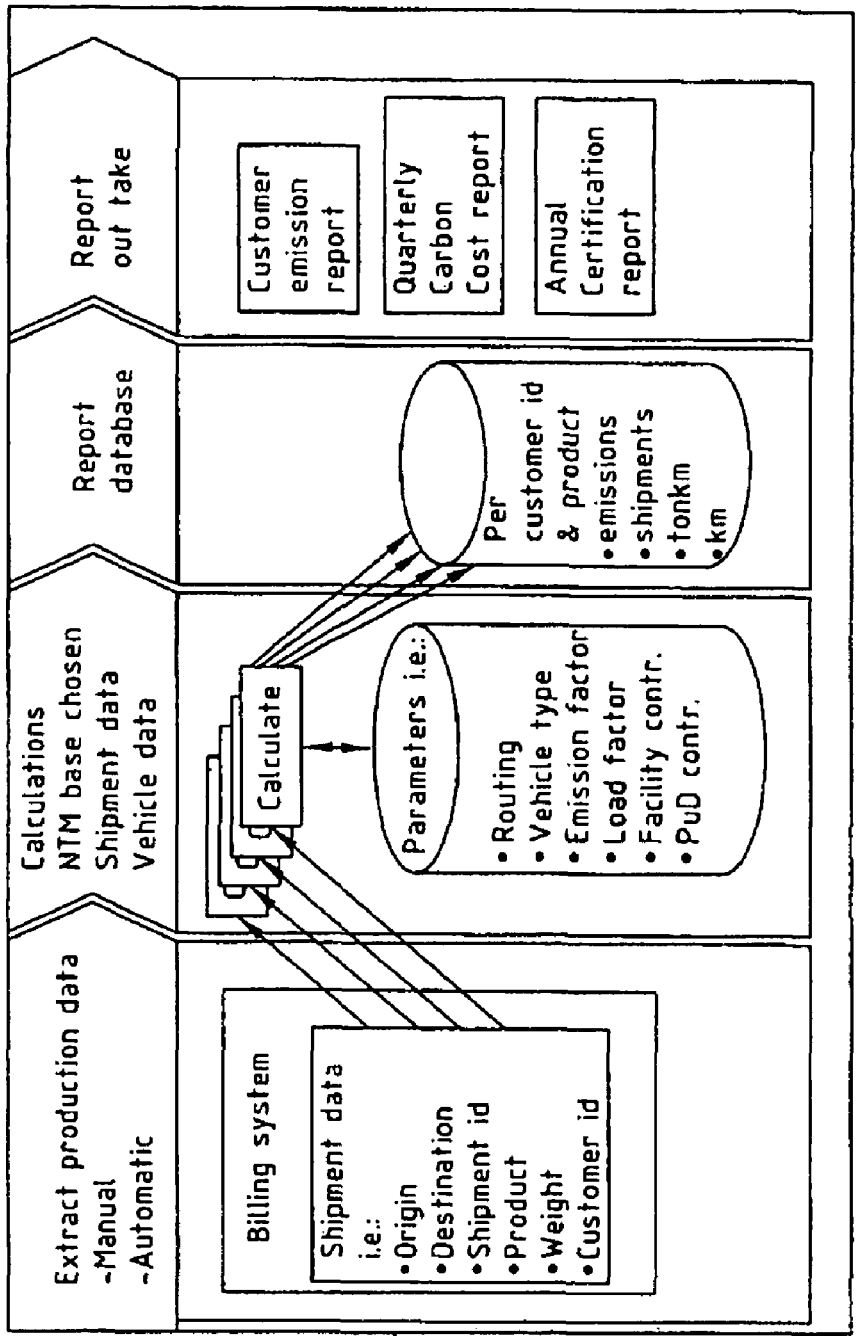
FIG. 10 shows a schematic representation of data flows for emission calculating according to a preferred embodiment of the invention.

Calculate Emissions Footprint (Process—2)—TD International Products
A) Purpose and Scope This sub-section describes the implementation of the general methodology described in sub-section 0 to be used by DHL Express Europe for the TD International product line. For the following products GO GREEN can be chosen as a value added service: TDD, ECX, DOX and WPX.
B) Implementation FIG. 10 shows a schematic representation 1000 of data flows for emission calculating according to a preferred embodiment of the invention. To automate the emission calculation, DHL Express uses the software ACCEPT (Automated Customer Calculation of Environmental Performance Tool). ACCEPT calculates the emissions ex post. Data from the relevant IT-systems are imported into ACCEPT. FIG. 10 outlines the data flows for emission calculation using ACCEPT.

Table 24 summarizes an explanation of the data types (individual or average) and the data sources (software system, case study etc.) for the variables used in the calculation formula (see also Table 22 and FIG. 9).

TABLE 21

Data sources for the different factors of the calculation formula

| Factor | Data Type | Data Source |
| --- | --- | --- |
| Distance | Specific | Distance tables within the ACCEPT describe the distances between frequented airports. The source for distances is an internal application plus a suitable web site e.g.: http://www.bestflights.com.au/airportdist/calc.php |
| Fuel consumption | Specific for different aircraft types and their load | Based on NTM values for fuel usage. NTM - ENVIRONMENTAL DATA FOR INTERNATIONAL CARGO TRANSPORT Calculation methods - mode specific issue; AIR transport; VERSION 2005-04-15 |
| Variable emission factor | As above | As above |
| Fixed emissions value | As above | As above |
| Loading Capacity | As above | As above |
| Loading Factor | Average | Calculated average based on most frequently used aircraft types. |
| Volume Weight | Specific | The weight of each shipment is derived from the OPMS. |
| Fixed emissions value for facilities | Average | Based on case studies of energy utilization of facilities and the number of shipments handled. |

All default and average values used in the calculation are reviewed on an annual basis by the BU. The result of the review is reported to CM in a suitable format as described in this patent application.

Calculate Emissions Footprint (Process—2)—DHL Express UK, DD Domestic

A) Purpose and Scope

This sub-section describes the implementation of the general methodology described in sub-section 0 to be used by DHL Express UK. for TD domestic and DD international and domestic products. The products offering GO GREEN as a value added service are listed in Table 25 below.

TABLE 25

Example of Products with GO GREEN value added service available

| Area | Product |
| --- | --- |
| TD Domestic | Diamond Omega 12 TDD (9 and 12) |
| DD | Europak |

TABLE 25-continued

Example of Products with GO GREEN value added service available

| Area | Product |
| --- | --- |
| International DD Domestic | Europlus NextDay DHL @home DHL Network Express |

It is possible to automatically create reports stating the direct carbon emissions compensated within the GO GREEN program for each single customer.

B) Implementation

The direct carbon emissions are preferably calculated in a top-down approach. An exemplary network/transport process 1100 used for the relevant products is described in FIG. 11.

Figure 11:
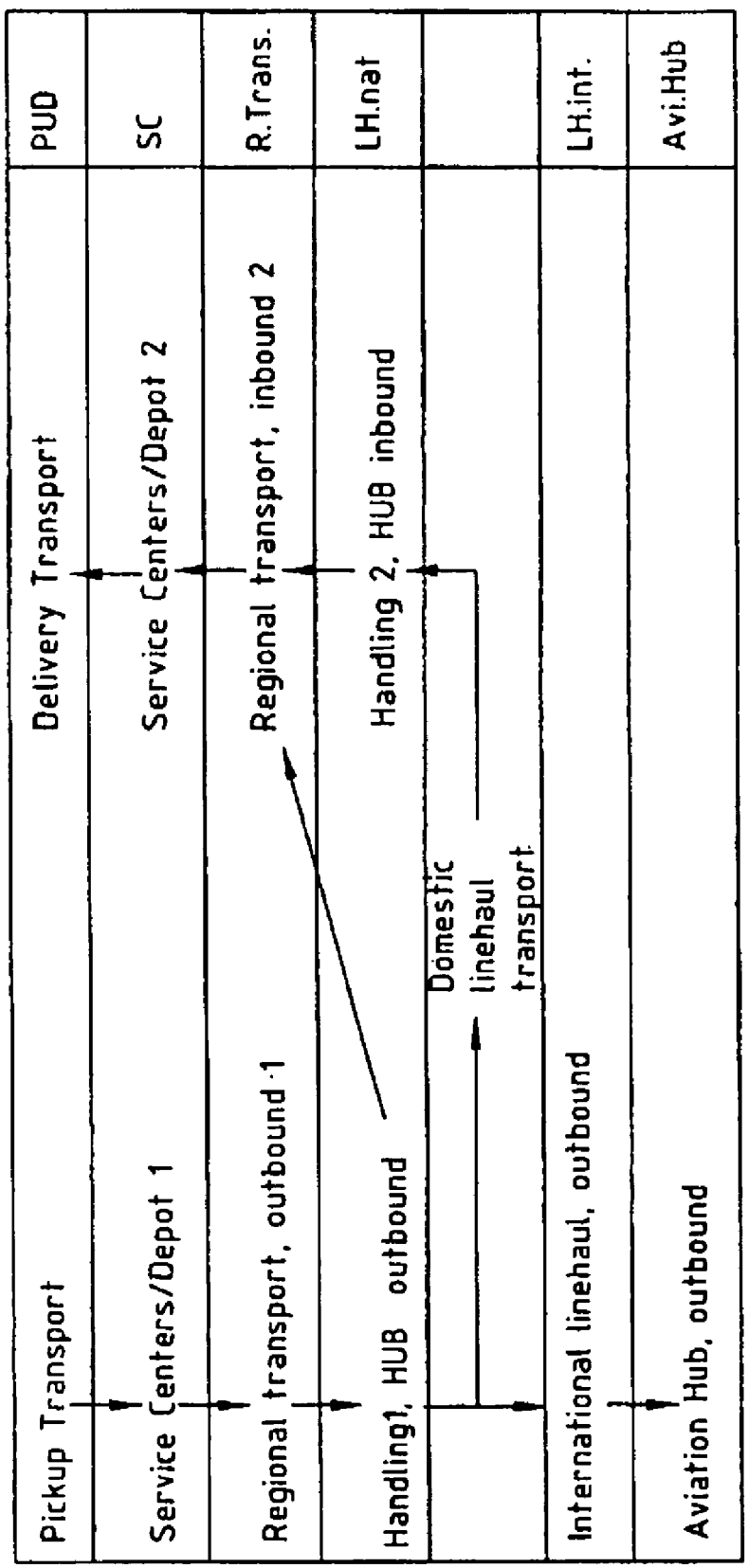
FIG. 11 shows a model of a transport process according to the invention.

FIG. 11 displays an advantageous network structure, which is especially useful for the handling of Express Parcels as a preferred example of the physical objects. It shows various transport legs from a pick-up of the physical object (especially an express parcel) at a first physical unit to a desired destination via several nodes. At each node a processing of the physical object occurs. Examples of the processing are sorting or routing. For each leg an appropriate means of transport will be selected following certain parameters, such as environmental parameters.

By way of example, the direct carbon emissions for the transport of a single transported physical object are shown for the different sub-processes, especially for the transport according to a leg.

The average emissions for the different products derived with the method described above are shown in Table 26:

TABLE 26

Average emissions per product

| Product | Average kg $CO_2$/shipment |
| --- | --- |
| Diamond | |
| Omega 12 | |
| TDD (9&12) | |
| Europak | |
| Europlus | |
| NextDay | |
| DHL@home | |
| DHL Network Express | |

All default and average values used in the calculation are reviewed, updated, reported and documented.

Preferably the central control computer performs the gathering and documenting of the relevant data based on data from sub-systems as local hosts. The central control computer performs the calculations to determine carbon emissions from shipments—especially from shipments relating to a certain BU—and ensures that the calculations and data sources are transparent and verifiable for an independent third party. The central control computer checks the plausibility of the results of the calculations in a vertical and horizontal approach.

Calculate Emissions Footprint (Process—2)—DHL Express Germany, Retail

A) Purpose and Scope

This sub-section describes the implementation of the general methodology described in section 0 to be used by DHL Express Germany Retail for parcels. This individual implementation of the methodology is valid for the calculation of direct carbon emissions for shipments performed for retail customers in its post offices and other outlets. It is possible to offer GO GREEN to all retail customers. Some of these products are small parcels, afterwards called GO GREEN PlusPackchen.

B) Implementation

The GO GREEN parcel will be sold to retail customers via the existing post offices in Germany. The number of GO GREEN PlusPackchen sold can be derived from the billing and accounting systems used.

The direct carbon emissions are calculated in a top-down approach.

The calculations behind each of the sub-processes are described and documented in a file. This file also documents the data sources and assumptions for the different sub-processes.

To account for any uncertainties in the data sources and the calculation the figure of 577 g $CO_2$ per shipment is rounded to 0.65 kg $CO_2$ per shipment.

This value should be entered in the quarterly demand report by DHL Express Germany.

All default and average values used in the calculation are reviewed on an annual basis by the BU. The result of the review is reported to CM in a suitable format, stored and documented.

The central control computer is responsible for gathering and documenting the relevant data from the systems. The central control computer performs the necessary calculations to determine carbon emissions from the shipments and ensures that the calculations and data sources are transparent and verifiable for an independent third party. The central control computer furthermore checks the plausibility of the results of the calculations in a vertical and horizontal approach.

Quarterly Demand Reports (Process—6)

A) Purpose and Scope

This section describes the quarterly demand reports that are used by the BU to communicate their carbon credit demand for the past quarter to CM.

Details on which data fields are used are described in Table 27 below.

B) Implementation

The quarterly demand report consists of a protected Excel file. The structure and format is defined by CM. Changes can only be implemented by CM.

The quarterly report shall be stored by the central control computer on a net-drive It is preferred to save the quarterly demand reports as read-only files to eliminate the risk of later unintended changes to the data.

Table 27 explains the data fields in the quarterly demand report and shows which BU uses the different data fields.

TABLE 27

Data fields in the quarterly demand report to be filled by BU

| Data Fields | Explanation | User |
| --- | --- | --- |
| Operation Unit Name | Unique name of the Operation Unit. The name should be identical for all reports of the specific BU. | all BU |
| Year | Year for which the report is valid. (Formatted as YYYY, e.g. 2006) | all BU |
| Quarter | Quarter of the year for which the report is valid. (Formatted as QQ, e.g. 03) | all BU |

TABLE 27-continued

Data fields in the quarterly demand report to be filled by BU

| Data Fields | Explanation | User |
| --- | --- | --- |
| Customer Name | Name of the customer, who purchased the value added service GO GREEN for one or all of his products used. Enter at least one line per customer. This information is also used to print the diploma for the customer. Enter the full (legal) name as it should appear on the diploma. For SME customers "SME Customer" is entered in this cell. | for customers, that receive a diploma for SME customers |
| Volume of Shipments | Total number of shipments per customer. For BU without contract customers this is the total number of all shipments. | all BU |
| $CO_2$ per Shipment | State the average carbon emissions of an individual shipment. If actual values for each individual shipment are calculated expost by the BU this data field remains void. | only for BU with average carbon emissions per shipments |
| Total $CO_2$ | For BU with average carbon emissions per shipment this is automatically calculated as product of "Volume of shipments" and "$CO_2$ per Shipment". BU with contract customers overwrite the formula in the template with the total emissions calculated by their respective IT-systems. | all BU |
| Price per t $CO_2$ | Price per t $CO_2$ as agreed in the contract (Service Level Agreement - SLA) between the BU and CM. | all BU |
| Total Costs | This is automatically calculated as product of "Total $CO_2$" and "Price per t $CO_2$" | all BU |
| Preferred method of compensation | Big corporate contract customers will in very special cases be allowed to choose a preferred method of compensation, e.g. solar or a forestation. (Not to be marketed actively and to be discouraged.) | only BU with contract customers |

Carbon Credit Demand Ledger (Process—7) and Demand Summary (Process—20)

A) Purpose and Scope

This section describes the carbon credit demand ledger that is used by CM to aggregate the quarterly demands from different BU. The carbon credit demand ledger is valid only for CM.

B) Implementation

The carbon credit demand ledger is a file with several spreadsheets, for example:

Carbon demand ledger
Carbon demand summary
Shipment volume summary
Plausibility check demand
Data for diploma
BU billing The use of these spreadsheets is described in this patent application. The carbon credit demand ledger could for example be created as an Excel file.

Carbon Demand Ledger

The Carbon demand ledger contains preferably the same data fields as the quarterly demand reports by the BU (see Table 27). The additional data fields for use by CM are described in Table 22.

TABLE 22

Additional data fields in the carbon credit demand Ledger

| Data Fields | Explanation | User |
| --- | --- | --- |
| Supply/Demand | Default value is "demand". | CM |
| Reference ID | Unique serial number in the format D-"XXXX", e.g. D-0001 (D for demand) | CM |
| Date | Date of the data transfer into the carbon credit demand ledger | CM |
| By (Name) | Person transferring the data into the carbon credit demand ledger | CM |
| Date payment received by BU | Date of the receipt of the payment for the compensated carbon emissions | CM |

To transfer the data from the quarterly demand report to the carbon demand ledger the following steps are required:

- On receiving the quarterly demand reports CM files them on a net-drive under a new name by adding "-CM" at the end of the filename.
- CM checks that the data reported are plausible and consistent. This is especially important for the data fields operation unit name, customer name, product ID/code—and if applicable—$CO_2$ per shipment, because the reporting is based on these data fields. CM corrects obvious typing errors and clarifies ambiguous cases with the relevant BU.
- CM checks the serial number for the last entry in the carbon credit demand ledger.
- CM adds in the newly filed quarterly demand reports the next reference ID, demand, the date of the data transfer to the carbon credit demand ledger and the name of the person transferring the data.
- CM prints the quarterly demand reports and files a hard copy as part of the documentation. CM notes the reference ID in the carbon demand ledger on each print-out.
- CM copies all data from the quarterly demand reports of all BU into the carbon credit demand ledger.
- CM files at least a quarterly backup copy of the carbon credit demand ledger on a net-drive under a new name.

Based on the data in the spreadsheet carbon demand ledger the other spreadsheets provide demand reports, plausibility checks and the data for the certifications.

Carbon Demand Summary

The carbon demand summary automatically summarizes the demand per BU on a quarterly and annual basis. The summary is for example implemented in an Excel pivot table. The carbon demand summary is used as basis for the quarterly transfers of the aggregated demand into the carbon credit supply ledger for retirement as well as the annual report to the verifier.

After all quarterly bookings have been performed in the carbon demand ledger CM prints and files a hardcopy of the carbon demand summary.

Shipment Volume Summary

The shipment volume summary automatically summarizes the total volume of shipments per BU on a quarterly and annual basis. The summary is implemented in an Excel pivot table. The data are used for the plausibility check.

Plausibility Check Demand

The plausibility check demand automatically calculates the average $CO_2$ emissions per shipment on a quarterly and annual basis. The calculation can be used for a plausibility check in a vertical and horizontal approach. The calculation only works properly, if both pivot tables Demand of Carbon (t) on the spreadsheet carbon demand summary and Number of Shipments on the spreadsheet shipment volume summary show the equivalent selections of Operation Unit Name, Preferred Compensation, Quarter and Year. After all quarterly bookings have been performed in the carbon demand ledger CM prints and files a hardcopy of the plausibility check demand.

Carbon Credit Supply Ledger Incl. Retirement (Process—8)

A) Purpose and Scope

This section describes the carbon credit supply ledger that is used by CM to aggregate the quarterly supply from different internal abatement projects and externally purchased credits as well as to retire carbon credits according to the quarterly demand. The carbon credit supply ledger is valid only for CM.

B) Implementation

The carbon credit demand ledger is an Excel file with several spreadsheets:

- Carbon supply ledger
- Project balance summary
- Project portfolio
- Auxiliary calculation
- Project invoice The use of these spreadsheets is described in the following paragraphs.

Carbon Supply Ledger

The carbon supply ledger contains the same data fields as the quarterly supply reports by the BU (see Table 31). The additional data fields for use by CM are described in Table 29.

In the carbon supply ledger both supply and aggregated demand are accounted. Supply is booked with positive values as credit entries. Demand is booked with negative values as debit entries.

Based on the data in the carbon supply ledger the other spreadsheets in this file provide an up-to-date balance for all abatement projects, an overview over the project portfolio and auxiliary calculation for accounting purposes.

Project Balance Summary

The project balance summary automatically summarizes the balances per abatement project on a quarterly and annual basis. The summary is implemented in an Excel pivot table with an additional calculation of the cumulative quarterly balances. The project balance summary is used as basis for the annual report to the verifier. For the second year of operation the balance of the previous year is entered in the project balance summary by hand.

Project Portfolio

The project portfolio automatically calculates the share of the individual abatement projects in the project portfolio on a quarterly and annual basis. The summary is implemented in an Excel pivot table with an additional calculation of the cumulative quarterly balances.

TABLE 23

Additional data fields in the carbon credit supply ledger

| Data Fields | Explanation | User |
| --- | --- | --- |
| Supply/Demand | Default value is "supply". | CM |
| Reference ID | Unique serial number in the format S-"XXXX", e.g. S-0001 (S for supply) in case of data from quarterly supply reports. Reference ID taken from carbon credit demand ledger in case of data from quarterly demand reports | CM |

TABLE 23-continued

Additional data fields in the carbon credit supply ledger

| Data Fields | Explanation | User |
|---|---|---|
| | for customers with a preferred method of compensation. Unique number in the format QD-"QQ"-"YYYY", e.g. QD-0001 (QD for aggregated quarterly demand, with "QQ" for number of the quarter, "YYYY" for year) in case of quarterly demand without preferred method of compensation. | |
| Date | Date of the data transfer into the carbon credit supply ledger | CM |
| By (Name) | Person transferring the data into the carbon credit supply ledger | CM |
| Date value paid to BU | Date of the payment for the delivered carbon credits to BU | CM |

Auxiliary Calculation

The auxiliary calculation automatically calculates the share of the total quarterly demand (without preferred method of compensation) that has to be booked on each of the abatement projects in the portfolio. It therefore automatically takes off the quarterly demand data from the demand ledger.

Accounting Processes

The processes for accounting carbon credits in the carbon credit supply ledger are illustrated and further explained in Table 30

TABLE 24

Explanation of processes for accounting carbon credits in the carbon supply ledger

| Step | Explanation | Files/tables |
|---|---|---|
| 14 | Quarterly supply report: Quarterly supply reports as described in sub-section 0 | Excel files from every abatement project: QSR-"Project-Name"-"YYYY"-"QQ".xls |
| 18 | Supply delivery note: Supply delivery notes as described in sub-section Error! Reference source not found. | Document with delivery details depending on contractual arrangements |
| 7 | Carbon credit demand ledger: Carbon credit demand ledger as described in sub-section 0 including the carbon credit demand entries for the relevant (past) quarter. | Excel file: Carbon_demand_ledger_V1.0.xls |
| 8-1 | Check supply data quality: On receiving the quarterly supply reports CM files them on a net-drive under a new name by adding "CM" at the end of the filename. CM checks that the data reported are plausible and consistent. This is especially important for the data fields operation unit name and project ID/name because the reporting is based on these data fields. CM corrects obvious typing errors and clarifies ambiguous cases with the relevant BU. CM prints the quarterly supply reports and files a hard copy as part of the documentation. CM notes the reference ID in | Excel files from every abatement project: QSR-"Project-Name"-"YYYY"-"QQ"-CM.xls |

TABLE 24-continued

Explanation of processes for accounting carbon credits in the carbon supply ledger

| Step | Explanation | Files/tables |
|------|-------------|--------------|
| | the carbon supply ledger on each print-out. | |
| 8-2 | Copy supply data in supply ledger: CM checks the serial number for the last entry in the carbon credit supply ledger. CM adds in the newly filed quarterly supply reports the next reference ID, supply, the date of the data transfer to the carbon credit demand ledger and the name of the person transferring the data. After that the data are copied for each abatement project from the quarterly demand reports into the table carbon supply ledger. | Data copied from: Excel files from every abatement project: QSR-"Project-Name"-"YYYY"-"QQ"-CM.xls to: Excel file: Carbon_demand_ledger_V1.0.xls, table carbon supply ledger |
| 8-3 | Check for preferred compensation: Since it will be possible that a big corporate contract customer will opt for a preferred method of compensation, these customers have to be identified and their demand must be booked before the remaining demand is booked. Wether there are customers with preferred compensation can most easily be checked in the table carbon demand summary. Here preferred compensation is shown as an extra line for the operation unit(s) with the relevant customer(s). If there is no preferred compensation the next step is 8-6. The steps 8-4, 8-5 and 8-7 are skipped. | Excel file: Carbon_demand_ledger_V1.0.xls, table carbon demand summary |
| 8-4 | Copy preferred compensation data in supply ledger: If there is preferred compensation, the individual entries have to be identified in the table carbon demand ledger by filtering in the column preferred compensation. For each demand entry with preferred compensation in the the carbon demand ledger for that quarter the data field project ID/name is filled with relevant project ID/name in a new line of the table carbon supply ledger and the fields year and quarter are filled with the relevant information. CM than copies the data on Total $CO_2$ and Reference ID from the relevant dataset with the preferred compensation in the carbon demand ledger to the new line in the table carbon supply ledger. The data on Total $CO_2$ | Data copied from: Excel file: Carbon_demand_ledger_V1.0.xls, table carbon demand ledger to: Excel file: Carbon_supply_ledger_V1.0.xls, table carbon supply ledger |

TABLE 24-continued

Explanation of processes for accounting carbon credits in the carbon supply ledger

| Step | Explanation | Files/tables |
|---|---|---|
|  | have to be entered with a negative algebraic sign as a debit entry. The remaining data fields date and By (name) are filled with the relevant information. This is repeated for each customer with preferred compensation. |  |
| 8-5 | Exclude preferred compensation from demand summary: In order not to double-count the entries with preferred compensation after they have been booked individually they have to be excluded from the calculation in the carbon demand summary. This is done by deselecting the relevant preferred compensations in the carbon demand summary. | Excel file: Carbon_demand_ledger_V1.0.xls, table carbon demand ledger |
| 8-6 | Copy auxiliary calculation within supply ledger: In order to "freeze" the number of credits and their shares to be booked on each of the abatement projects the complete table auxiliary calculation is copied within the carbon supply ledger after refreshing the data in the pivot-tables. Following that, the formulas in the copied table have to be replaced by their results (copy and paste as values). The copied table is renamed AC-"YYYY"-"QQ". After renaming the table it is printed and filed as a hard copy as part of the documentation. CM notes the reference ID in the carbon supply ledger on each print-out. | Excel file: Carbon_supply_ledger_V1.0.xls, table auxiliary calculation |
| 8-7 | Include preferred compensation in demand summary: After copying the table auxiliary calculation the preferred compensation can be reincluded in the demand summary. This is done by selecting the relevant preferred compensations in the table carbon demand summary again. | Excel file: Carbon_demand_ledger_V1.0.xls, table carbon demand ledger |
| 8-8 | Book demand from auxiliary calculation in supply ledger: From the print-out of the table auxiliary calculation the carbon demand is booked in the table carbon supply ledger. | Excel file: Carbon_supply_ledger_V1.0.xls, table carbon supply ledger |

TABLE 24-continued

Explanation of processes for accounting carbon credits in the carbon supply ledger

| Step | Explanation | Files/tables |
|---|---|---|
|  | For each abatement project in the portfolio the fields project ID/name, quarter and year is entered in a new line of the table carbon supply ledger. Than the demand per abatement project is booked with a negative algebraic sign as a debit entry. In the data field Supply/Demand "Demand" is entered. The data field Reference ID is filled with QDS-"YYYY"-"QQ". The remaining data fields Date and By (name) are filled with the relevant information. This is repeated for each abatement project. |  |
| 8-9 | Copy project balance summary within supply ledger: In order to "freeze" the project balance summary the complete table project balance summary is copied within the carbon supply ledger supply ledger after refreshing the data in the pivot-tables. Following that, the formulas in the copied table have to be replaced by their results (copy and paste as values). The copied table is renamed PBS-"YYYY"- "QQ". After renaming the table the table is printed and filed as a hard copy. | Excel file: Carbon_supply_ledger_V1.0.xls, table project balance summary |
| 8-10 | Backup carbon supply ledger: After booking all quarterly entries CM files at a quarterly backup copy of the carbon credit supply ledger on a net-drive under a new name by adding the date of the backup in the format "-YYYY-MM-DD" at the end of the filename. | Excel file: Carbon_supply_ledger_V1.0_YYYY-MM-DD.xls |

If the carbon supply ledger contains CER (and VER managed in external registries) the relevant amount retired in the supply ledger for the relevant projects need to be retired in the official CDM registry (and the VER registry if applicable) as well. This should be done at least annually, better quarterly, after the internal carbon accounting for the quarter is terminated by CM.

CER refers to rights to emission carbon. VER refers to Verified Emission Reduction data.

The relevant documents for the retirement in the above mentioned registries are filed on net-drives or as hard copies as part of the carbon credit accounting documents.

Purchase Internal Credits (Process—9)

A) Purpose and Scope

This section describes the initiation of purchasing internal credits by CM or BU. The description focuses on the perspective of CM.

B) Implementation

The purchase of internal credits can be managed by the system according to the invention.

Based on the forecasted supply and demand the central control computer checks regularly (at least quarterly), whether there is a sufficient future supply of credits to balance the expected future demand.

Additionally the project portfolio should have a balanced mix between projects from different geographical areas and different types of technology used for abatement.

In most cases it is possible to avoid a purchase of external emission credits. However, if it is necessary to purchase external emission credits, the following procedure applies.

Purchase External Credits (Process—10)

A) Purpose and Scope

This section describes the initiation of purchasing external credits by CM.

B) Implementation

Whether and when to purchase external credits is decided by CM. In this case a credit purchase agreement between a logistics company and a seller of the external carbon credits is integrated in the carbon management process.

Project Proposal by Project Owner/Project Idea Note (Process—11/11.1)

A) Purpose and Scope

This section describes the documentation needed for internal abatement projects. The section is valid for all internal suppliers (BU) of carbon credits.

B) Implementation

It is preferred to check the compliance of the internal projects with the quality criteria for internal projects and to integrate and automate the supply of internal credits.

Comply with Quality Criteria for Internal Credits (Process—12)

A) Purpose and Scope

This section describes the quality criteria used by for internal abatement projects. The quality criteria are valid for the central control computer and all internal suppliers (BU) of carbon credits.

B) Implementation

The following quality criteria apply for internal projects:
Carbon emissions are truly reduced.
The project is additional.
The emissions are abated by using clearly defined approaches and technologies.
The approach and the technologies are described and documented.
The calculation of carbon credits is done according to clear and previously defined standards. A baseline scenario is defined and justified.
All information relevant for the project is documented in transparent and plausible form.
The purchase of credits is handled in a SLA between CM and the BU.
The relevant information is filed on a net-drive or as hardcopy.

Quarterly Supply Reports (Process—14)

A) Purpose and Scope

This section describes the quarterly supply reports that are used to communicate carbon credit supply from abatement projects for the past quarter.

B) Implementation

The quarterly demand report consists of a protected file. Table 31 explains the data fields in the quarterly demand report.

There are three further data fields in the report for accounting purposes.

TABLE 25

Data fields in the quarterly supply report to be filled by BU

| Data Fields | Explanation |
| --- | --- |
| Operation Unit Name | Unique name of the Operation Unit. The name should be identical for all reports of the specific BU. |
| Project | Unique ID or name for the project. It is defined |

TABLE 25-continued

Data fields in the quarterly supply report to be filled by BU

| Data Fields | Explanation |
| --- | --- |
| ID/Name | by CM and uses the following schema: "E/I"-"Project-Type"-"NN" With: "E/I = alternative use of "I" for internal and "E" for external projects "Project-Type" = e.g. afforestation, biogas, RME, solar etc. "NN" = serial number per project type |
| Year | Year for which the report is valid. (Formatted as YYYY, e.g. 2006) |
| Quarter | Quarter of the year for which the report is valid. (Formatted as QQ, e.g. 03) |
| Total Activity Rate | Sum of all activities in the project: total of all kilometres driven by all alternative vehicles of one technology in km (in case of alternative vehicle projects) total solar power transport in kWh (in case of solar projects) |
| Specific emissions baseline | Specific emissions of the baseline technology: measured in kg $CO_2$/l (in case of other vegetable oil vehicle projects) measured in kg $CO_2$/km (in case of other alternative vehicle projects) measured in kg $CO_2$/kWh (in case of solar projects) The relevant information can be taken from the project idea note as described in section 0. |
| Specific emissions project | Specific emissions of the project technology: measured in kg $CO_2$/l (in case of other vegetable oil vehicle projects) measured in kg $CO_2$/km (in case of other alternative vehicle projects) measured in kg $CO_2$/kWh (in case of solar projects) The relevant information can be taken from the project idea note as described in section 0. |
| Total $CO_2$ | This is automatically calculated as product of "Volume of shipments" and "$CO_2$ per Shipment". |
| Price per t $CO_2$ | Price per t $CO_2$ as agreed in the contract (SLA) between the BU and CM. |
| Total Value | This is automatically calculated as product of "Total $CO_2$" and "Price per t $CO_2$" |

Negotiation to Purchase Carbon Credits/Project Description (Process—15/15.1) Comply with Quality Criteria for External Credits (Process—16)

A) Purpose and Scope

This section describes the quality criteria used during the negotiations to purchase external credits for choosing the qualifying projects. The quality criteria are valid for CM and all external suppliers of carbon credits.

B) Implementation

For both credibility and practical reasons the same strict standards of additionality as the Kyoto protocol stipulates apply for the credits bought from external projects.

With additionality is generally meant that the project would not have happened unless there was the additional incentive of an extra income stream from the value of the generated credits. The project should not represent operation-as-usual.

Baseline emissions would equal project emissions in this case. Hence a project needs to prove its additionality by showing that is not operation-as-usual.

The credits should at least strive for being VER (Verified Emission Reductions) by an independent third party. Possible standards to be used as the basis for the verification are for example the "GHG Protocol for Project Accounting" by WBCSD/WRI, the "Gold Standard" by a number of NGO (BASE), the "Voluntary Carbon Standard" by IETA and the JI and CDM-Project Cycle defined by the Kyoto Protocol.

From this framework the following quality criteria for external projects are used:

Carbon emissions are truly reduced.
The project is additional.
Leakage is accounted for.
The emissions are abated by using clearly defined approaches and technologies. CM allows the purchase from all project types that are acceptable under the Kyoto framework.
The approach and the technologies are described and documented.
The calculation of carbon credits is done according to clear and previously defined standards. A baseline scenario is defined and justified.
All information relevant for the project is documented in transparent and plausible form.
The compliance of the project with the chosen standards is documented and verified.
The verification report is provided by the project owner.
Carbon credits are traceable.
The purchase is handled in a credit purchase agreement.
CM is responsible to gather the relevant information during the negotiations with the seller in order to judge the compliance of projects from which credits potentially will be bought. The relevant information is filed on a net-drive or as hardcopy. Ideally the relevant information is documented in a comprehensive project description.
The results of the compliance check are documented.

Contract on Internal Carbon Supply Project (Service Level Agreement—SLA) (Process—13)

A) Purpose and Scope

This section describes the main contents of the SLA between BU owning internal carbon supply projects and CM.

B) Implementation

The following carbon management specific aspects should be covered by the SLA:

Define the reporting requirements by the operation unit with quarterly supply reports
Define the responsibilities of the parties
Name the persons responsible within the parties
Define the legal nature of credits
Determine the price per ton of carbon dioxide payable to the project owner
Define the modalities of payments Quality Assurance A) Purpose and Scope This chapter describes the measures taken to assure the quality and safety of the data used.

B) Implementation

The systems used for gathering data to calculate carbon emissions in the BU underlie a quality assurance system on their own, since they are used for transport control, billing and accounting purposes.

The following measures are taken additionally to ensure the quality and safety of the data:

All data shall be checked for plausibility in a horizontal and vertical approach.
Data gathering and calculations shall be performed by one staff member of the BU and/or CM and checked by a second independent staff member. In this way a separation of functions and a double check of the data are achieved.
The results of the checks shall be documented in a suitable form in the files or on the hardcopies of the documents.
Files shall be stored on net-drive with regular backup.

LIST OF ABBREVIATIONS

The following table explains the abbreviations used in this patent application.

| Abbreviation | Explanation |
| --- | --- |
| % | Percent |
| BU | Operation Unit |
| CM | Computer equipped with software to carry out Carbon Management |
| CNG | Compressed Natural Gas |
| D | Demand |
| DD | Day definite: shipments with a guaranteed day of arrival at the (international) destination |
| DD | Day (two digit number) in a date |
| DDD | Day definite: shipments with a guaranteed day of arrival at the domestic (national) destination |
| DOX | Worldwide Document Express (outside EU) |
| ECX | European Document and Parcel Express |
| g | Gram |
| GNM | Global Network Management |
| ID | Identification Number |
| IETA | International Emissions Trading Association |
| kg | Kilogram |
| km | Kilometre |
| kWh | Kilowatt hours |
| l | Litre |
| MM | Month (two digit number) in a date |
| NN | Serial number |
| NTM | Network of Transport and Environment (Nätverket för Transporter och Miljön) |
| OPMS | Operations Performance Management System |
| QD | Quarterly aggregated demand |
| QQ | Quarter (two digit number) |
| PIN | Project Idea Note |
| S | Supply |
| SLA | Service level agreement |
| SME | Small and Medium Enterprises |
| t | Metric ton |
| TD | Time definite: shipments with a guaranteed (latest) time of arrival at the (international) destination |
| TDD | Time definite: shipments with a guaranteed (latest) time of arrival at the domestic (national) destination |
| tonnekm | product of weight in t and distance in km for a shipment |
| UK | United Kingdom |
| YYYY | Year (for digit number) in a date |
| WPX | Worldwide Parcel Express (outside EU) |
| Term | |
| Carbon Emissions | Emissions of Carbon Dioxide ($CO_2$) |
| Contract Customer | Typically a big global corporate customer, who negotiated an individual contract with the BU |
| Distance | The amount of kilometers the shipment is transported. |
| Fill Factor | A value defining to what extent the available capacity is used, also called Utilization Factor. Given as a percentage of the total capacity e.g. 74% fill factor declares that the vehicle is 26% empty. |
| Fixed Emission Value | In some calculations e.g. calculation of emissions from air transport, there is a fixed emission value independent of the distance e.g. take off and landing. |
| Fuel Consumption | The amount of fuel used per distance unit, normally liters per kilometer. Used for calculating the base fuel consumption for a shipment. |
| Leg | The smallest part of the shipment in the transport chain, the part where the same vehicle has the transported goods as its load, e.g. between two terminals. |

-continued

| | Explanation |
|---|---|
| Loading Capacity | The maximum weight carried by a vehicle, used together with Volume Weight to define the shipments part of the available capacity. |
| Parcel | The smallest defined part of the total shipment bought by the customer. |
| Shipment | The total transportation service bought by the customer, the transportation of goods from location A to location B. |
| Transport | The transport work done by a vehicle used for one leg in the shipment. |
| Utilization Factor | See Fill Factor. |
| Variable Emission Factor | In all calculations, there is an emission value totally depending on the distance. |
| Vehicle | The means of transportation used, e.g. air plane, lorry, distribution van etc. |
| Volume Weight | A calculation of the "cost" in the transport chain for this shipment from the customer. The value is a combination of the weight and the volume and is also used for setting the price to the customer. |

Examples for Quarterly Demand Reports

Examples for a quarterly demand report for contract customers

Quarterly Demand Report

| | To be filled by Business Units | | | | | | | | For use by CM only | | | |
|---|---|---|---|---|---|---|---|---|---|---|---|---|
| Business Unit Name | Quarter | Year | Customer Name | Volume of Shipments | $CO_2$/Shipment kg | Total $CO_2$ t | Price/ t $CO_2$ €/t | Total Costs € | Preferred Compensation | Supply/Demand ID | Reference Date | By (Name) entered in demand ledger |
| DHL Express Europe | 03 | 2006 | AAA | 123.400 | | 654 | 20.00 | 13.080 | | | | |
| DHL Express Europe | 03 | 2006 | BBB | 10.456 | | 199 | 20.00 | 3.973 | | | | |
| DHL Express Europe | 03 | 2006 | CCC | 3.456 | | 162 | 20.00 | 3.249 | | | | |
| DHL Express Europe | 03 | 2006 | DDD | 12.345 | | 86 | 20.00 | 1.728 | | | | |
| DHL Express Europe | 03 | 2006 | EEE | 129.876 | | 5.585 | 20.00 | 111.693 | | | | |
| DHL Express Europe | 03 | 2006 | FFF | 8.765 | | 140 | 20.00 | 2.805 | Solar | | | |

Example for a quarterly demand report by DHL Germany Retail for retail customers Quarterly Demand Report

| | To be filled by Business Units | | | | | | | | | For use by CM only | | | |
|---|---|---|---|---|---|---|---|---|---|---|---|---|---|
| Business Unit Name | Quarter | Year | Customer Name | Product ID/Code | Volume of Shipments | $CO_2$/Shipment kg | Total $CO_2$ t | Price/ t $CO_2$ €/t | Total Costs € | Preferred Compensation | Supply/Demand ID | Reference Date | By (Name) entered in demand ledger |
| DHL Germany Retail | 03 | 2006 | | Parcel | 15.432.678 | 0.5 | 7.716 | 20.00 | 154.327 | | | | |

Example for a quarterly supply reports for internal abatement projects

Quarterly Supply Report

| | To be filled by Business Units | | | | | | | | | | For use by CM only | | | |
|---|---|---|---|---|---|---|---|---|---|---|---|---|---|---|
| Business Unit Name | Project ID/Name | Quarter Vehicle: | Year Solar: | Total activity rate km kWh | Specific emissions baseline kg $CO_2$/km kg $CO_2$/kWh | Specific emissions project kg $CO_2$/km kg $CO_2$/kWh | Total $CO_2$ t | Price/ t $CO_2$ €/t | Total Value € | Supply/Demand | Reference ID | Date | By (Name) entered in supply ledger |
| DHL Express Switzerland | I-RME-01 | 0003 | 2006 | 126.579 | 0.350 | 0.045 | 38.6 | 10.00 | 386 | | | | |

In a preferred embodiment of the invention the processing of physical objects takes place in a processing station. In this embodiment, address components that are present on the physical objects are transmitted to an internal data stock. The internal data stock supplies a result address on the basis of the transmitted address components.

Moreover, it is checked whether environmental data were detected. In this case, a selection is made from among the determined environmental data.

Further preferred process steps for the execution of the invention will be explained below. The process steps can be used individually as well as combined with each other, as a result of which the efficiency of the individual process steps is further increased to an especially surprising extent.

A process component that translates into increasing the efficiency of the method with relatively little effort is the implementation of specialized reading software.

A conversion file, which is incorporated into the so-called dictionary of the sorting installation, can implement environmental data. In this manner, if the reading quality is sufficient, then the environmental data are ascertained reliably enough so that the sorting machine is able to sort the physical objects on the basis of the input distribution information (street, optionally house number) and the environmental data.

The environmental data can be applied in different ways, for example, by means of various printing processes. Printing with a fluorescent dye is especially advantageous since this make it possible to especially easily and reliably carry out an optical detection of the target code during a subsequent sorting procedure.

The target code can assume various forms, for example, it can contain environmental data, especially environmental requirement data and other data as for example the complete address information, which is preferably achieved by using an 11-character to 13-character target code with an additional imprint of the postal code in plain text.

However, it is possible to use another code instead of this code, for example, instead of the fluorescent barcode, to use a label with a 4-state code that likewise contains the requisite target information that is in encrypted form and that is applied onto the physical object automatically, preferably in the form of a label. Preferably, the postal code is additionally written on the label in plain text.

In addition to the automated use of the method in processing machines, which are preferably integrated into the normal processing of the physical objects, individual physical objects can also be detected separately, for example, at special processing stations.

Preferably, the individual stations consist of a PC with a monitor and keyboard as well as a label printer as an additional output unit that is controlled by the program and that generates a plain text label or, as an alternative, a 4-state label.

The implementation of the process steps will be explained below with reference to the example of a two-part computer system. However, the invention is not restricted to the especially advantageous case of a two-part computer system presented here.

As a matter of principle, any computer is suitable for carrying out the invention.

The term "computer" is by no means to be understood in a limiting manner. This can be any unit that is suitable for performing computations, for example, a workstation, a personal computer, a microcomputer or circuitry suitable for performing computations and/or comparisons.

Within a preferred embodiment a database is used on a server that takes over the described functions for several processing stations.

The client part is realized in a platform-independent programming language. The use of another programming language is fundamentally possible. The recognizable parts of the data are entered via an input mask. Then a database query is sent by the client to the server.

The server is a powerful computer with several processors and a large main memory. This is necessary in order to achieve very rapid access times.

The data stock consists of the files from a suitable database application containing, at least some environmental data. The design of the database is also configured for rapid access. However, this also means that a great deal of data has to be stored redundantly.

The data accesses are provided by a suitable database application, for example, PL/SQL. Via a PL/SQL procedure, the client receives his result set from the server in the form of data records. The result set is sorted at the client and displayed in a selection list. It can be locally limited by additional entries.

A special feature of the program is that, in a separate list, all environmental data are automatically displayed with the appertaining data for the delivery (post office box, postal code).

A decision module or an operator decides which of the displayed data records (from the normal or, for example, from the special selection list) are applicable in each given case. The decision module or the operator selects this data record and actuates the printing button. Via the locally connected label printer, the appropriate label is printed with the correct address and glued onto the physical object. A decision module is a program module that can observe its environment and that can act largely autonomously. For this purpose, the decision module contains information about the parameters and action instructions that have to be taken into account regarding the procedures. Preferably, the decision module is capable of acting as autonomously as possible.

In a preferred embodiment environmental requirement information attached to the physical object is detected and transmitted to an interface computer. The interface computer contains memory locations for associating the detected images.

The interface computer is connected to a server. The server preferably has the previously presented structure and allows a matching of environmental requirement data with archive able environmental impact data.

The environmental requirement data is detected on the basis of the ascertained image data and by undertaking a database query, or else a data stock query. These queries are made in the form of automated process steps.

This allows obtaining ascertained environmental impact data. This ascertained data is subsequently transmitted to the interface computer.

The interface computer is connected directly or indirectly to the sorting installation.

In a preferred embodiment the interface computer transmits the result data to a result memory of the sorting installation.

The physical objects are preferably associated with the corrected address information by detecting an identification code that identifies them.

Preferably, the identification code was applied onto the physical object in order to allow an association of the new address with the correct physical object.

The identification code makes it possible to associate each of the physical objects with the appertaining environmental requirement data. In an especially preferred embodiment, this is done in that identification codes printed on the physical objects are detected.

It is especially advantageous to print the identification code and/or the environmental requirement data on the physical object.

The printing can be done directly onto the physical object or else by printing a label that is subsequently affixed onto the physical object.

The described implementations of the invention help to analyze environmental impact of transport procedures.

This allows to create a transport system for transporting physical objects, wherein at least one physical object is transported from a sending station to a receiving station, wherein the transport occurs through at least one physical router, wherein the physical router executes a decision about further parameters of transport to another physical router or to the receiving station, wherein environmental data of the transport is calculated and displayed.

Figure 12:
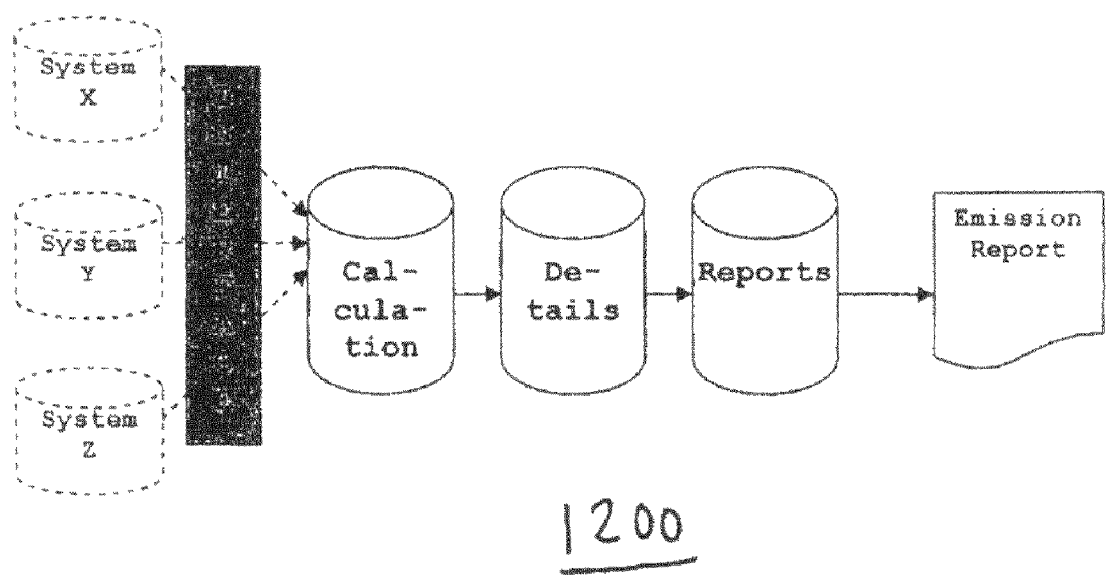
FIG. 12 shows a schematic representation, how transactions from different operational systems are managed via a defined interface, where the transactions are verified before they are entered in to the database.

FIG. 12 shows a schematic representation 1200 that explains how transactions from different operational systems are managed via a defined interface, where the transactions are verified before they are entered in to the database. FIG. 12 shows an example of output data (emission report) generated according to a preferred embodiment of the invention.

Advantageous Processing Rules for Emission calculations are described afterwards:

The basic principle in the calculations is that the emissions reported to the customer should be calculated down to each transport, considering utilization and capacity of the vehicle.

For international shipments the emissions are managed on country level, i.e. that when a border is passed, the emissions are split equally and allocated to each country.

In ACCEPT there is one fundamental calculation method, used for the highest level of accuracy, this model is defined as follows in a 4-step approach:

For each leg of the transport the following is calculated and then summarized in the reports:
1. Calculate the distance
2. Calculate the fuel consumption of the vehicle
3. Calculate the emissions, depending of vehicle/engine type
4. Allocate the emissions, based on load capacity and fill factor
5. Calculate emissions resulting from facilities involved The actual calculations can be managed in three different ways, depending on the available data in each country:
1. Manually, using parameters from ACCEPT
   The distance is calculated for each transaction using external web products, and then the distance is multiplied with the weight giving the transport work in tonkm. Based on this an "average fleet" can be calculated and then used for the respective customers calculations.
2. Automatically
   a. Calculate based on average fleet values, "Level 3"
   b. Calculating fleet average is done by finding out the different vehicle types and their relative part of the total transport work done in the country.
      Based on this an "average fleet" can be calculated and then used for the respective customers calculations.
   c. Calculate based on each vehicle, "Level 6"
      These calculations give a detailed calculation according to NTM level 3 and are verifiable by a third part.

Transports

The calculations of transports are done as follows, the same model applies for Road and Air. When calculating Road there is today no Fixed Emission Value:

Emissions for customer=((Volume Weight/(Max Load Weight*Fill Factor))*(Fixed Emission Value+ Variable Emission Value*Distance))*Fuel Consumption Fuel Consumption Fuel consumption is gathered, in this order, from the vehicle, vehicle type or more generic parameters Customer Part of Vehicle Utilization Calculated as the shipments part of the total available weight capacity and with reference to actual utilization of vehicle Volume Weight/(Max Load Weight*Fill Factor)

Emission Factor

The emission factor is calculated as the sum of fixed emission values and variable values. The fixed values derive from calculating Air transactions and are set to zero for Road calculations. The variable value is depending of the distance, thus the multiplication Fixed Emission Value+Variable Emission Value*Distance Error Management If data is missing or not correct, ACCEPT either stops the update of this transaction and creates an error message, or uses a less accurate value e.g. using generic Vehicle Type instead the actual vehicle.

Real Estate and Facilities

Emission from e.g. energy usage in facilities can contribute significantly to the emission footprint of a shipment.

The examples describe two levels for implementing;
Level 3, based on more generic data
Level 6, based on detailed vehicle data
Calculating Road Emissions
Level 3, Based on Generic Data Using Level 3 the calculations are gathered from the production systems and the transport work is calculated. This transport work is then multiplied with a more generic emission factor which is set from calculating the emissions from the fleet used in the country.

As an example, figures as stated in the table below are used. The rows represent the different vehicle types used;
As an example, figures like these are used; where the columns represent the different vehicle types used;
For each vehicle type is shown the total transportation work done, in absolute tonkm and in %
The capacity, Net Load ton, is calculated by multiplying the Max Load with the Utilization factor. The NTM standard value is indicated in the table.
The fuel consumption is taken from NTM values.

| | Vehicle type | Part of k tonkm | total % | Max load ton | Net Load ton | Utilization NTM | DHL | Fuel l/km | consumption l/tonkm |
|---|---|---|---|---|---|---|---|---|---|
| H/D | Delivery van Distribution | 0 | 0% | 1.5 | 0.75 | 50% | 50% | 0.15 | 0.2000 |
| H/D | lorry - Urban Distribution | 0 | 0% | 8 | 4 | 50% | 50% | 0.25 | 0.0625 |
| H/D | lorry - Rural | 0 | 0% | 8 | 4 | 50% | 50% | 0.25 | 0.0625 |
| H/D | Heavy distribution lorry - Urban | 66.167 | 19% | 14 | 7 | 50% | 50% | 0.3 | 0.0429 |

-continued

| | Vehicle type | Part of k tonkm | total % | Max load ton | Net Load ton | Utilization NTM | DHL | Fuel l/km | consumption l/tonkm |
|---|---|---|---|---|---|---|---|---|---|
| H/D | Heavy distribution lorry - Rural | 0 | 0% | 15 | 7.5 | 50% | 50% | 0.3 | 0.0400 |
| LTL | Lorry + semi-trailer | 231.985 | 66% | 40 | 36.8 | 75% | 92% | 0.45 | 0.0122 |
| LTL | Tractor + semi-trailer | 25.776 | 7% | 28 | 21 | 75% | 75% | 0.38 | 0.0181 |
| LTL | Train | 30.058 | 8% | | | 50% | 50% | | |
| | Total | 353.987 | 100% | | | | | | |

These are the basic data used for a first country, e.g. Sweden, where the total transport work is split by vehicle type (and performance) and their part of the total.

Level 6, Based on Detailed Vehicle Data

Using Level 6 the transactions/data are gathered from the productions systems and the transport work is calculated. This transport work is then multiplied with the specific vehicle used, considering Euro class, fuel consumption, utilization etc, giving a high quality calculation matching the demands from the more demanding customers. Level 6 calculation requires a subsystem that can feed ACCEPT with the relevant data on vehicles such as e.g. the environmental index used.

In advantageous implementations the calculations will vary from level 3 to 6, giving a result that is much better than level 3 but with less quality than a pure level 6. All this depending on the fact that the transactions from production not always meet the need for level 6 reporting, e.g. COSP does not always identify the vehicle.

For specific customers, depending on their routes, a genuine level 6 quality might be achieved if all transactions are detailed enough.

For specific customers, depending on their routes, a genuine level 6 quality might be achieved if all transactions are detailed enough.

Calculating Air Emissions

Calculating Air emissions are done by from the actual shipment transactions. These transactions include origin and destination, but not the transactions in between. Thus ACCEPT uses a table, CSD, that specifies the different legs in the shipment, as they are planned, deviations from this plan might happen and are not managed by ACCEPT. If there are more than 5 "legs" in a shipment (which is rare) then ACCEPT calculates the last "leg as from last known origin to destination.

Level 3, Based on Generic Data

Using Level 3 the calculations are gathered from the production systems and the transport work is calculated. This transport work is then multiplied with a more generic emission factor which is set from calculating the emissions from the fleet used in the country or globally.

Level 6, Based on Detailed Vehicle Data

Using Level 6 the transactions/data are gathered from the productions systems and the transport work is calculated. This transport work is then multiplied with the specific vehicle used, considering air plane type, fuel consumption, utilization etc, giving a high quality calculation matching the demands from the more demanding customers. Level 6 calculation requires a subsystem that can feed ACCEPT with the relevant data on vehicles such as e.g. the environmental index used in a certain region, especially a country, e.g. Sweden, In real production environment the calculations will vary from level 3 to 6, giving a result that is much better than level 3 but with less quality than a pure level 6. All this depending on the fact that the transactions from production do not always meet the need for level 6 reporting.

Calculating Rail Emissions

Rail emissions are not within the scope for the first release of ACCEPT.

The calculations are though be calculated in a similar way as Road and Air, using NTM methodology and values.

Calculating Sea/Ocean Emissions

The calculations are calculated in a similar way as Road and Air, using appropriate methodology and values.

Emissions Managed

The values shown in ACCEPT reports are the following:

| | |
|---|---|
| CO | Carbon oOxide |
| $CO_2$ | Carbon dDioxide |
| HC | Hydrocarbons |
| $NO_x$ | Nitrogen Ooxides |
| PM | Particulate mMatter |
| $SO_2$ | Sulphur dDioxide |
| Energy | Total consumption usage in kWh Can also be split into Nuclear, Fossil or ecological |
| Tonkm | Transport work done |
| kKm | Total distance driven |
| Number | of shipments |
| kKg | Total weight handled |

For each physical object the value shown can be scaled in order to be more relevant, e.g. it might be more relevant to show emissions in kg instead of gram. This is managed by setting parameters.

External Interfaces

Using ACCEPT can involve external interfaces to existing production systems.

Air Transactions

For air transports there is a global solution, which can deliver transactions facilitating the implementation of ACCEPT, when one country is up and running, all other countries are easily adhered.

Figure 13:
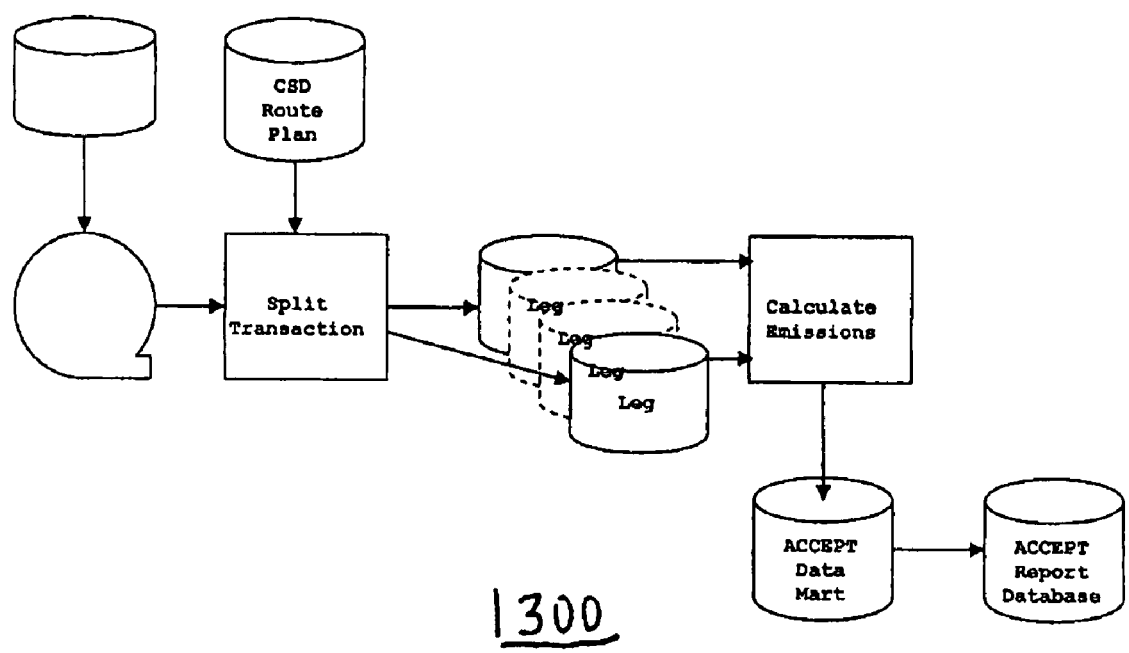
FIG. 13 shows a schematic representation, how the Air transactions from the production system are managed.

FIG. 13 shows a schematic representation 1300 showing how the Air transactions from the production system are managed. FIG. 13 shows how the Air transactions from the production system are managed via a Transaction Extract. The transaction is split, using the information in the CSD, generating a number of individual "legs" for which the emissions are calculated. These emissions are stored in the Data Mart (the same as for Road) and form the base for ACCEPT Report Database.

Transactions not accepted in the update are stored in a log file and an error message is created. When the error is corrected they will be updated.

Figure 14:
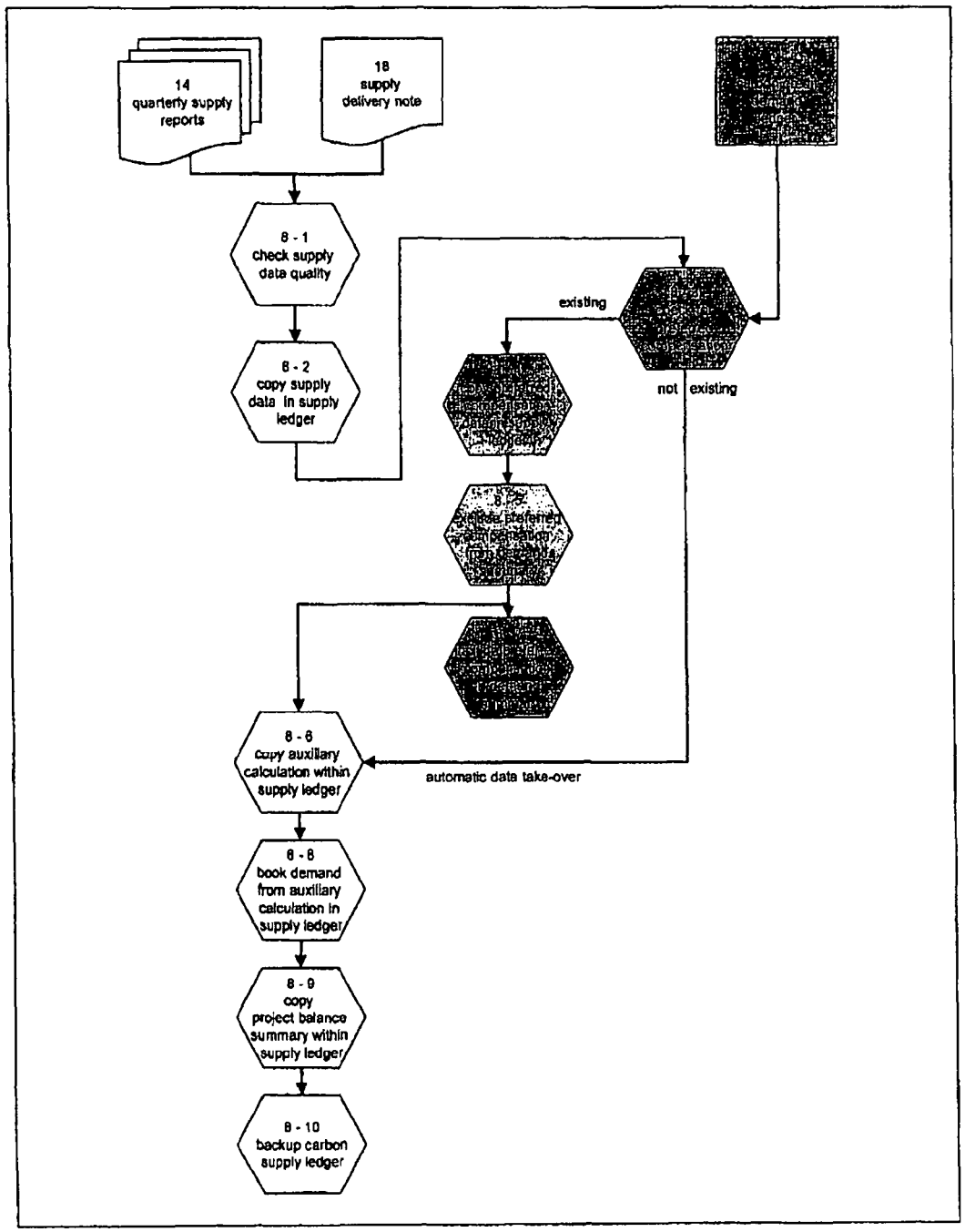
FIG. 14 shows an advantageous process chart for accounting carbon credits in the carbon supply ledger

FIG. 14 shows an advantageous process chart 1400 for accounting carbon credits in the carbon supply ledger.

Road Transactions

For the road transportations the situation is more complex, most countries have their own system(s), probably requiring a unique interface for each of them. In order to define the interface and estimate the cost, an analysis is done in each country.

ACCEPT is constructed in order to be as flexible as possible; all interfaces are planned for accepting a multiple of input systems. There are different ways how to interface the local production system, whether the major part of interface should be done on the production side or on the ACCEPT side.

The administration of interfaces to several systems is depending of the interface as described above, the aim is that the different production systems automate their deliveries to ACCEPT with ACCEPT administration monitoring the deliveries and updating the system.

Preferred embodiments of the invention allow integrating transportation means, characterized in that they contain means for transmitting environmental performance data of the transportation means to a logical node.

A logical node is any device that can be integrated in a computer network. Nodes can be computers, personal digital assistants (PDAs), cell phones, or various other network appliances.

On an IP (Internet Protocol) network, a logical node is any device with an IP address.

Logical nodes are often times connected by hubs, logical routers, or by a network switch.

The examples are combinable with physical routers, capable of executing a decision about parameters of transport to another physical router or to a receiving station, characterised in that a logical node is assigned to the physical router, wherein the decision is taken according to environmental data.

To carry out these embodiments efficiently it is advantageous to implement at least one computer program, capable of controlling a message for transporting physical objects, wherein the transport occurs through at least one physical router, wherein the physical router executes a decision about further parameters of transport, characterised in that the computer program takes the decision according to environmental data.

For further increasing the efficiency and speed for involving the environmental data, an aspect of the invention concerns a computer program product, characterised in that it contains one of the described computer programs. Preferable the computer program product is loadable in the logical node.

The descriptions for representation of data are always combinable with the examples for routing and/or transporting the physical objects.

Therefore the invention includes information systems as well as routing and transporting systems.

It is absolutely understandable that parts of the invention can be used together or alternatively separately.

It is especially advantageous to use transportation means, the physical router, the computer program or the computer program product according to the invention independently or in combination with one or more of the other parts of the present invention.

This allows obtaining ascertained environmental impact data and using it for a transport optimized with regard to calculated environmental impact data.

What is claimed is:

1. A method for transporting physical objects, at least one physical object being transported from a sending station to a receiving station, the method comprising:
    measuring environmental data with a plurality of sensors for environmental impact factors and transmitting the environmental data to a central control computer comprising required environmental data for steering the transport process for handling and moving at least one physical object;
    providing environmental impact data for certain transports and environmental impact data in certain regions by the central control computer;
    comparing the measured environmental data with the required environmental data with a comparator of the central control computer;
    using required environmental data comprising the environmental impact data to compute at least one transport parameter relative to a movement of the at least one physical object to a second physical router or to a receiving station;
    influencing at least one of the environmental impact factors comprising at least one element of the group of carbon emission or emission of fine particles resulting from combustion sources by a decision of the central control computer about the at least one transport parameter and at least one sustainability parameter comprising at least one element of the group of parameters of usage of alternative fuel and choice of a freight vehicle fulfilling emission criteria;
    transporting the at least one physical object to the second physical router or to the receiving station based on the at least one transport parameter;
    the transporting occurring through a first physical router, where a steering function of the first physical router is performed using the environmental impact data stored on the central control computer; and
    preparing an emission report about the environmental impact of the transport according to the environmental data stored in a storing module.

2. The method according to claim 1, wherein environmental impact data accompanies the at least one physical object.

3. The method according to claim 1, wherein environmental requirements data accompanies the at least one physical object.

4. The method according to claim 1, wherein a computer connected to the first physical router is adapted to consider environmental impact data about a transportation type and at least one transportation-relevant parameter of the at least one physical object.

5. The method according to claim 1, wherein measured environmental data are measured by sensors and transmitted to the central control computer.

6. The method according to claim 1, wherein transport of the at least one physical object is calculated and planned, wherein an environmental effect of the transport is calculated with regard to environmental performance data of at least one transport type and wherein the at least one transport parameter is changed if the planned transport does not fulfill the required environmental data.

7. The method according to claim 1, wherein the required environmental data comprises emission data.

8. The method according to claim 1, wherein the transport parameter comprises a fuel type.

9. The method according to claim 1, wherein the transport parameter comprises a transport type.

10. The method according to claim 1, wherein the transport parameter comprises a transport time.

11. The method according to claim 1, comprising using the required environmental data to compute at least one sustainability parameter relative to the movement of the at least one physical object to the second physical router or to the receiving station.

12. The method according to claim 1, wherein the required environmental requirement are based by law.

13. The method according to claim 12, wherein a routing decision is based on the required environmental requirement.

14. The method according to claim 1, further comprising modelling various transports.

15. A system for transporting physical objects, at least one physical object being transported from a sending station to a receiving station, the system comprising:
- a plurality of sensors for environmental impact factors measuring environmental data and transmitting the environmental data to a central control computer comprising required environmental data for steering a transport process for handling and moving at least one physical object, wherein the central computer is adapted to:
  - provide environmental impact data for certain transports and environmental data in certain regions;
  - receive information for handling and moving the at least one physical object;
  - use required environmental data comprising the environmental impact data to compute at least one transport parameter relative to a movement of the at least one physical object to a second physical router or to the receiving station;
  - compare the measured environmental data with the required environmental data with a comparator; and
  - influence at least one of the environmental impact factors comprising at least one element of the group of carbon emission or emission of fine particles resulting from combustion sources by a decision about the at least one transport parameter and at least one sustainability parameter comprising at least one element of the group of parameters of usage of alternative fuel and choice of a freight vehicle fulfilling emission criteria;
- a first physical router, where the transporting of the at least one physical object occurring through the first physical router and where a steering function of the first physical router is performed using the environmental impact data stored on the central control computer; and
- a storing module storing a prepared emission report about the environmental impact of the transport according to the stored environmental data.

16. The transportation system according to claim 15, wherein the central control computer contains at least one comparator for comparing measured environmental data with the required environmental data.

17. The transportation system according to claim 15, comprising:
- a plurality of sensors that are adapted to measure environmental data; and
- a transmitter that is adapted to transmit measured environmental data to the central control computer.

18. The transportation system according to claim 17, wherein a number of the sensors are placed close to sources of emissions comprising motorways or harbours.

19. The transportation system according to claim 17, wherein the installation of the sensors implement of good geographic distribution.

20. The transportation system according to claim 17, wherein the central computer is adapted to model a transport.

21. The transportation system according to claim 15, wherein the required environmental data comprises emission data.

22. The transportation system according to claim 15, wherein the transport parameter comprises a fuel type.

23. The transportation system according to claim 15, wherein the transport parameter comprises a transport type.

24. The transportation system according to claim 15, wherein the central computer is adapted to use the required environmental data to compute at least one sustainability parameter relative to the movement of the at least one physical object to the second physical router or to the receiving station.

25. A non-transitory machine-readable medium, comprising:
- code that is adapted to measure environmental data with a plurality of sensors for environmental impact factors and transmitting the environmental data to a central control computer comprising required environmental data for steering a transport process for handling and moving at least one physical object;
- code that is adapted to compare the measured environmental data with the required environmental data with a comparator of the central control computer;
- code that is adapted to use required environmental data to compute at least one transport parameter relative to a movement of the at least one physical object to a physical router or to a receiving station;
- code that is adapted to influence at least one of the environmental impact factors comprising at least one element of the group of carbon emission or emission of fine particles resulting from combustion sources by a decision of the central control computer about the at least one transport parameter and at least one sustainability parameter comprising at least one element of the group of parameters of usage of alternative fuel and choice of a freight vehicle fulfilling emission criteria; and
- preparing an emission report about the environmental impact of the movement according to the environmental data stored in a storing module.

* * * * *